(12) United States Patent
Shimizu et al.

(10) Patent No.: US 6,271,875 B1
(45) Date of Patent: Aug. 7, 2001

(54) THREE-DIMENSIONAL IMAGE PROCESSING APPARATUS AND THREE-DIMENSIONAL IMAGE PROCESSING METHOD

(75) Inventors: Hajime Shimizu, Tokyo; Mamoru Oda, Noda; Akihito Mori, Ichihara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/090,898

(22) Filed: Jun. 5, 1998

(30) Foreign Application Priority Data

Jun. 5, 1997 (JP) .................................................. 9-147652

(51) Int. Cl.[7] ................................................. H04N 13/04
(52) U.S. Cl. ................................ 348/42; 348/46; 348/51; 348/169
(58) Field of Search .............................. 348/42, 46, 51, 348/169; H04N 13/04

(56) References Cited

U.S. PATENT DOCUMENTS

| | | | | |
|---|---|---|---|---|
| 5,742,332 | * | 4/1998 | Imai et al. | 348/51 |
| 5,905,525 | * | 5/1999 | Ishibashi et al. | 348/39 |
| 6,115,058 | * | 9/2000 | Omori et al. | 348/45 |
| 6,191,808 | * | 2/2001 | Katayama et al. | 348/39 |

FOREIGN PATENT DOCUMENTS

| | | | |
|---|---|---|---|
| 5-56402 | 1/1993 | (JP) | G06F/15/68 |
| 5-290145 | 11/1993 | (JP) | G06F/15/62 |
| 7-254072 | 10/1995 | (JP) | G06T/15/00 |
| 8-087585 | 4/1996 | (JP) | G06T/1/00 |

* cited by examiner

*Primary Examiner*—Howard Britton

(57) ABSTRACT

It comprises a head position-detecting device, a modeling data memory, a CPU, a coordinates transformation device, a compression transformation device, a polygon code memory, a polygon cache, an internally divided value generator, a rendering device, a display controller, a display and a restoration transformation device. The pixel of the image is selected roughly in the moving direction of the observer.

19 Claims, 39 Drawing Sheets

Texture having the normal resolution

Texture having the resolution of 1/4

FIG. 24
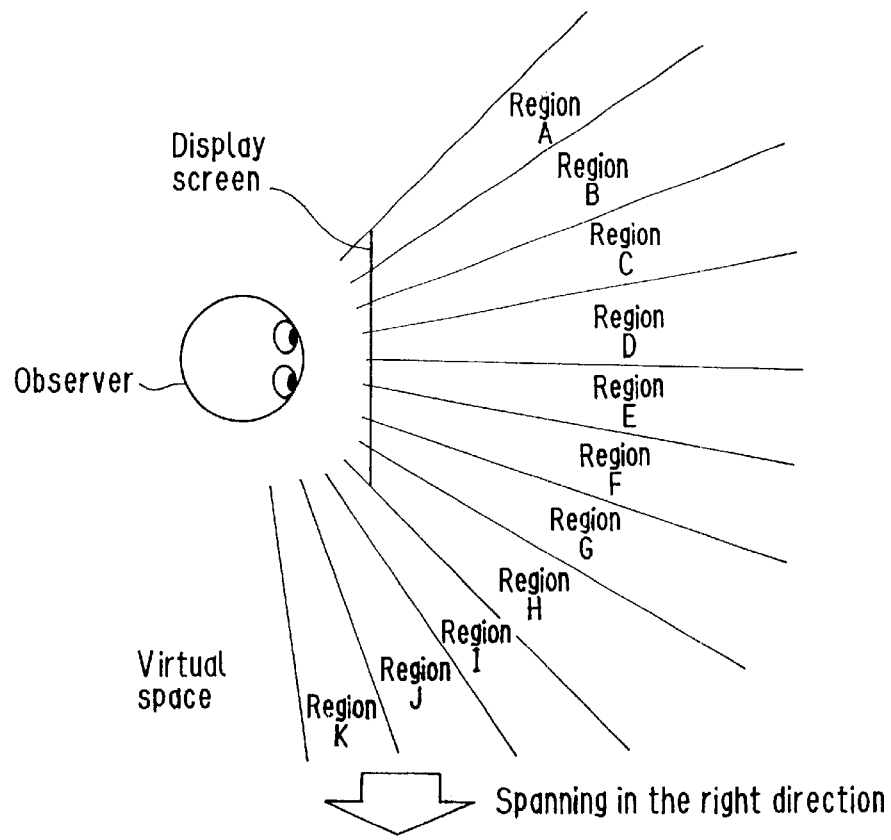
Spanning in the right direction
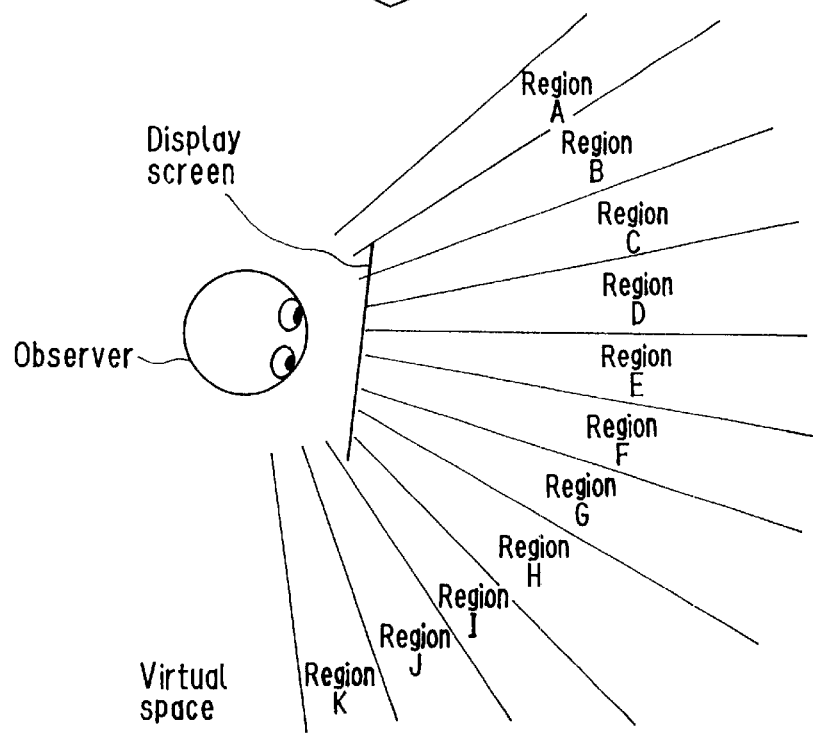

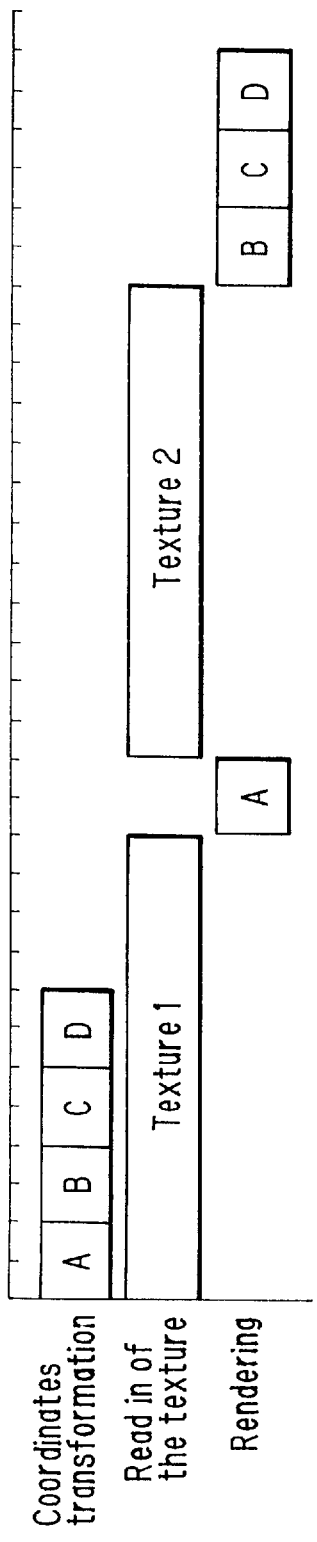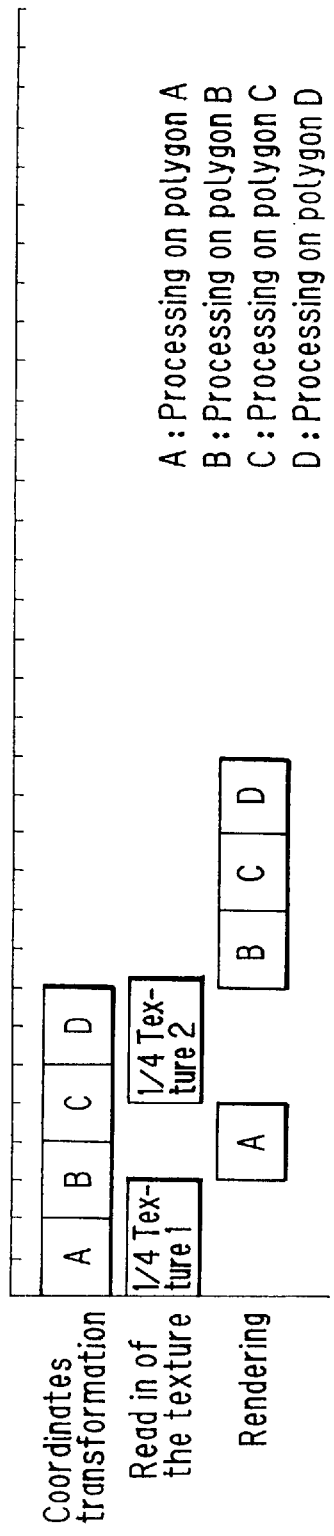

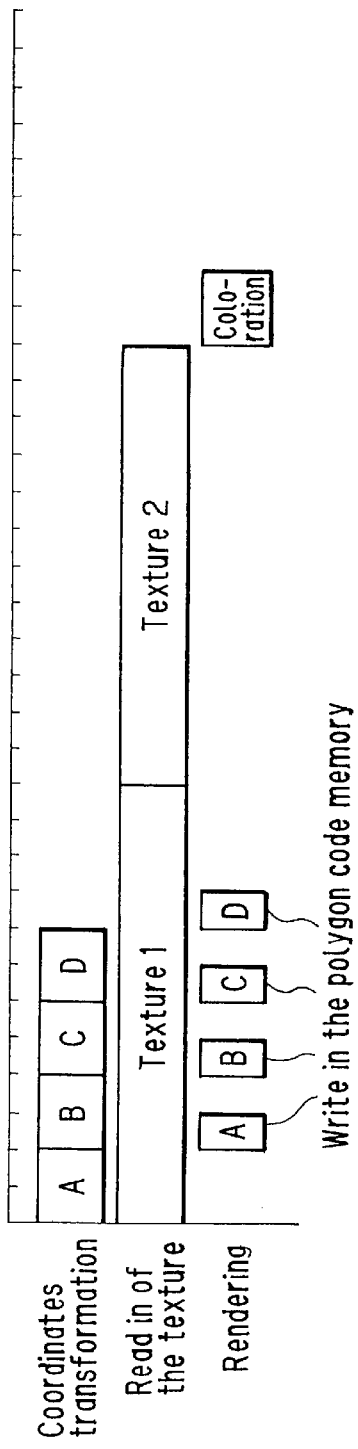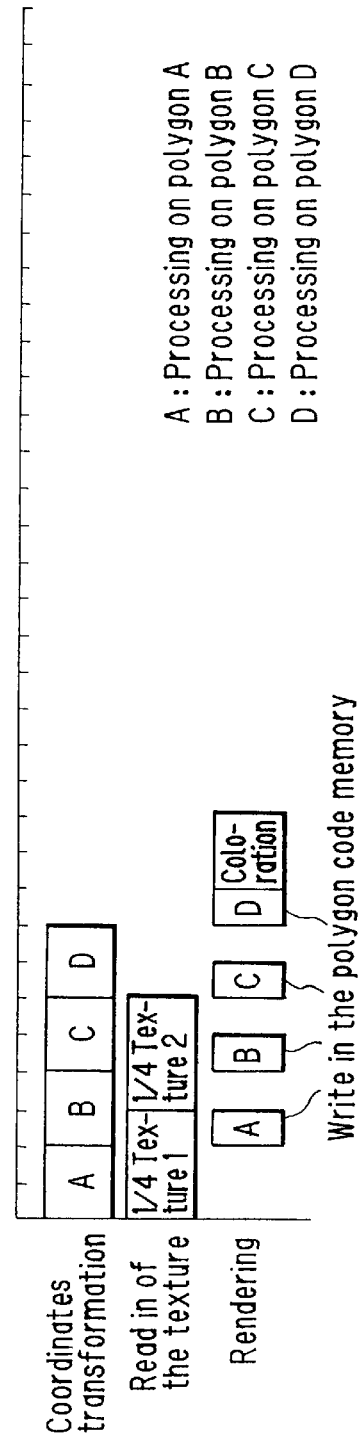

THREE-DIMENSIONAL IMAGE PROCESSING APPARATUS AND THREE-DIMENSIONAL IMAGE PROCESSING METHOD

BACKGROUND OF THE INVENTION (1) Field of the Invention

The present invention relates to a three-dimensional image processing apparatus which generates a two-dimensional image with reality from the three-dimensional information set as the numerical data in the apparatus.

(2) Description of the Prior Art

Recently, the computer graphics have been drawing attention as the backbone technology for the virtual reality, multi-media and the like. In the computer graphics, a polyhedral model obtained by approximating a complicated surface of an object with small polygons is utilized. A natural three-dimensional image close to the reality is then generated by attaching a texture on the surface thereof. There are various types of the image processing apparatus for generating such a three-dimensional image, which will be described in detail below.

[First conventional example]

FIG. 1 is a block diagram showing the first conventional example of the image processing apparatus. This apparatus comprises a main memory 100 for storing the polygon data and the texture data, a CPU 101, a texture memory 102 for storing the pattern data on the polygon surface, a polygon mapping processing device 103, a frame memory 104 for one screen, a display controller 105, and a display 106, and the content of the frame memory 104 is read out according to the screen coordinates value from the display controller 105, and being output in sequence to the display 106.

With this processing apparatus, the CPU 101 executes the modeling transformation, projective transformation and the like using a parameter defining the polygon stored in the main memory 100, and an operation data obtained according to the application software and the operator's operation, to transform the parameter of the corresponding polygon so as to form a polygon image, and outputs the parameter to the polygon mapping processing device 103 in sequence.

The polygon mapping processing device 103 takes out the texture data corresponding to the polygon among the input parameters of polygon from the texture memory 102, and while attaching the texture data to each polygon, subjects each polygon to the blinding processing, and outputs the results to the frame memory 104. When the texture is not stored in the texture memory 102, the corresponding texture is read out from the main memory 100, under the instruction of the CPU 101. The polygon image generated by the polygon mapping processing device 103 is written in the frame memory 104 as the frame picture, and repeatedly read out onto the display 106 at a required speed, and displayed as a static image.

Moreover, as shown in FIG. 2, there is an image processing apparatus disclosed in Japanese Patent Application Laid-Open Hei 7 No. 254072. In this apparatus, the polygon mapping processing device 103 is divided into a coordinates transformation device 107 and a rendering device 108. The coordinates transformation device 107 performs the processing up to the projection of a model from the three-dimensional coordinates space to the two-dimensional coordinates space, and the rendering device 108 generates the screen image, while attaching the texture data to each polygon.

[Second conventional example]

FIG. 3 is a block diagram showing the second conventional example of the image processing apparatus. This image processing apparatus generates the image which looks sharp to observers at a high speed, by making the resolution of the image high in the vicinity of a marked point, and low in a place away from the marked point. This is disclosed in Japanese Patent Application Laid-Open Hei 5 No. 6402.

This image processing apparatus comprises marked point-detecting means 110 for detecting the marked point of the observer to output the information of the marked point, a pixel selector 111 for selecting the pixel more densely as it approaches the marked point based on the marked-point information being output by the marked point-detecting means 110, and selecting the pixel more roughly as it is away from the marked point, a luminance calculator 112 for calculating and accurately determining the luminance value of the pixel selected by the pixel selector 111, an interpolator 113 for determining the luminance value of the uncalculated pixel by the interpolation using the luminance value determined by the luminance calculator 112, and display means 114 for displaying the generated image.

With this processing apparatus, first the marked point-detecting means 110 detects the marked point of the observer, and outputs the information of the detected marked point to the pixel selector 111. The pixel selector 111, based on the information of marked point received from the marked point-detecting means 110, selects the pixel more densely as it approaches the marked point, while selects the pixel more roughly as it is away from the marked point, and outputs the coordinates of the selected pixel to the luminance calculator 112. The luminance calculator 112 calculates and accurately determines the luminance value of the pixel on the coordinates being output from the pixel selector 111, and outputs the luminance value together with the coordinates of the pixel whose luminance value has been determined to the interpolator 113. The interpolator 113 determines the luminance value of the uncalculated pixel by means of the interpolation using the luminance value determined by the luminance calculator 112, and outputs the determined luminance values of the whole pixels to the display means 114. The display means 114 displays the image based on the luminance values of the whole pixels received from the interpolator 113. This operation is repeated until the values of the whole pixels in the image are determined.

[Third conventional example]

FIG. 4 is a block diagram showing the third conventional image processing apparatus. This image processing apparatus is to reduce the pixel-generating processing, which was proposed by the present applicant.

This image processing apparatus comprises an modeling data memory 120 for storing the model data, a CPU 121 for controlling the whole apparatus, a coordinates transformation device 122 for transforming the coordinates of the vertex of a polygon and transmitting the vertex coordinates after the coordinates transformation and an identifier of the polygon (hereinafter referred to as "polygon code") to a polygon code memory, the polygon code memory 123 for storing the polygon code in a position to draw the polygon, a polygon cache 124 for receiving the vertex coordinates after the coordinates transformation and a rendering parameter (such as a texture coordinates) and storing them in an address indicated by the polygon code, an internally divided value generator 125 for generating an internally divided value from the vertex coordinates and the screen coordinates, a rendering device 126 for receiving the internally divided value and the rendering parameter to generate color data, a display controller 127 for outputting the image signal according to the color data value, and a display 128 for displaying the image based on the image signal.

With this method, not the color data value but the polygon code is written in the polygon code memory 123. Furthermore, synchronously with the horizontal and vertical signals of the display 128, pixel processing such as mapping and rendering is performed. Therefore, the processing becomes very light.

[Fourth conventional example]

Furthermore, as disclosed in Japanese Patent Application Laid-Open Hei 5 No. 290145 and Japanese Patent Application Laid-Open Hei 8 No. 87585, there can be considered a method for reducing the amount to be processed by utilizing the fact that when the observer who watches the virtual space and a model in the virtual space move relatively, even if the model is displayed with rougher accuracy as the relative speed increases, it cannot be perceived by a human being, to reduce the number of vertexes (or number of polygons).

FIG. 5 is a block diagram showing the fourth conventional example of the three-dimensional image processing apparatus.

This apparatus comprises an image information input unit 130, an object-detecting section 131, objects 132-1~132-n, sections for detecting the speed of the object 133-1 ~133-n, a visual point position-detecting unit 134, a region-dividing section 136, blocks 137-1~137-n, and a synthesizing display unit 138.

The object-detecting section 131 detects the image being input by the image information input unit 130, and the speed detecting section 133 detects the speed of the object 132 in the image. Depending upon the position of the visual point, the relative speed-detecting section 135 detects the relative speed. The region-dividing section 136 divides the object into a plurality of regions, and changes the number of vertexes of each region depending upon the detected relative speed, to synthesize the respective model images and display them on the synthesizing display unit 138. Thus, with increase of the relative speed, a model with rougher accuracy is displayed.

In order to generate a computer graphic picture having a high quality with reality, it is necessary to arrange multiple shape data in the virtual space, and to prepare lots of textures having the high resolution which constitute the surface of the shape. Therefore, since a large volume of data is processed, a large volume of processing has to be performed to draw one screen. In general, such a large volume of data is stored in the main memory, and read out according to need. However, when a observer moves, for example, pans, it is necessary to form the image following this moving speed. In this case, the volume of data to be processed becomes enormous, causing problems described below.

The first conventional example performs the display processing for each polygon, hence in the case of an image that, for example, a book is placed on a desk, processing of the desk and processing of the book are performed, and processing such as deleting the image of the desk in the overlapped portion is performed. Therefore, painting of screens is superimposed frequently, causing a problem that the processing for forming the pixel becomes heavy. Accordingly, when the observer himself/herself moves, the processing for generating the image becomes slow, and the image cannot follow the movement of the observer, thus forming the factitious image.

The second conventional example is capable of speeding up the image-generating processing compared to the speed of the first conventional example by decreasing the resolution of the image at a place away from the point marked by the observer. However, the portion of the marked point requires the conventional image processing, and when the head position of the observer moves, the same processing as that of at the time of standing still is performed at the time of moving of the head position, in the marked point. Therefore, the image is behind with respect to the movement of the head position. Moreover, the number of drawing per 1 second is restricted, thus a smooth movement cannot be obtained.

The third conventional example has light processing for writing the polygon code, not the data value of the color, in the polygon code memory, and performs pixel processing such as mapping and rendering, synchronously with the horizontal and vertical signals of the display. Therefore, superimposing of painting or the like is not caused and the pixel processing becomes very light, compared to that of the first conventional example. However, with this conventional example, the image data itself to be processed is almost the same as that of the first conventional example, thereby there may be a case where the image is behind with respect to the movement of the observer, and the movement is not smooth.

With the fourth conventional example, the processing volume of the data can be reduced, by displaying a model with rougher accuracy. as the relative speed of the observer and the model in the virtual space increases. However, even if it is a model having a simplified rough accuracy, if a conventional texture is used as the texture to be attached thereon, the data volume of the texture becomes quite large. Therefore, there may be a case where the image cannot follow the movement of the observer.

As described above, according to the conventional apparatus, even when the observer moves around, the screen is generated and displayed with the same quality as that of when the observer stands still. Furthermore, drawing processing is frequently repeated which is necessary for the position of the observer who newly moved. Accordingly, the volume of processing increases, and the drawing processing cannot catch the movement of the head position, thus the drawing position is behind with respect to the movement of the head position.

Furthermore, in order to make a virtual space with reality, a texture having the high resolution is often used. However, in order to hold all the textures in the virtual space in the texture memory in the graphic apparatus, the capacity of the texture memory becomes quite large, which is not realistic. Moreover, the texture must be read in every time when the texture which is not present in the texture memory is required for the drawing. However, a lot of time is required for reading the texture having the high resolution at a time, which makes it difficult to generate an image at a high speed, thus the drawing position is behind with respect to the movement of the head position.

SUMMARY OF THE INVENTION

The present invention has been completed under this background. It is the object of the present invention to provide a three-dimensional image processing apparatus which can generate an image at a high speed by lightening the image processing, giving attention to the fact that the discrimination of the image in the moving direction deteriorates.

With a view to attaining the above object, the gist of the present invention is as follows.

The first gist of the present invention is a three-dimensional image generating apparatus for generating a two-dimensional image from a three-dimensional information, comprising:

movement-detecting means for detecting the movement information including the direction and the speed of the movement of the observer; pixel-selecting means for selecting the pixel of the image roughly in the moving direction of the observer based on the movement information; and image-generating means for generating an image from a value obtained by the pixel-selecting means.

The second gist of the present invention is a three-dimensional image generating apparatus according to the first gist, wherein the pixel-selecting means comprises compression means for compressing the image at a certain ratio in the moving direction of the observer, and restoration means for extracting and restoring the compressed image in units of pixels.

The third gist of the present invention is a three-dimensional image generating apparatus according to the second gist, wherein the compression means multiplies the coordinates of the pixel by a matrix transformation expression, which compresses the image in the moving direction of the observer.

The 4th gist of the present invention is a three-dimensional image generating apparatus according to the second gist, wherein the compression means rotates and coincides the moving direction of the observer to the X-axis or Y-axis in the screen coordinate system, then multiplies the coordinates of the pixel by a matrix transformation expression, which compresses the image in the direction of the coincided axis.

The 5th gist of the present invention is a three-dimensional image generating apparatus according to the second gist, wherein the compression means rotates and coincides the moving direction of the observer to the X-axis or Y-axis in the screen coordinate system, and multiplies the coordinates of the pixel by a matrix transformation expression which compresses the image in the direction of the coincided axis, then parallelizes at least two sides opposite to each other in the range of drawing before the compression to the corresponding two sides in the range of drawing after the compression.

The 6th gist of the present invention is a three-dimensional image processing apparatus according to the 5th gist, wherein the image generating means has memory means for storing the image information for each pixel, and generates the image by reading out the image information from the image memory means;

the compression means stores the image compressed with the matrix transformation expression in the memory means for each pixel; and the restoration means reads out and restores the pixel in the coordinates in which the coordinates of the pixel to be read out is multiplied by the matrix transformation expression from the left.

The 7th gist of the present invention is a three-dimensional image processing apparatus according to the 5th gist, wherein the image generating means has memory means for storing the image information for each pixel, and generates the image by reading out the image information from the image memory means;

the compression means stores the image compressed with the matrix transformation expression in the memory means for each pixel; and the restoration means reads out and restores the pixel in the coordinates in which the coordinates of the pixel to be read out is multiplied by the inverse matrix of the matrix transformation expression from the left.

The 8th gist of the present invention is a three-dimensional image processing apparatus according to the second gist, wherein the image generating means has memory means for storing the image information for each pixel, and generates the image by reading out the image information from the image memory means;

the compression means rotates and coincides the moving direction of the observer to the X-axis or Y-axis in the screen coordinate system, then multiplies the coordinates of the pixel by a matrix transformation expression, which compresses the image in the direction of the coincided axis and parallelizes the sides in the range of drawing after the compression to respective sides in the range of drawing before the compression, and stores the image compressed with the matrix transformation expression in the memory means for each pixel, and the restoration means expands and restores the image read out from the memory means.

The 9th gist of the present invention is a three-dimensional image generating apparatus according to the second gist, wherein the ratio decreases with the increase of the moving speed of the observer.

The 10th gist of the present invention is a three-dimensional image processing apparatus for attaching a texture to a two-dimensional image from the three-dimensional information to perform the image generation processing, which comprises:

main memory means for storing all the textures; texture memory means for storing textures necessary for the display read from the main memory means; movement-detecting means for detecting the moving speed of the observer; texture selecting means for selecting the texture having the resolution corresponding to the speed to allow the texture to be read in to the texture memory means; and image generating means for reading the texture from the texture memory means to generate an image.

The 11th gist of the present invention is a three-dimensional image processing apparatus for attaching a texture to a stereoscopic two-dimensional image from the three-dimensional information to perform the image generation processing, which comprises:

main memory means for storing all the textures; texture memory means for storing textures necessary for the display read from the main memory means; movement-detecting means for detecting the moving speed of the observer; object speed-detecting means for detecting the speed of the displayed object; a relative speed-detecting means for detecting the relative speed of the displayed object with respect to the observer, from the moving speed of the observer and the speed of the displayed object; texture selecting means for selecting the texture-having the resolution corresponding to the relative speed to allow the texture to be read in to the texture memory means; and image generating means for reading the texture from the texture memory means to generate an image.

The 12th gist of the present invention is a three-dimensional image processing apparatus for attaching a texture to a two-dimensional image from the three-dimensional information to perform the image generation processing, which comprises:

main memory means for storing all the textures; texture memory means for storing textures necessary for the display read from the main memory means; low resolution texture-selecting means for selecting a texture having the low resolution to allow the texture to be read in, when a new texture is read in from the main memory means to the texture memory means; high resolution texture-selecting means which allows a texture having the high resolution corresponding to the low resolution to be read in from the main memory means to the texture memory means, after the texture having the low resolution is read in; and image generating means for reading the texture from the texture memory means to generate an image.

The 13th gist of the present invention is a three-dimensional image processing apparatus for attaching a texture to a two-dimensional image from the three-dimensional information to perform the image generation processing, which comprises:

main memory means for storing all the textures; texture memory means for storing textures necessary for the display read from the main memory means; movement-detecting means for detecting the moving speed of the observer; texture selecting means which selects a texture having the low resolution as the moving speed increases, and selects a texture having the high resolution as the moving speed decreases, to allow the texture to be read in to the texture memory means; and image generating means for reading the texture from the texture memory means to generate an image.

The 14th gist of the present invention is a three-dimensional image processing apparatus for attaching a texture to a two-dimensional image from the three-dimensional information to perform the image generation processing, which comprises:

main memory means for storing all the textures; texture memory means for storing textures necessary for the display read from the main memory means; movement-detecting means for detecting the moving speed of the observer; object speed-detecting means for detecting the speed of the displayed object; relative speed-detecting means for detecting the relative speed of the displayed object with respect to the observer, from the moving speed of the observer and the speed of the displayed object; texture selecting means which selects a texture having the low resolution as the relative speed increases, and selects a texture having the high resolution as the relative speed decreases, to allow the texture to be read in to the texture memory means; and image generating means for reading the texture from the texture memory means to generate an image.

The 15th gist of the present invention is a three-dimensional image processing method for attaching a texture to a stereoscopic two-dimensional image from the three-dimensional information to perform the image generation processing, comprising the steps of:

detecting the moving speed of the observer, selecting the texture having the resolution corresponding to the speed, reading in the texture selected from the main memory means which stores all the textures to the texture memory means, and reading out the texture from the texture memory means to perform the image generation.

The 16th gist of the present invention is a three-dimensional image processing method for attaching a texture to a two-dimensional image from the three-dimensional information to perform the image generation processing, comprising the steps of:

detecting the moving speed of the observer, detecting the speed of the displayed object, detecting the relative speed of the displayed object with respect to the observer from the moving speed of the observer and the speed of the displayed object, selecting the texture having the resolution corresponding to the relative speed to allow the texture selected from the main memory means which stores all the textures to be read in to the texture memory means, and reading out the texture from the texture memory means to perform the image generation.

The 17th gist of the present invention is a three-dimensional image processing method for attaching a texture to a two-dimensional image from the three-dimensional information to perform the image generation processing, comprising the steps of:

when a new texture is read in from the main memory means which stores all the textures to the texture memory means, selecting a texture having the low resolution to be read in, then after reading in the texture having the low resolution, allowing the texture having the high resolution corresponding to the low resolution to be read in to the texture memory means from the main memory means, and reading out the texture from the texture memory means to perform the image generation.

The 18th gist of the present invention is a three-dimensional image processing method for attaching a texture to a two-dimensional image from the three-dimensional information to perform the image generation processing, comprising the steps of:

detecting the moving speed of the observer, and selecting a texture having the low resolution as the moving speed increases, and selecting a texture having the high resolution as the moving speed decreases, to allow the selected texture to be read in to the texture memory means from the main memory means which stores all the textures, and reading out the texture from the texture memory means to perform the image generation.

The 19th gist of the present invention is a three-dimensional image processing method for attaching a texture to a two-dimensional image from the three-dimensional information to perform the image generation processing, comprising the steps of:

detecting the moving speed of the observer, detecting the speed of the displayed object, detecting the relative speed of the displayed object with respect to the observer from the moving speed of the observer and the speed of the displayed object, selecting a texture having the low resolution as the relative speed increases, and selecting a texture having the high resolution as the relative speed decreases, to allow the selected texture to be read in to the texture memory means from the main memory means which stores all the textures, and reading out the texture from the texture memory means to perform the image generation.

BRIEF DESCRIPTION OF THE DRAWINGS

FIG. 24 is a graph showing the actual case where the texture resolution is changed according to the speed in the direction of observation of the observer.

FIGS. 27A and B are graphs showing the processing time for drawing polygons A, B, C and D in the 6th embodiment.

FIGS. 28A and B are graphs showing the processing time when a texture having the natural resolution is read in, in the 7th embodiment.

FIG. 33 is a graph showing the processing time when a texture having the natural resolution is read in.

DESCRIPTION OF THE PREFERRED EMBODIMENTS

The embodiments of the invention will now be described with reference to the accompanying drawings.

[First Embodiment]

Figure 6:
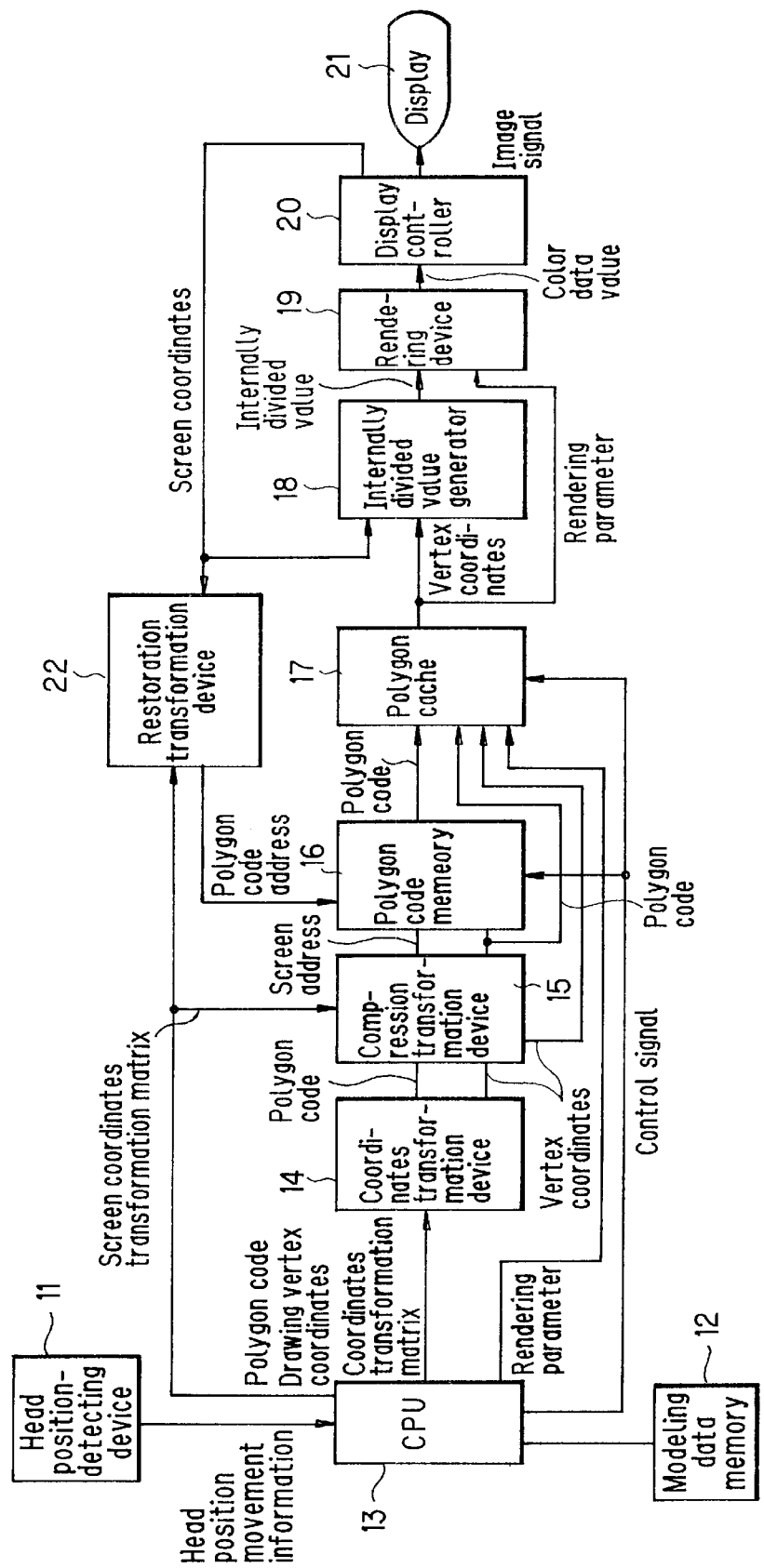
FIG. 6 is a block diagram showing the first embodiment of the three-dimensional image processing apparatus according to the present invention.

FIG. 6 is a block diagram showing the first embodiment of the three-dimensional image processing apparatus according to the present invention. This image processing apparatus includes pixel-selecting means for selecting the pixel of the image roughly in the moving direction of the observer additionally in the image processing apparatus of the third conventional example, and is composed of a head position-detecting device 11, an modeling data memory 12, a CPU 13, a coordinates transformation device 14, a compression transformation device 15, a polygon code memory 16, a polygon cache 17, an internally divided value generator 18, a rendering device 19, a display controller 20, a display 21 and a restoration transformation device 22.

The head position-detecting device 11 detects the position and the amount of movement (direction and speed) of the observer's head, and send the head position/movement information (moving direction and the moving speed) to the CPU 13. In this embodiment, it is assumed that the position of the observer's head is detected and the moving direction qo and the moving speed is calculated by the CPU 13 from the positional data for every hour. The modeling data memory 12 is a memory for storing a model in the virtual space.

The CPU 13 calculates the movement information from the positional data of the head from the head position-detecting device 11, calculates the screen coordinates transformation matrix based on the movement information, and outputs the transformation matrix to the compression transformation device 15 and the restoration transformation device 22. Furthermore, the CPU 13 outputs the polygon code and the drawing vertex coordinates and the coordinates transformation matrix of the polygon, based on the model data read out from the modeling data memory 12, to the coordinates transformation device 14. Similarly, the CPU 13 outputs the rendering parameter to the polygon cache 17. In addition, the CPU 13 controls the polygon code memory 16 and the polygon cache 17 with the control signal.

The coordinates transformation device 14 coordinates-transforms the input drawing vertex coordinates with the coordinates transformation matrix, and outputs the coordinates-transformed vertex coordinates corresponding to each polygon code to the compression transformation device 15. In addition, corresponding to each pixel constituting the screen, the coordinates transformation device 14 outputs the polygon code to the compression transformation device 15.

The compression transformation device 15 compression-transforms the drawing vertex coordinates after being coordinates-transformed in the moving direction of the observer with the screen coordinates matrix being output from the CPU 13, to obtain the screen address indicating the position to draw the polygon. The compression transformation device 15 then writes the coordinates-transformed vertex coordinates and the corresponding polygon code to the entry corresponding to the screen address of the polygon code memory 16.

The compression method performed based on the screen coordinates transformation matrix will be described later.

The restoration transformation device 22 is to restore the compressed image at the time of the screen display, and outputs the polygon code address to the polygon code memory 16 at the time of completion of the write of all the polygon code necessary for the drawing. This polygon code address is obtained from the screen coordinates from the display controller 20 and the screen coordinates transformation matrix from the CPU 13. The compressed image data of the polygon code memory 16 corresponding to the pixel to be displayed on the display 21 is then read out to the polygon cache 17.

The compression transformation device 15 and the restoration transformation device 30 can be considered to be the pixel-selecting means for roughly selecting the pixel of the image in the moving direction of the observer.

The polygon code memory 16 is composed of two memories having the entry of (number of horizontal pixels which can accept the actual rendering region for storing the polygon code)×(number of vertical pixels of the screen). The polygon code is stored in the screen address indicated by the compression transformation device 15, and the polygon code is read out from the polygon code address indicated by the restoration transformation device 22, and sent to the polygon cache 17.

The polygon cache 17 is composed of two buffer memories having the entry of the maximum number of the polygon code. In these buffer memories, the vertex coordinates from the coordinates transformation device 14 and the rendering parameter from the CPU 13 are stored alternately according to the control signal, at a position indicated as an address by the polygon code being output from the compression transformation device 16. The polygon code to be drawn is then stored therein from the polygon code memory 16. The polygon cache 17 sends the vertex coordinates having contents indicated by the polygon code (address) and the rendering parameter to the internally divided value generator 18.

To the internally divided value generator 18, the vertex coordinates of the polygon corresponding to the screen coordinates is given from the polygon cache 17, and the internally divided value generator 18 calculates the internally divided value and outputs the value to the rendering device 19.

The rendering device 19 generates a color data value from the internally divided value of each polygon and the rendering parameter, and outputs the value to the display controller 20.

The display controller 20 receives the color data value of the pixel position on the screen to generate the image signal, and outputs the signal to the display 21 of a raster scanning mode to display the image. Furthermore, the display controller 20 outputs the coordinates of the pixel to be displayed on the screen to the internally divided value generator 18 and the restoration transformation device 22.

The operation of the three-dimensional image display apparatus of the first embodiment will now be described. The operation of this apparatus is divided into two processing on the drawing side and on the display side. The processing on the drawing side is to generate the configuration of the polygon. On the other hand, the processing on the display side is to determine the color of the pixel constituting the polygon plane and display it on the display 21.

First, the processing on the drawing side will be described.

The CPU 13 reads out the application data from the modeling data memory 12 according to the operation of the user, and generates three drawing vertex coordinates of the triangle polygon whose configuration is to be displayed, the polygon code and the coordinates transformation matrix to output them to the coordinates transformation device 14. Moreover, The CPU 13 outputs the rendering parameter, one set for each vertex, in total three sets, to the polygon cache 17. In addition, the CPU 13 receives the head position from the head position-detecting device 11 to calculate the movement information, and calculates the screen coordinates transformation matrix based on the movement information. The CPU 13 then outputs the screen coordinates transformation matrix to the compression transformation device 15 and the restoration transformation device 22. This screen coordinates transformation matrix is the transformation matrix depending upon the moving direction of the head position which is used for roughly selecting the pixel. This will be described later.

With the coordinates transformation device 14, the 4×4 coordinates transformation matrix is used for the coordinates transformation, therefore the coordinates of three vertexes of the polygon are expressed in the format of (x, y, z, 1). The vertex coordinates is multiplied by 4×4 coordinates transformation matrix from the left to normalize, and to generate the coordinates of three vertexes, $(x_1, Y_1, Z_1)$, $(x_2, y_2, z_2)$, $(x_3, y_3, Z_3)$ corresponding to each polygon code.

Figure 7:
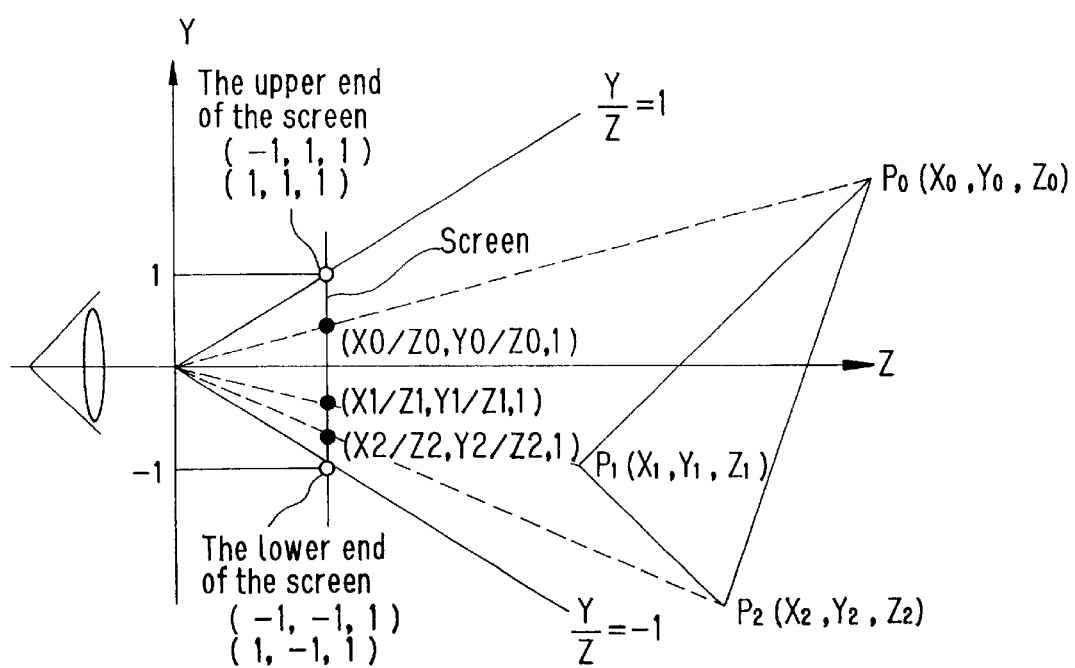
FIG. 7 is a graph showing the relationship between the three-dimensional coordinates where a solid is present and a plane of z=1 which is to be a screen.

FIG. 7 shows the relationship between the three-dimensional coordinates where a solid is present and a plane of z=1 which is to be a screen. The screen is set in a range of $-1 \leq y/z \leq 1$ and $-1 \leq x/z \leq 1$, and as shown in FIG. 7, the uppermost coordinates on the screen becomes (1, 1, 1) and (−1, 1, 1), and the lowermost coordinates becomes (1, −1, 1) and (−1, −1, 1). Here, the point P0 (x0, y0, z0) on the three-dimensional coordinates is projected on the coordinates (x0/z0, y0/z0, 1) on the screen. Similarly, the point P1 (x1, y1, z1) is projected on the coordinates (x1/z1, y1/z1, 1) on the screen, and the point P2 (x2, y2, z2) is projected on the coordinates (x2/z2, y2/z2, 1) on the screen.

Since the screen is set in the above-mentioned region, the region to draw the polygon becomes the portion enclosed with $-1 \leq y/z \leq 1$ and $-1 \leq x/z \leq 1$, and z=near and z=far. Here, "near" and "far" are positive values defined by the user.

Here, the z value in the screen coordinate system is a value used for the comparison of the depth, and even if the z value is changed, the area of the drawing region does not change. Therefore, hereinafter it is sufficient to consider the two-dimensional coordinate system projected on the X-Y plane of the screen coordinate system from the screen coordinate system, instead of the consideration in the screen coordinate system. It is a matter of course that it may be expressed in the three-dimensional coordinate system so that the z value is constant in the affine transformation matrix.

This region is a region where the drawing has been performed in the apparatus of the third conventional example. This region is compressed using the screen transformation matrix depending upon the moving direction of the head position. That is to say, when the screen transformation matrix obtained with any one of the compression method described later is multiplied from the left, the actual rendering area becomes narrower than the above-mentioned region. The compression method by means of the screen transformation matrix will now be described.

Figure 8:
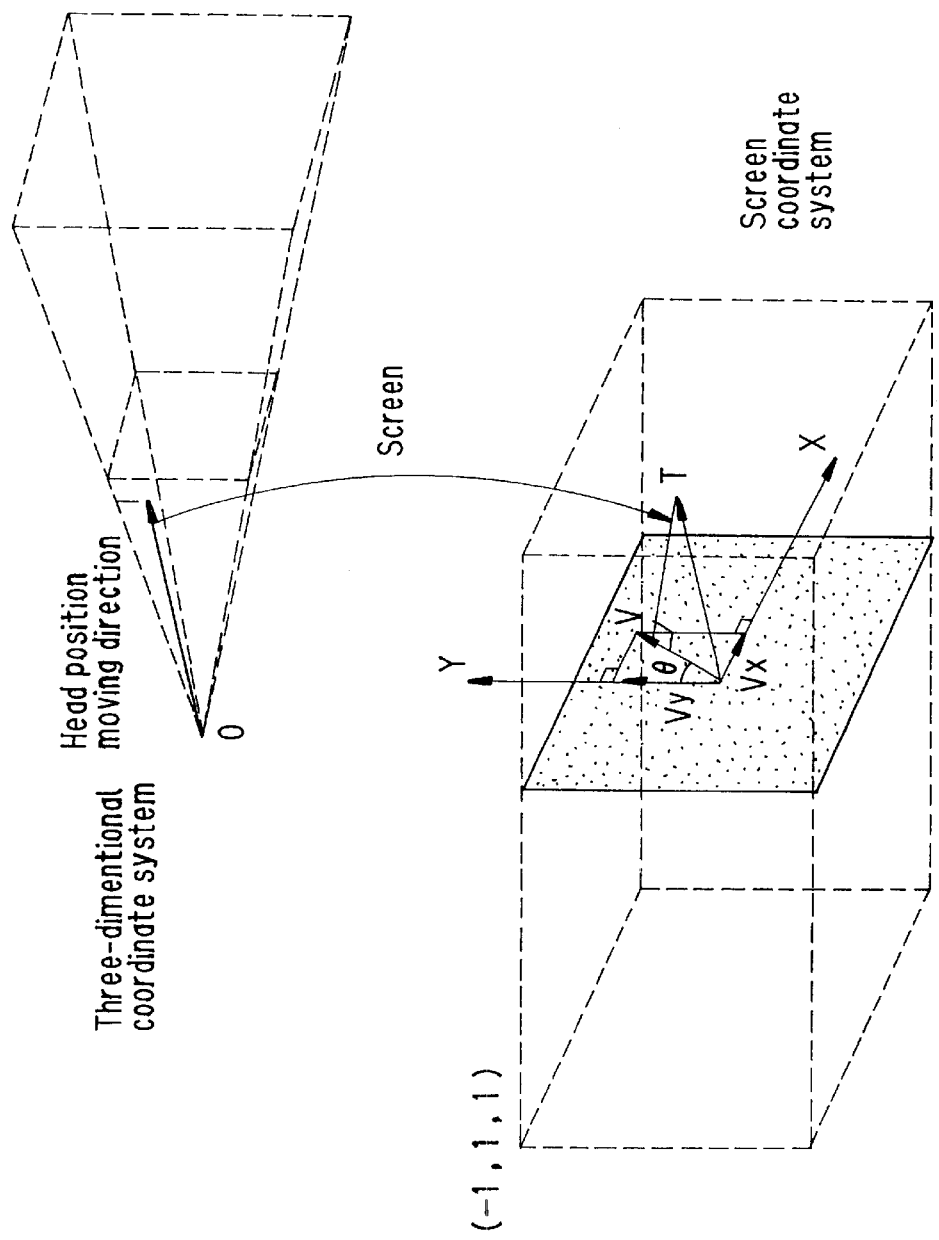
FIG. 8 is a graph showing the three-dimensional coordinate system representing the movement of the head position.

First, as shown in FIG. 8, a vector in the three-dimensional coordinate system which represents the movement of the head position is designated as T, and a vector projected on the screen coordinate system is designated as $T_1$, then the vector $T_1$ is projected from the screen coordinate system on the X-Y plane in the screen coordinate system, and the vector made into a unit vector is designated as V(Vx,Vy). Moreover, the angle between this vector V and the Y axis is designated as $\theta$, and the compression rate is designated as $\alpha$ in the following description.

(1) First Compression Method

Figure 9:
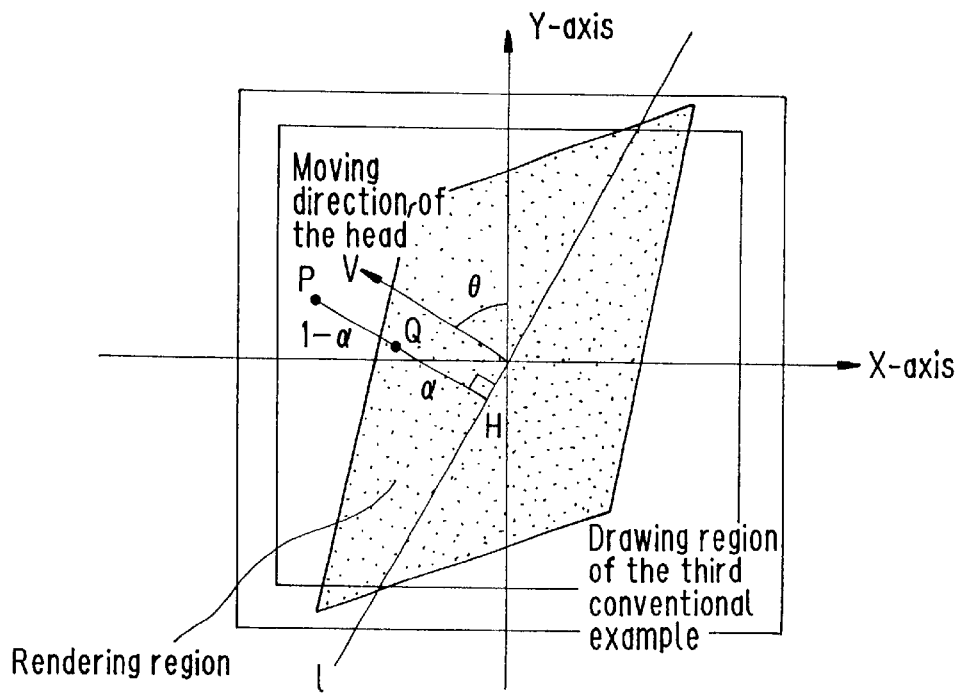
FIG. 9 is a graph showing the first compression method.

FIG. 9 is a graph showing the first compression method. As shown in FIG. 9, the foot of normal drawn from an optional point P in the drawing region to a line 1 orthographic to the moving direction V of the head position is designated as H, and a point to internally divide the segment PH into $1-\alpha:\alpha$ is designated as Q.

By multiplying the following screen coordinates transformation matrix to the coordinates of the point P from the left, the point P is transformed to the point Q.

$$\begin{pmatrix} \cos\theta & \sin\theta & 0 \\ -\sin\theta & \cos\theta & 0 \\ 0 & 0 & 1 \end{pmatrix} \begin{pmatrix} 1 & 0 & 0 \\ 0 & \alpha & 0 \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} = \begin{pmatrix} \alpha Vx^2 + Vy^2 & (1-\alpha)VxVy & 0 \\ (1-\alpha)VxVy & Vx^2 + \alpha Vy^2 & 0 \\ 0 & 0 & 1 \end{pmatrix}$$

Therefore, the region to render the polygon is compressed by $\alpha$ in the moving direction of the head position. As a result, the actual rendering area becomes narrow, and the drawing processing can be omitted by the difference, making it possible to shorten the drawing time on the screen. This method is the base of the method described below.

In addition, the area of the region to be rendered in this method is, as shown in FIG. 9, $\alpha$ times as large as the area of the drawing region in the third conventional example, causing a disadvantage that the rendering region is compressed in the moving direction V and expanded in the direction of the line l, and does not go into the drawing region of the third conventional example. Therefore, it is necessary to make the drawing region large in the X-axis and Y-axis directions by the amount.

(2) Second Compression Method

With this compression method, under a certain condition, it is only necessary to set the expanded drawing region in the direction of the X-axis only. When the compression rate $\alpha$ is not larger than $2^{1/2}/2$, if the direction of compression is coincided with the Y-axis, it is not necessary to increase the polygon code memory 16 in the Y direction.

Figure 10:
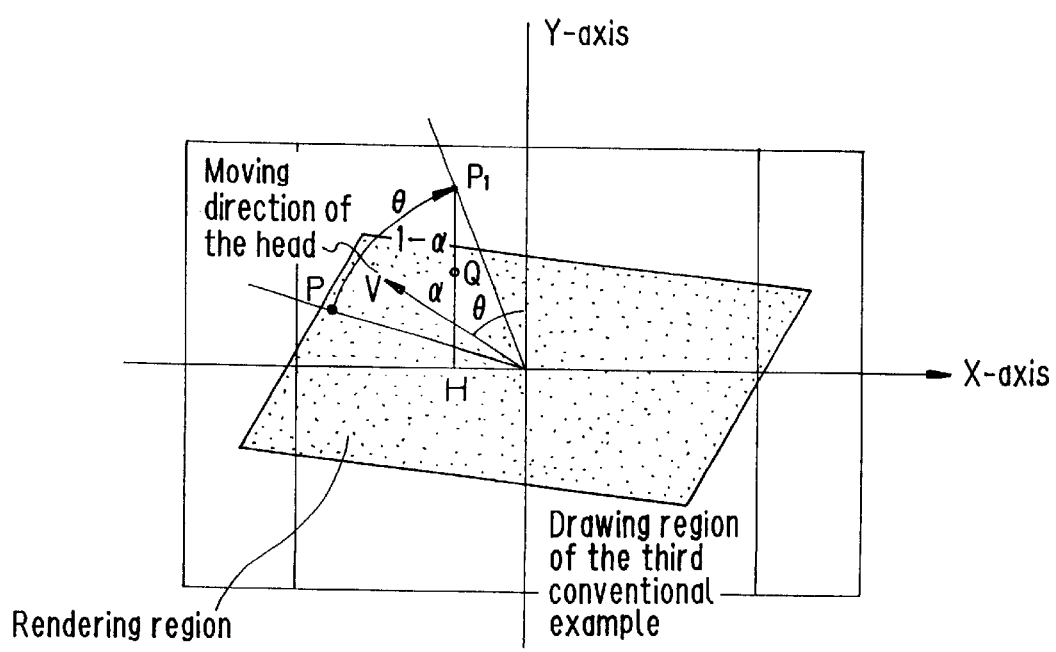
FIG. 10 is a graph showing the second compression method.

In the second compression method, after a rotation matrix which coincides the moving direction of the head position with the axis is applied, a matrix transformation expression which performs compression is obtained. FIG. 10 is a graph showing the second compression method. An optional point in the drawing region is designated as P, and the result that the point P is rotated so as to match the moving direction of the head position to the direction of Y-axis is designated as $P_1$, and a point where the point P is reduced by $\alpha$ in the direction of Y-axis is designated as Q.

By multiplying the following screen coordinates transformation matrix to the coordinates of the point P from the left, the point P is transformed to the point Q.

$$\begin{pmatrix} 1 & 0 & 0 \\ 0 & \alpha & 0 \\ 0 & 0 & 1 \end{pmatrix} \begin{pmatrix} \cos\theta & \sin\theta & 0 \\ -\sin\theta & \cos\theta & 0 \\ 0 & 0 & 1 \end{pmatrix} = \begin{pmatrix} Vy & -Vx & 0 \\ \alpha Vx & \alpha Vy & 0 \\ 0 & 0 & 1 \end{pmatrix}$$

Therefore, the region to render the polygon is compressed by $\alpha$ in the moving direction of the head position (in the direction of Y-axis). As a result, the actual rendering area becomes narrow, and the drawing processing can be omitted by the difference, making it possible to shorten the drawing time on the screen.

The reason why it is restricted to the case of not larger than $2^{1/2}/2$ is that the region overruns most when the region in the third conventional example is rotated by 45°, therefore, the transformation region always goes into the region of the third conventional example where the compression rate is $2^{1/2}/2$ or below.

The area of the region to be rendered in this method becomes $\alpha$ times as large as the area of the drawing region in the third conventional example, causing a disadvantage that the rendering region is expanded in the direction of X-axis, and does not go into the drawing region of the third conventional example. Therefore, it is necessary to make the drawing region large in the direction of X-axis by the amount.

(3) Third Compression Method

When the compression rate $\alpha$ is not larger than $2^{1/2}/2$, if the direction of compression is coincided with the X-axis, it is not necessary to increase the polygon code memory 16 in the X direction.

In this compression method, after a rotation matrix which coincides the moving direction of the head position with the axis is applied, a matrix transformation expression which performs compression is obtained.

Figure 11:
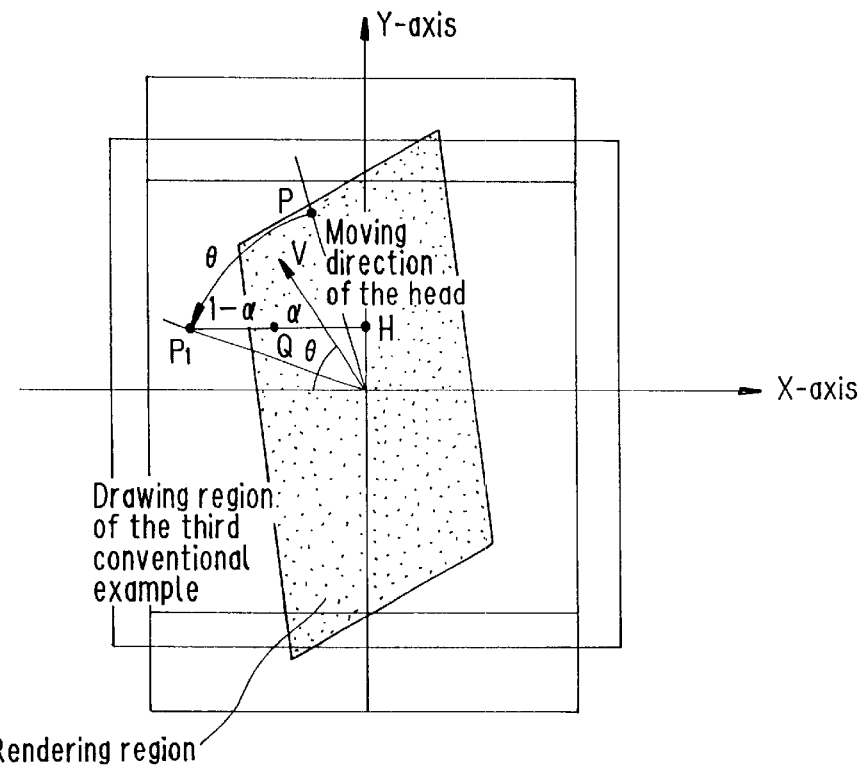
FIG. 11 is a graph showing the third compression method.

FIG. 11 is a graph showing the third compression method. An optional point in the drawing region is designated as P, and the result that the point P is rotated so as to match the moving direction of the head position to the direction of X-axis is designated as $P_1$, and a point where the point P is reduced by $\alpha$ in the direction of X-axis is designated as Q.

By multiplying the following screen coordinates transformation matrix to the coordinates of the point P from the left, the point P is transformed to the point Q.

$$\begin{pmatrix} \alpha & 0 & 0 \\ 0 & 1 & 0 \\ 0 & 0 & 1 \end{pmatrix} \begin{pmatrix} \cos\theta & -\sin\theta & 0 \\ \sin\theta & \cos\theta & 0 \\ 0 & 0 & 1 \end{pmatrix} = \begin{pmatrix} \alpha Vx & -\alpha Vy & 0 \\ Vy & Vx & 0 \\ 0 & 0 & 1 \end{pmatrix}$$

Therefore, the region to render the polygon is compressed by α in the moving direction of the head position (in the direction of X-axis). As a result, the actual rendering area becomes narrow, and the drawing processing can be omitted by the difference, making it possible to shorten the drawing time on the screen.

The above-mentioned method has a disadvantage that the actual rendering region does not go into the drawing region of the third conventional example. Therefore, it is necessary to make the drawing region large in the direction of Y-axis by the amount.

(4) Fourth Compression Method

When a polygon is drawn, after performing the line segmentation in the direction of Y-axis, the pixel segmentation in the direction of X-axis is performed. Therefore, if the number of line segmentation is reduced, that is, if the actual length in the direction of Y-axis in the rendering region is made minimum, the drawing speed is improved. For that purpose, it is only necessary that the one edge of the drawing region is parallel with the X-axis. With this method, the condition that the compression rate α is not larger than $2^{1/2}/2$ is not necessary.

Figure 12:
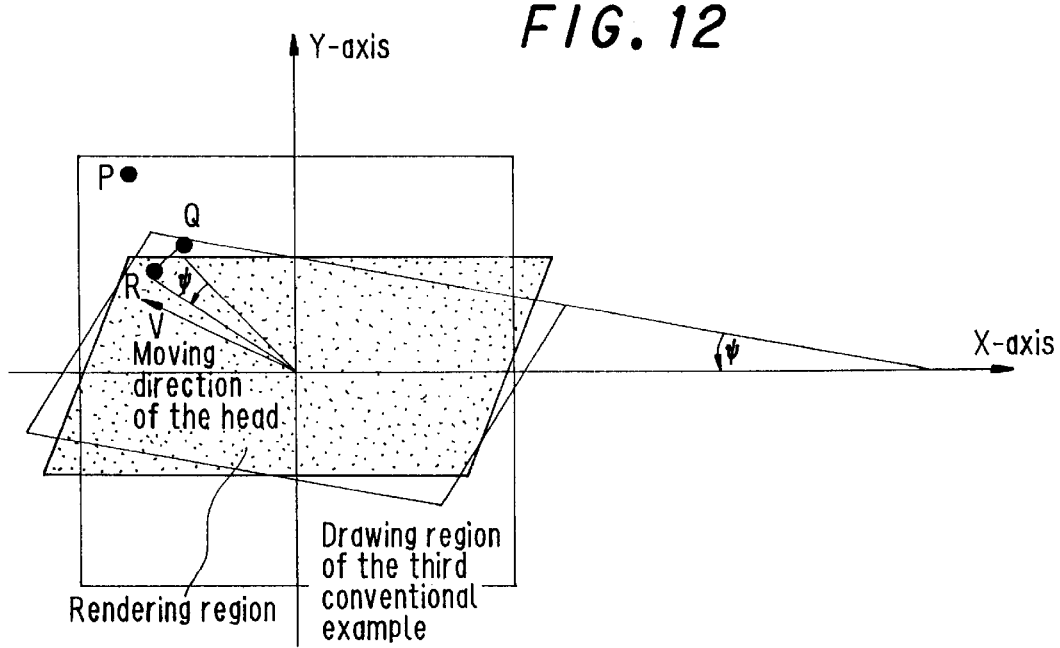
FIG. 12 is a graph showing the fourth compression method.

FIG. 12 is a graph showing the fourth compression method. An optional point in the drawing region is designated as P, and the result that the point P is subjected to the transformation using the matrix transformation expression obtained with the method 2 is designated as Q. In addition, an angle between one edge of the drawing region and the X-axis is designated as ø, and a point where rotation is performed by ø is designated as R.

By multiplying the following matrix transformation expression to the coordinates of the point P from the left, the point P is transformed to the point R.

$$\begin{pmatrix} \cos\phi & -\sin\phi & 0 \\ \sin\phi & \cos\phi & 0 \\ 0 & 0 & 1 \end{pmatrix} \begin{pmatrix} Vy & -Vx & 0 \\ \alpha Vx & \alpha Vy & 0 \\ 0 & 0 & 1 \end{pmatrix} =$$

$$\frac{1}{\sqrt{\alpha^2 Vx^2 + Vy^2}} \begin{pmatrix} \alpha^2 Vx^2 + Vy^2 & (1-\alpha^2)VxVy & 0 \\ 0 & -\alpha & 0 \\ 0 & 0 & 1 \end{pmatrix}$$

Therefore, the region to render the polygon is compressed by α in the moving direction of the head position. As a result, the actual rendering area becomes narrow, and the drawing processing can be omitted by the difference, making it possible to shorten the drawing time on the screen.

The above-mentioned method has a disadvantage that the actual rendering region does not go into the drawing region of the third conventional example. Therefore, it is necessary to make the drawing region large in the direction of X-axis by the amount.

Here, the drawing region is made parallel to the direction of X-axis, but it may be parallel to the direction of Y-axis. In either case, the drawing region in the vertical direction to the parallelized direction exists in the drawing region before the compression.

(5) Fifth Compression Method

Even the above-mentioned fourth compression method has a disadvantage that the actual rendering area does not go into the drawing region of the third conventional example. This is because there is an edge that is not parallel to the axis. Therefore, if a transformation for parallelizing this edge to the Y-axis is performed without changing the actual rendering area, the actual rendering region goes into the drawing region of the third conventional example. Accordingly, each edge in the drawing region becomes parallel to the directions of X-axis and Y-axis. It is in the following method that such an improvement was performed.

Figure 13:
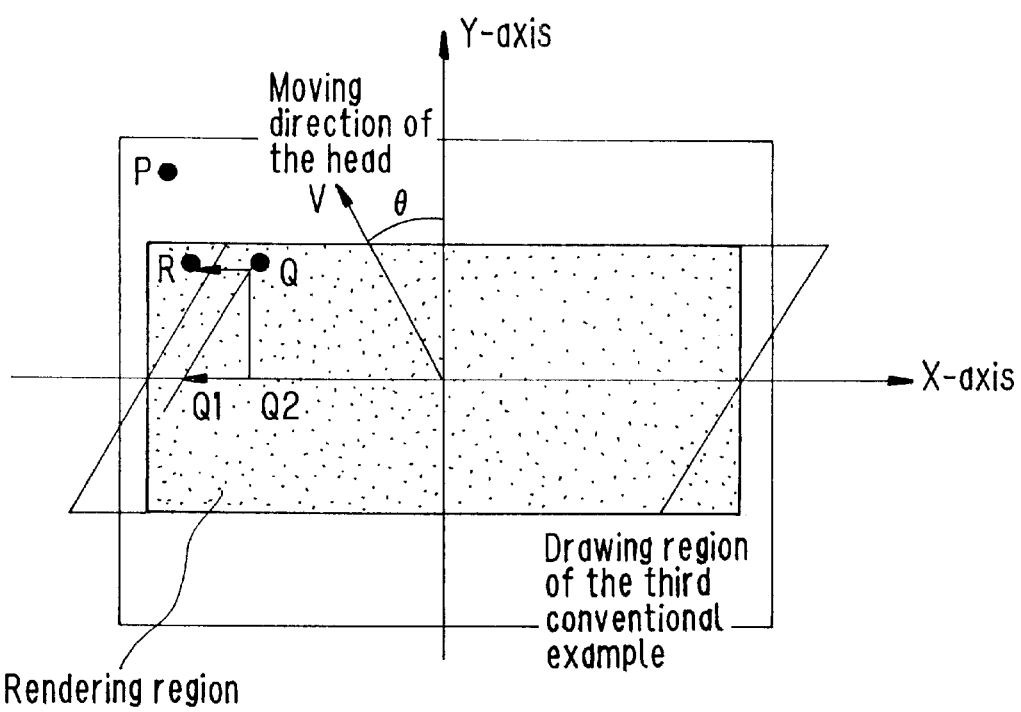
FIG. 13 is a graph showing the fifth compression method.

FIG. 13 is a graph showing the fifth compression method. An optional point in the drawing region is designated as P, and the result that the matrix of the third compression method is applied to the point P is designated as Q. In addition, a point where the point Q is moved in the direction of X-axis by the distance between the point Q1 where a segment which is parallel to the edge that is not parallel to the X-axis in the drawing region and passes through Q intersects with the X-axis, and a foot of normal Q2 drawn to the X-axis is designated as R.

By multiplying the following screen coordinates transformation matrix to the coordinates of the point P from the left, the point P is transformed to the point R.

$$\begin{pmatrix} 1 & \frac{\alpha}{(1-\alpha^2)VxVy} & 0 \\ 0 & 1 & 0 \\ 0 & 0 & 1 \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} Vy & -Vx & 0 \\ \alpha Vx & \alpha Vy & 0 \\ 0 & 0 & 1 \end{pmatrix} =$$

$$\frac{1}{\sqrt{\alpha^2 Vx^2 + Vy^2}} \begin{pmatrix} \alpha^2 Vx^2 + Vy^2 & 0 & 0 \\ 0 & -\alpha & 0 \\ 0 & 0 & 1 \end{pmatrix}$$

Figure 14:
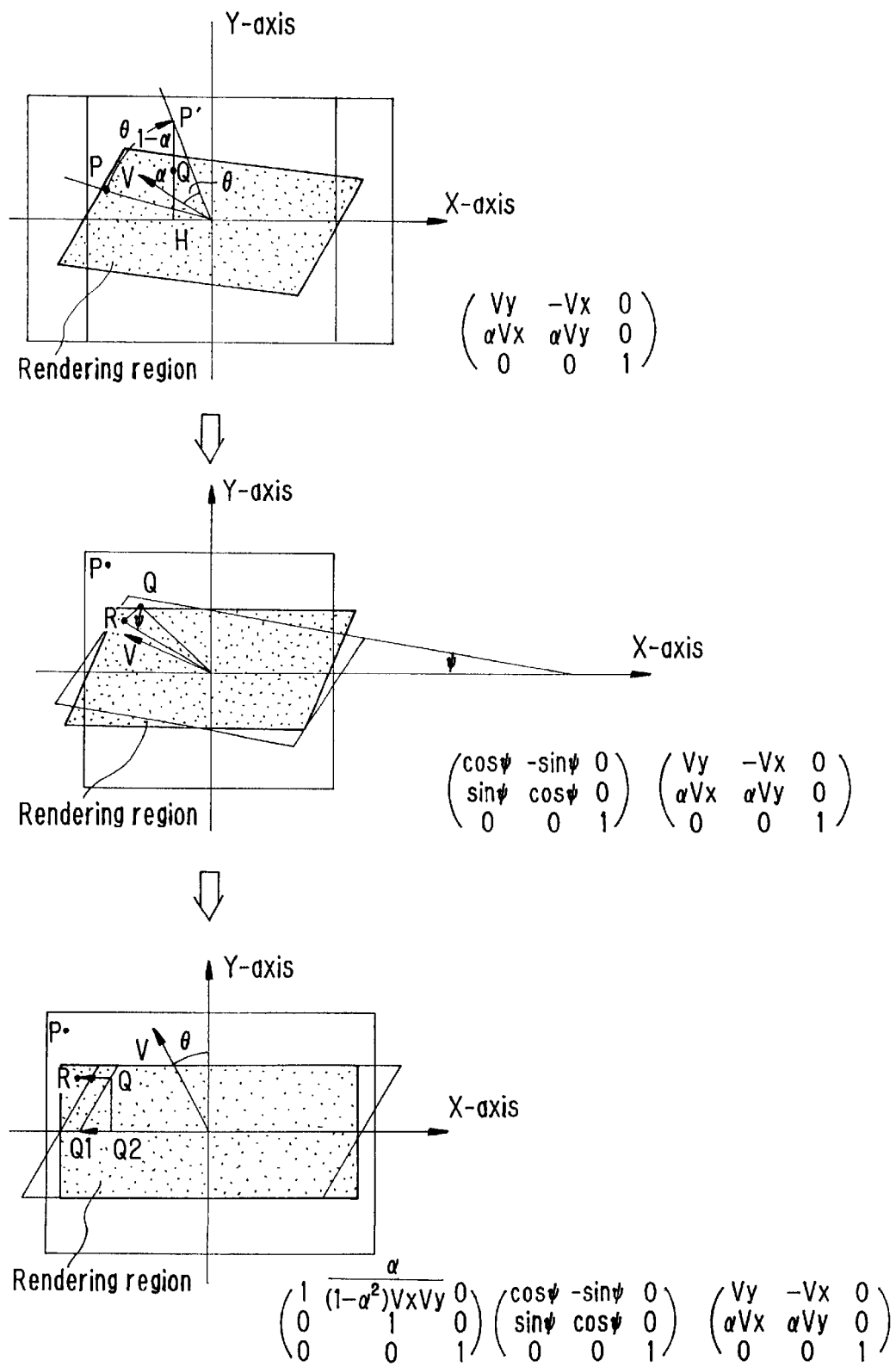
FIG. 14 is a graph showing the change in the rendering region by the matrix transformation processing.

FIG. 14 shows how the region to be rendered is changed with the above-mentioned matrix transformation processing. That is to say, multiplying each matrix from the left means to change the region to be rendered in the order of from the second compression method, through the fourth compression method to the fifth compression method. As described above, the region to render the polygon is compressed in the directions of X-axis and Y-axis, and there is no portion which does not exceed the third conventional example. As a result, the actual rendering area becomes narrow, and the drawing processing can be omitted by the difference, making it possible to shorten the drawing time on the screen.

Figure 15:
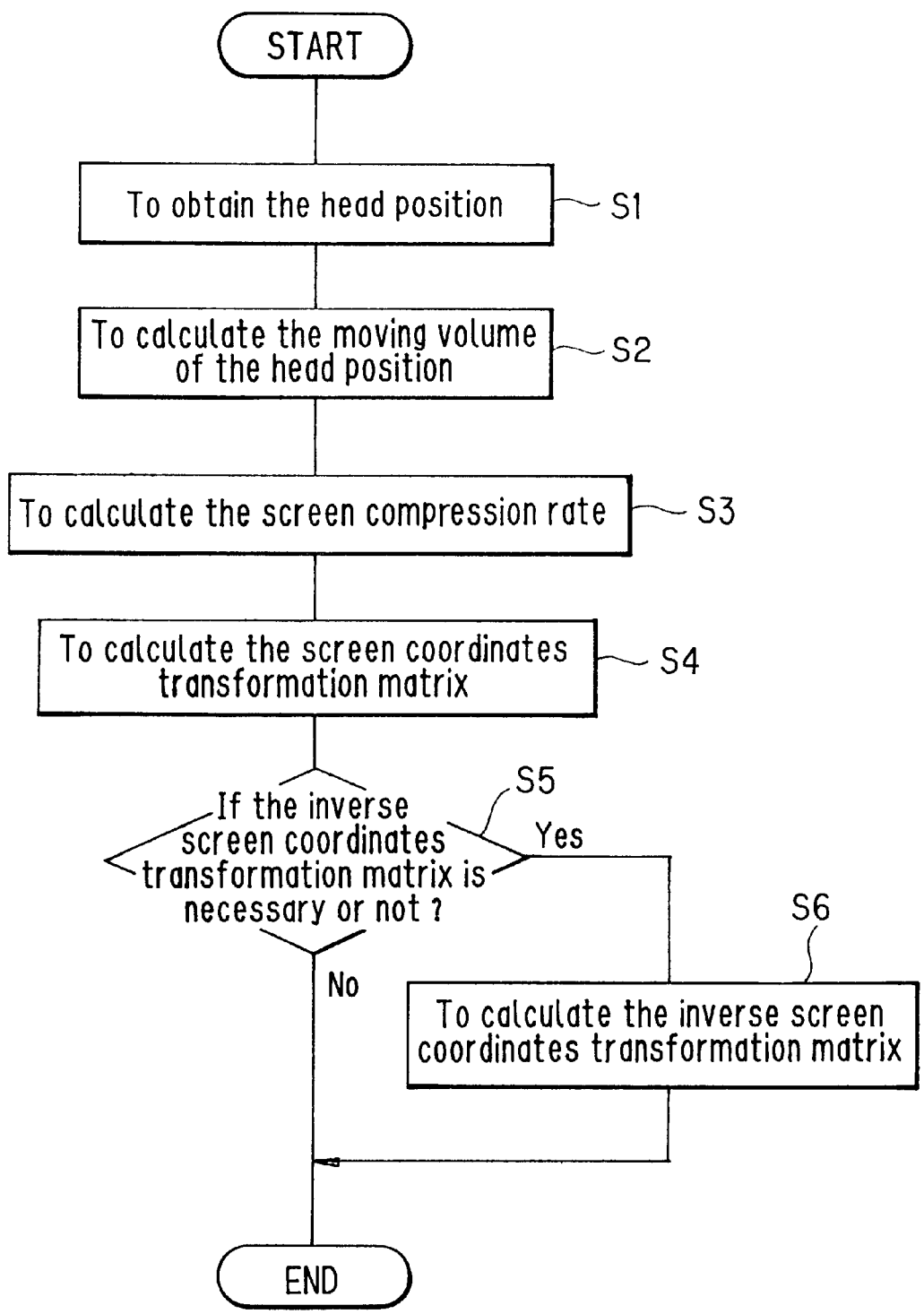
FIG. 15 is a flow chart showing the CPU operation for calculating the screen coordinates transformation matrix.

FIG. 15 is a flow chart showing the CPU operation for calculating such a screen coordinates transformation matrix. The head position-detecting device 11 detects the head position, and outputs the detection result to the CPU 13. The CPU 13 obtains this head position data from the head position-detecting device 11 (Step S1), takes the difference from the previous head position data, and determines the amount of movement of the head position (Step S2).

In general, from the relationship between the dynamic eyesight of the human body and the speed-of the head position, as the head is moved faster, the dynamic eyesight drops, and the cognition with respect to the object decreases. Therefore, when the head is moved fast, even with a rough image, there is no unnatural feeling. Rather, if the image of the screen does not follow the movement of the head, it will give an unnatural feeling. Therefore, in order to reduce the image data volume so that the image on the screen can follow the moving speed of the head, the CPU 13 calculates the screen compression rate based on the moving speed (Step S3). This calculation may be given in a relational expression or in a table.

Next, calculation is made for the screen coordinates transformation matrix from the moved amount of the head position and the screen compression rate (Step S4). There are five types of the screen coordinates transformation matrix, as described above. If necessary (Step S5), the inverse screen coordinates transformation matrix for performing the processing on the display side is calculated (Step S6). In this embodiment, since the drawing processing and the display processing can be performed with the screen coordinates transformation matrix, the calculation in Step S6 is not performed.

With the screen coordinates transformation matrix obtained as described above, the compression transformation device 15 compresses the vertex coordinates and the polygon code being output from the coordinates transformation device 14. Furthermore, the compression transformation device 15 generates the screen address instead of each pixel constituting the polygon plane, and writes the polygon code in the entry of the polygon code memory 16 indicated by this value.

The polygon code memory 16 is composed of two memories having the capacity of the number of pixels on the screen, in order to perform display while drawing. While one memory is used on the drawing side, the other memory is used on the display side. Similarly, the polygon cache 404 is composed of two, and while one polygon cache is used on the drawing side, the other is used on the display side.

At the time of completion of the write into the polygon code memory 16 and the polygon cache 17, after performing the polygon processing necessary for the display of one screen, the CPU 13 swaps the drawing side and the display side of the polygon code memory 16 and the polygon cache 17, using the control signal. This processing is referred to as the swap buffer processing, thereby the data whose write is completed can be referred to from the device on the display side.

The processing on the display side will now be described.

The display controller 20 generates the screen coordinates synchronously with the horizontal and vertical scanning of the display 21.

The restoration transformation device 22 generates the polygon code address from the screen coordinates, using the image transformation matrix received from the CPU 13.

The polygon code memory 16 outputs the polygon code stored at the position indicated by the polygon code address to the polygon cache 17. The polygon cache 17 outputs the vertex coordinates for the three vertexes and the rendering parameter stored at a position indicated by the polygon code, and inputs the screen coordinates and the three vertex coordinates to the internally divided value generator 18. The internally divided value generator 18 calculates the position of the polygon plane defined by the three vertex coordinates projected on the screen position indicated by the screen coordinates.

Furthermore, the internally divided value and the three sets of the rendering parameters are input to the rendering device 19. The rendering device 19 interpolates the three sets of the rendering parameters, and calculates the color data value in the position indicated by the internally divided value. The color data value is input to the display controller 20 from the rendering device 19, converted to the image signal and output to the display 21. The display processing of one pixel on the screen is performed as described above. This processing is repeated for the number of screens on the display, and the display processing for one screen is completed.

As described above, since the pixel-selecting means for roughly selecting the pixel of the image in the moving direction of the observer based on the movement information is provided, the number of pixels to be image-processed is reduced, resulting in the reduced processing time, and an image can be formed following the movement of the observer. Since the dynamic eyesight of the human body decreases as the moving speed of the observer increases, even if the pixel of the image is roughly selected in the moving direction of the observer, the deterioration of the image quality cannot be perceived. Using the same matrix transformation for the compression means and the restoration means, it is possible to generate an image in which the pixel of the image is roughly selected in the moving direction of the observer.

[Second Embodiment]

Figure 16:
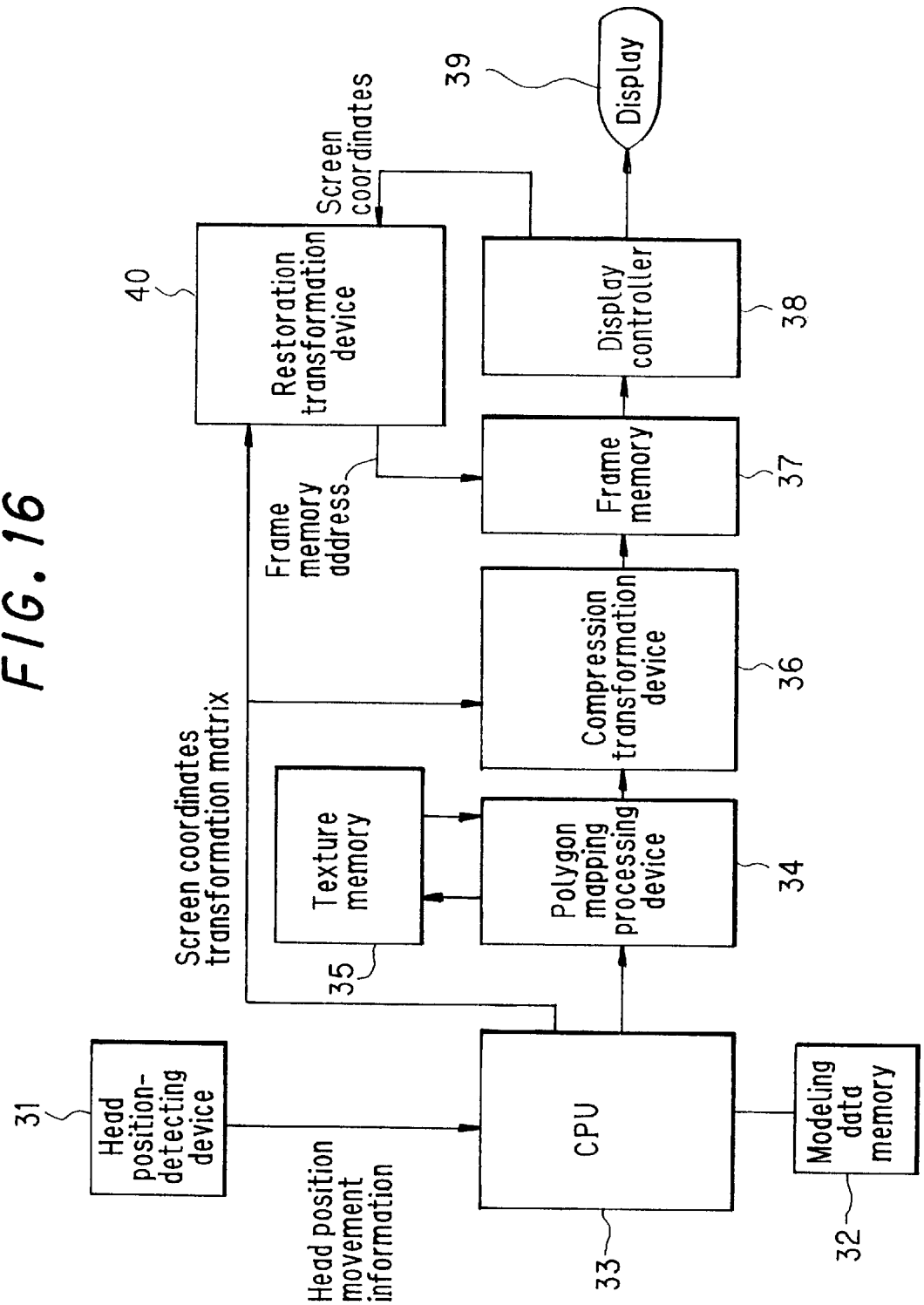
FIG. 16 is a block diagram showing the second embodiment of the three-dimensional image processing apparatus according to the present invention.

FIG. 16 is a block diagram showing the second embodiment of the three-dimensional image processing apparatus according to the present invention.

This image processing apparatus comprises a head position-detecting device 31, an modeling data memory 32, a CPU 33, a polygon mapping processing device 34, a texture memory 35, a compression transformation device 36, a frame memory 37, a display controller 38, a display 39 and a restoration transformation device 40.

The portion having the same role with the first embodiment will be simplified to describe the respective sections.

The head position-detecting device 31 detects the position and the amount of movement of the head, and send the head position/movement information to the CPU 33. The CPU 33 receives the head position/movement information from the head position-detecting device 31, calculates the screen coordinates transformation matrix, and sends the screen coordinates transformation matrix to the compression transformation device 36 and the restoration transformation device 40.

Moreover, the CPU 33 executes the modeling transformation, projective transformation and the like, using a parameter defining the polygon, application software and the operation data obtained according to the operation of the operator, transforms the parameter of the corresponding polygon to form a polygon image, and outputs the parameter in sequence to the polygon mapping processing device 34.

The polygon mapping processing device 34 takes in the texture data corresponding to the polygon among the input parameter of the polygon from the texture memory 35, and while applying the texture data to each polygon, subjects each polygon to the blinding processing, and outputs the results to the compression transformation device 36. The compression transformation device 36 compresses the image based on the screen coordinates transformation matrix from the CPU 33, and outputs the compressed image to the frame memory 37. The polygon image generated by the polygon mapping processing device 34 is written in the frame memory 37 as a frame picture.

The screen coordinates value from the display controller 38 is transformed to the frame memory address by the restoration transformation device 40, thereby the content of the frame memory 37 is read out, and being output from the display controller 38 to the display 39 in sequence.

With this three-dimensional image processing apparatus, the processing volume increases and the processing speed becomes slow compared to the apparatus of a type performing the image generation processing with the polygon At code, as in the first embodiment, however, it is not a level which becomes a problem in the practical use.

[Third Embodiment]

Figure 17:
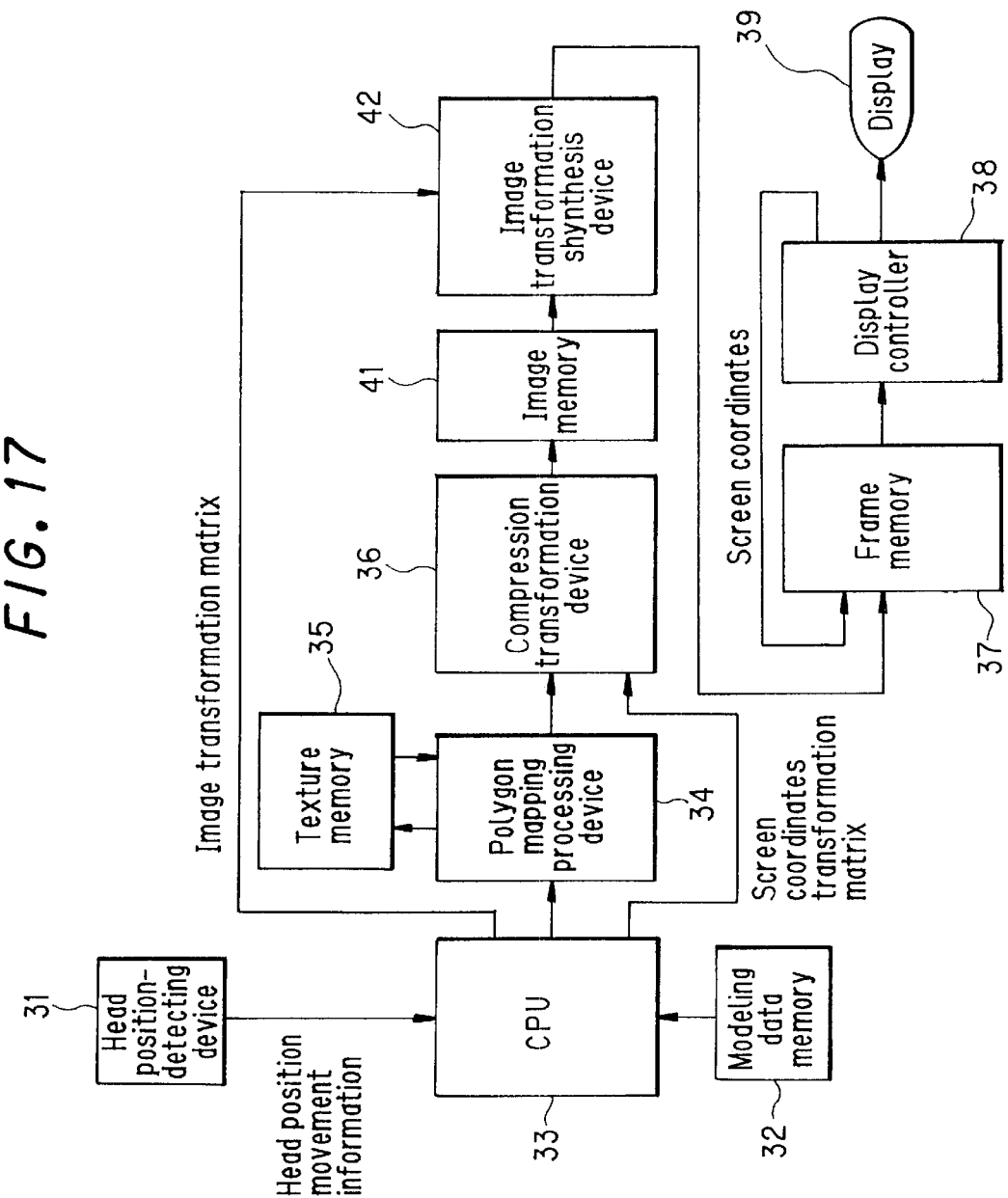
FIG. 17 is a block diagram showing the third embodiment of the three-dimensional image processing apparatus according to the present invention.

FIG. 17 is a block diagram showing the third embodiment of the three-dimensional image processing apparatus according to the present invention.

This apparatus has basically almost the same construction with that of the second embodiment, therefore, the same reference numeral is given to the same part, whose explanation will be omitted. The characteristic of this apparatus is that it includes an image memory 41 and an image transformation/synthesis device 42.

With this processing apparatus, the head position-detecting device 31 detects the position and the amount of movement of the head, and send the head position/movement information to the CPU 33. The CPU 33 receives the head position/movement information from the head position-detecting device 31, calculates the screen coordinates transformation matrix and image transformation matrix, and sends the screen coordinates transformation matrix to the compression transformation device 36 and sends the image transformation matrix to the image transformation/synthesis device 42. The two matrices are in the relationship of inverse matrix. Accordingly, in the flow chart of FIG. 15, the CPU 33 requires the inverse transformation matrix, and calculates the inverse matrix of the screen coordinates transformation matrix (image transformation matrix) (Step S7).

The polygon mapping processing device 34 takes in the texture data corresponding to the polygon among the input parameter of the polygon from the texture memory 35, and while applying the texture data to each polygon, subjects each polygon to the blinding processing, and outputs the results to the compression transformation device 36. The compression transformation device 36 compresses the image based on the screen coordinates transformation matrix from the CPU 33, and outputs the compressed image to the image memory 35. The polygon image generated by the compression transformation device 36 is written in the image memory 41 as a frame picture.

The image transformation/synthesis device 42 reads out the content of the image memory 41, adds the transformation with the image transformation matrix sent from the CPU 33, and writes the transformed content in the frame memory 37.

The content of the frame memory 37 is read out with the screen coordinates value from the display controller 38, and being output to the display 39 in sequence.

As described above, only by adding the image memory 41 and the image transformation/synthesis device 42 instead of the restoration transformation device, the similar effect with that of the second embodiment can be obtained. Furthermore, the construction on the post stage of the frame memory 37 is similar to that of the first conventional example, thus the same processing can be done.

[Fourth Embodiment]

Figure 18:
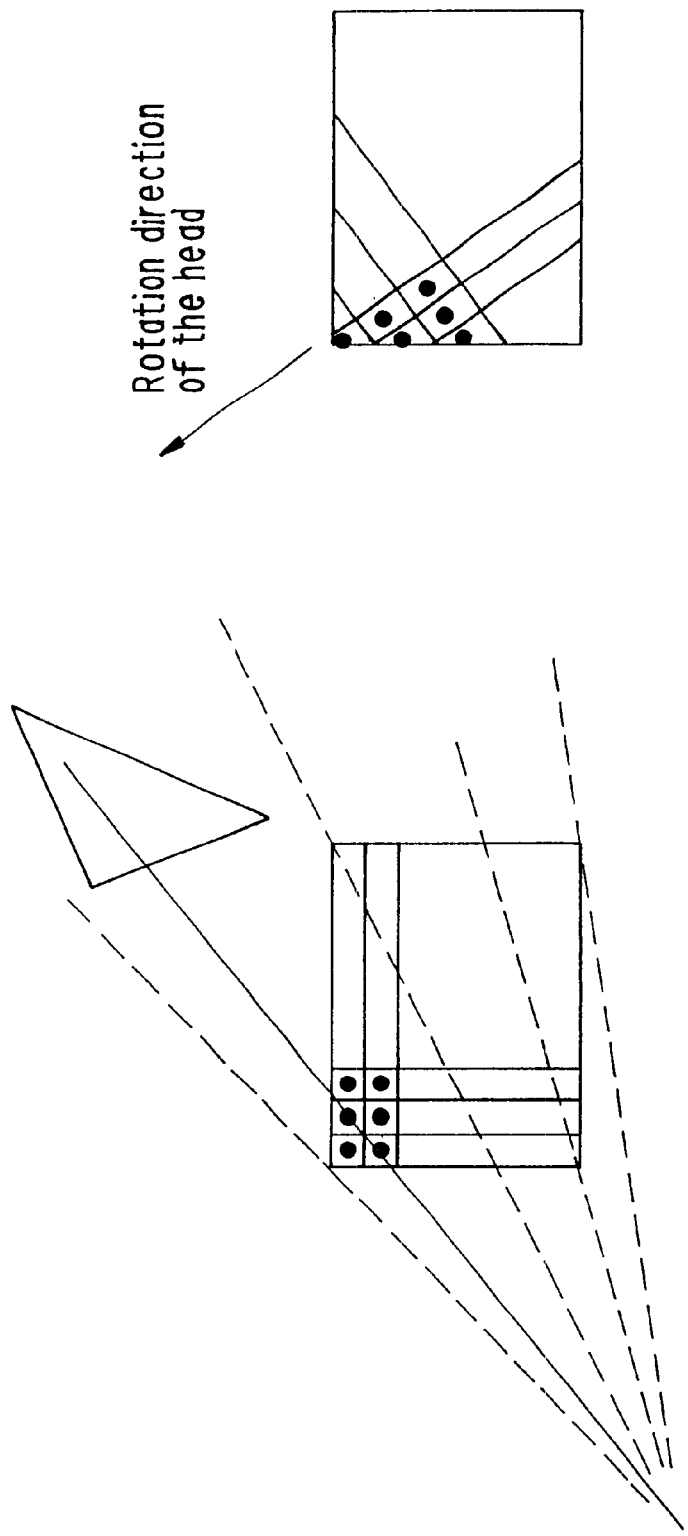
FIG. 18 is a graph showing the pixel-selecting method in the fourth embodiment.

FIG. 18 is a graph showing the pixel-selecting method in this embodiment. This embodiment is an application to the ray tracing.

The ray tracing is a method for conversely tracing the ray coming into the visual point from the direction of each pixel on the screen, to determine the brightness and the color. This method involves a large amount of calculation.

Normally, as shown in the left side of FIG. 18, it is assumed that the pixel on the screen is placed uniformly. On the contrary, in this method, as shown in the right side of FIG. 18, the virtual pixel on the screen used for the luminance calculation is taken as the moving direction of the head position and the matrix in the direction vertical thereto. At this time, by making the interval between the pixel in the moving direction of the head position rough, thinning of the pixel can be done. Moreover, since the number of rays to be traced is reduced, the volume of calculation decreases.

In order to determine the pixel row on the left screen of FIG. 18 from the pixel row on the right screen of FIG. 18, interpolation can be used. For example, from the position of one pixel on the left screen of FIG. 18, four pixels enclosing the same position on the right screen of FIG. 18 are determined. Then the luminance calculation of the individual pixel is prorated by the distance, to make it the luminance of the pixel on the left screen of FIG. 18.

Figure 2:
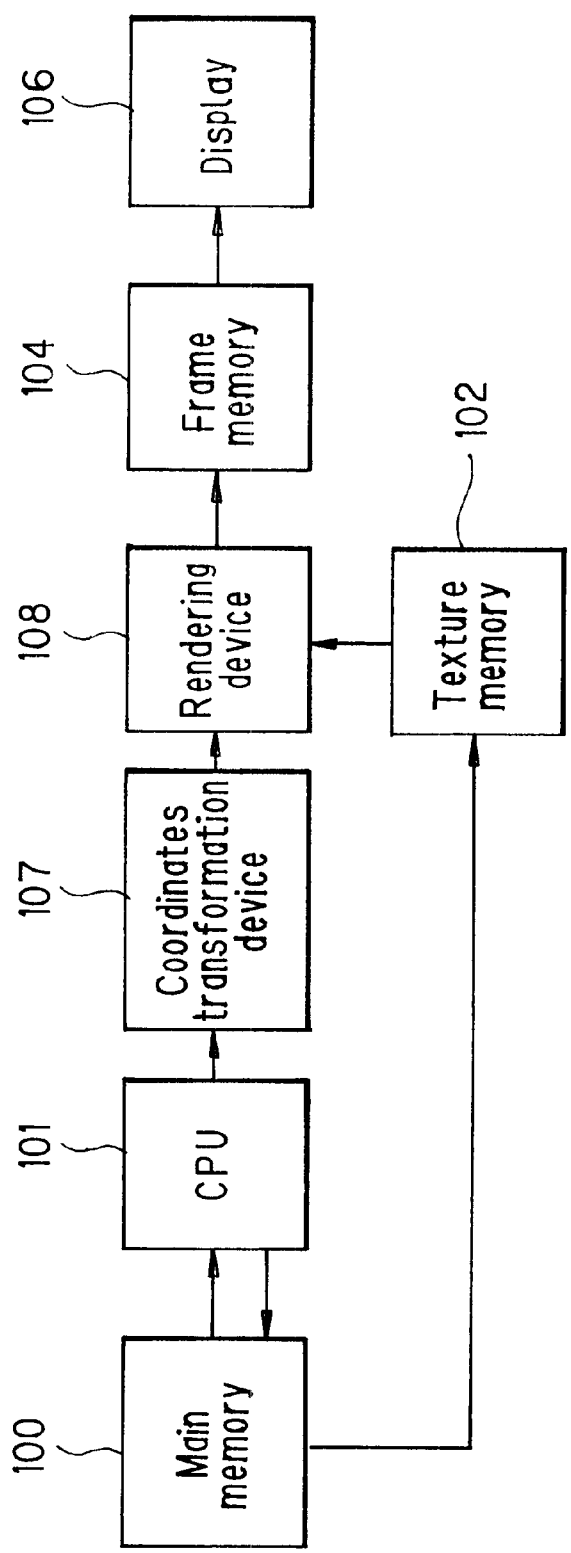
FIG. 2 is a block diagram showing another first conventional example of the image processing apparatus.
Figure 3:
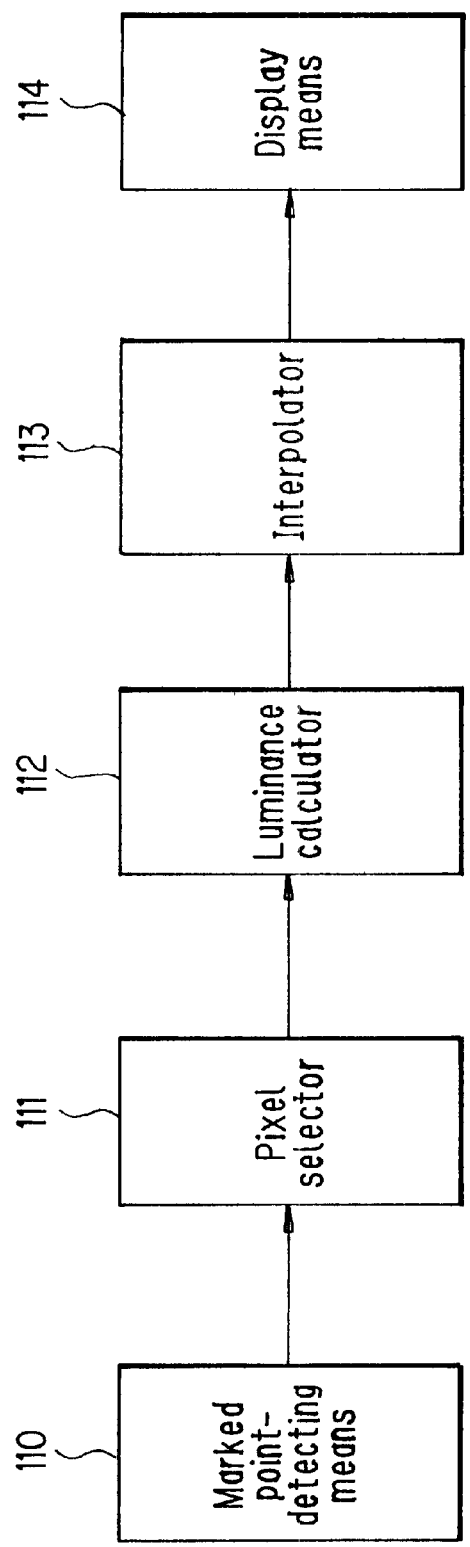
FIG. 3 is a block diagram showing the second conventional example of the image processing apparatus.
Figure 4:
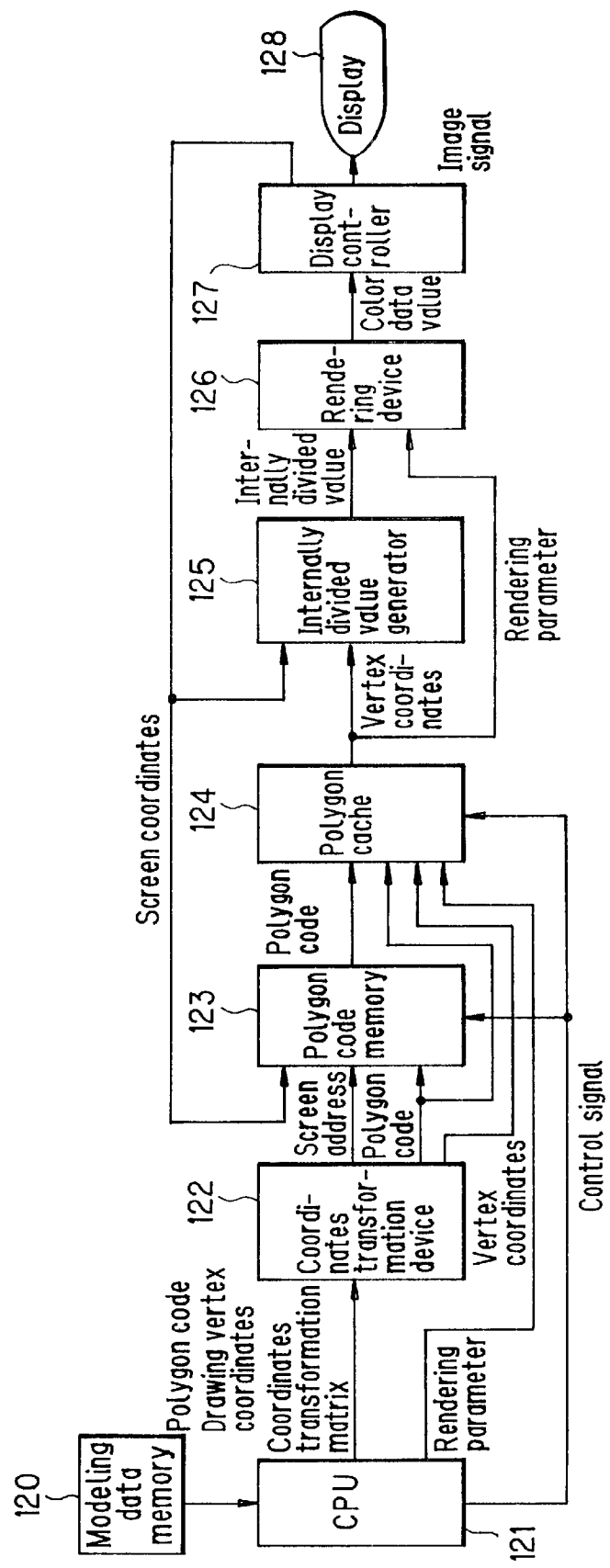
FIG. 4 is a block diagram showing the third conventional example of the image processing apparatus.
Figure 5:
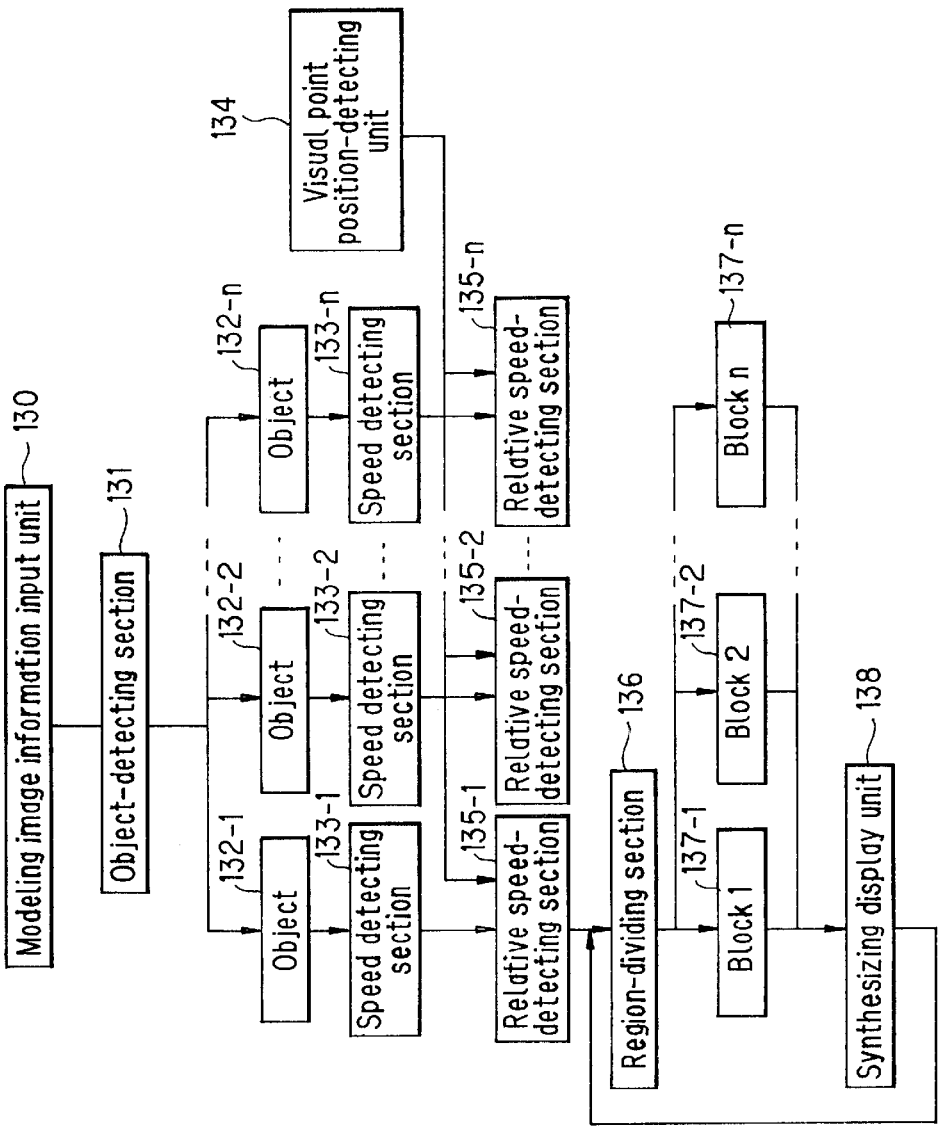
FIG. 5 is a block diagram showing the fourth conventional example of the image processing apparatus.
Figure 19:
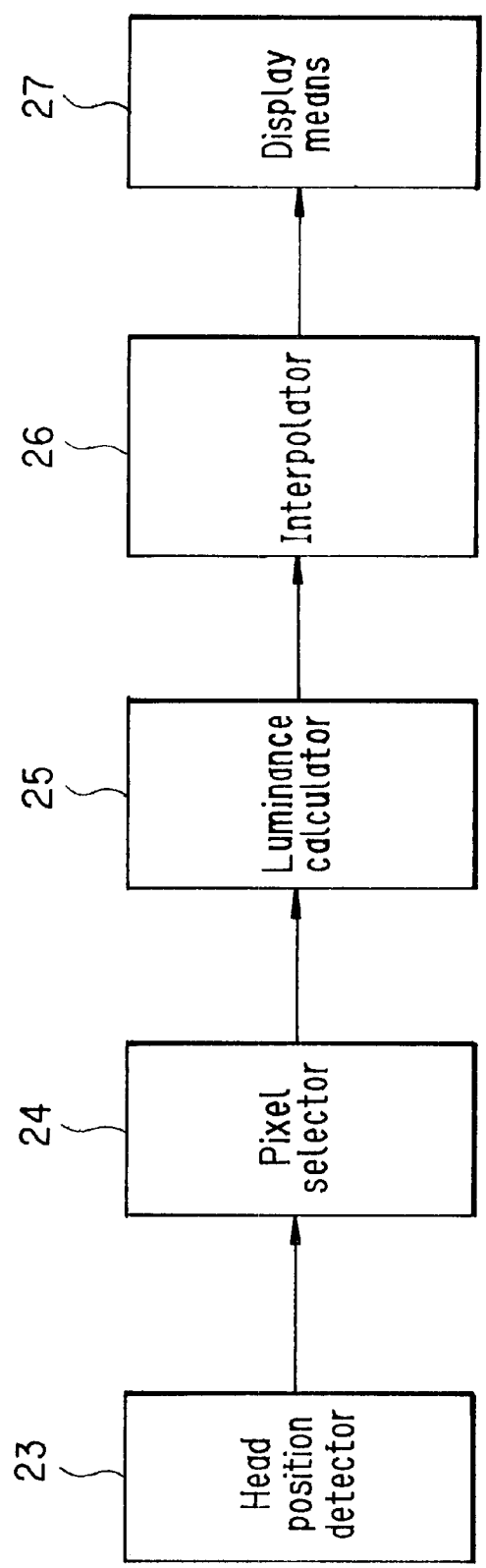
FIG. 19 is a block diagram showing the 4th embodiment of the three-dimensional image processing apparatus according to the present invention.

FIG. 19 is a block diagram showing the 4th embodiment of the three-dimensional image processing apparatus according to the present invention. The three-dimensional image display apparatus of this embodiment has the same construction as that of the second conventional example in FIG. 2. First, the head position detector 23 detects the head position and the movement information of the observer, and outputs them to the pixel selector 24. The pixel selector 24 thins out the pixel in the moving direction of the head position by the above-mentioned method, based on the information of marked point received from the head position detector 23, and outputs the coordinates of the selected pixel to the luminance calculator 25. The luminance calculator 25 determines the luminance value, by an accurate calculation, of the pixel of the coordinates being output from the pixel selector 24, and outputs the luminance value together with the coordinates of the pixel whose luminance value has been determined to the interpolator 26. The interpolator 26 determines the luminance value of the uncalculated pixel by the interpolation using the luminance value obtained with the luminance calculator 25. The example of this interpolation is as described above. The obtained luminance value of all pixels are output to the display 27. The display 27 displays the image based on the luminance value of all pixels received from the interpolator 26. This operation is repeated until the value of all pixels in the image are obtained.

As described above, by thinning the lines of the ray tracing, the pixels can be easily thinned in the moving direction of the observer.

[Fifth Embodiment]

Figure 20:
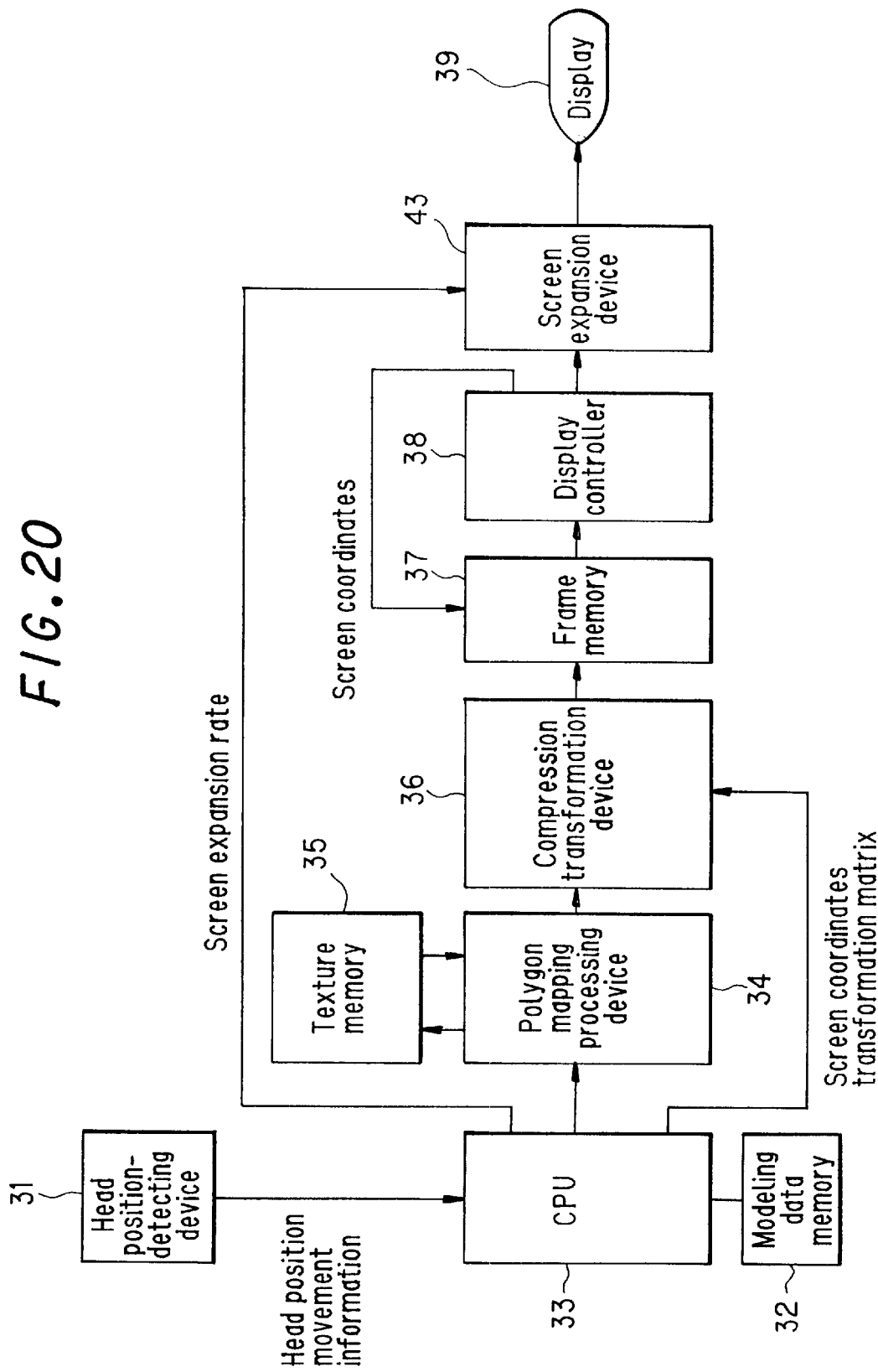
FIG. 20 is a block diagram showing the 5th embodiment of the three-dimensional image processing apparatus according to the present invention.

There is another method other than the above-mentioned embodiments, which utilizes the expansion device of the image signal. Here, there will be described a case where the direction of making the pixel rough is restricted to one direction. FIG. 20 is a block diagram showing the 5th embodiment of the three-dimensional image processing apparatus according to the present invention. Here, the movement of the head in the horizontal direction will be described, but the movement in the vertical direction will be the same.

The CPU 33 receives the head position/movement information from the head position-detecting device 31, and calculates the screen coordinates transformation matrix which compresses the image and the expansion rate for restoring the compressed image. The CPU 33 outputs the screen coordinates transformation matrix to the compression transformation device 36, and send the expansion rate to the screen expansion device 43. Here, the screen coordinates transformation matrix uses a matrix described in the fifth compression method described above. By this matrix, the screen is compressed in the X-axis direction and the Y direction, hence when being restored, the screen is multiplied by a certain expansion rate (1/compression rate) in each direction.

In addition, the CPU 33 executes modeling transformation, projection transformation and the like, using the data defining polygon and an application-software as well as the operation data obtained according to the operator's operation, transforms the parameter of the corresponding polygon to form a polygon image, and outputs the parameter to the polygon mapping processing device 34 in sequence.

The polygon mapping processing device 34 takes in the texture data corresponding to the polygon among the input parameter of the polygon from the texture memory 35, and while applying the texture data to each polygon, subjects each polygon to the blinding processing to form an image picture. The compression transformation device 36 compresses the image picture with the screen coordinates transformation matrix, and the generated compressed polygon image is written in the frame memory 37 as the frame picture.

The content of the frame memory 37 is read out with the screen coordinates value from the display controller 38, and being output to the screen expansion device 43. The screen expansion device 43 expands the image signal with the expansion rate sent from the CPU 33, and outputs the expanded image signal to the display 39 in sequence.

As described above, in the processing on the display side, the compressed image can be restored by multiplying a simple expansion rate without performing the matrix transformation, thus complicated processing is not necessary and the device can be simplified.

Now, as a method for performing the image processing corresponding to the movement of the observer, there can be mentioned a method which changes the resolution of the texture, other than the above-mentioned methods. The embodiments of this method will be described.

[Sixth Embodiment]

Figure 21:
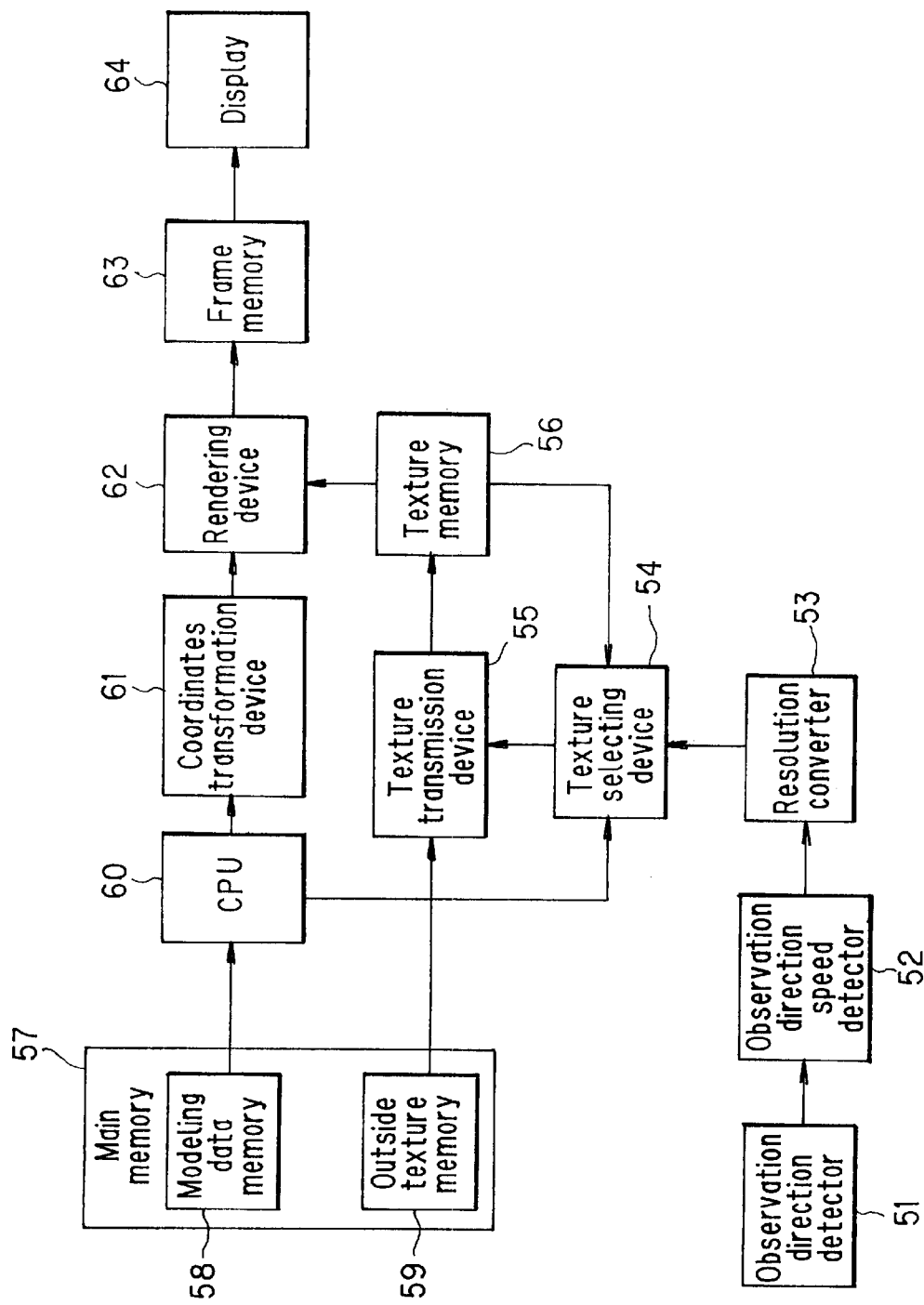
FIG. 21 is a block diagram showing the 6th embodiment of the three-dimensional image processing apparatus according to the present invention.

FIG. 21 is a block diagram showing the 6th embodiment of the three-dimensional image processing apparatus according to the present invention. This three-dimensional image processing apparatus comprises an observation direction detector 51, an observation direction speed detector 52, a resolution converter 53, a texture selecting device 54, a texture transmission device 55, a texture memory 56, a main memory 57, a CPU 60, a coordinates transformation device 61, a rendering device 62, a frame memory 63, and a display 64. The main memory 57 comprises a modeling data memory 58, and an outside texture memory 59.

Figure 1:
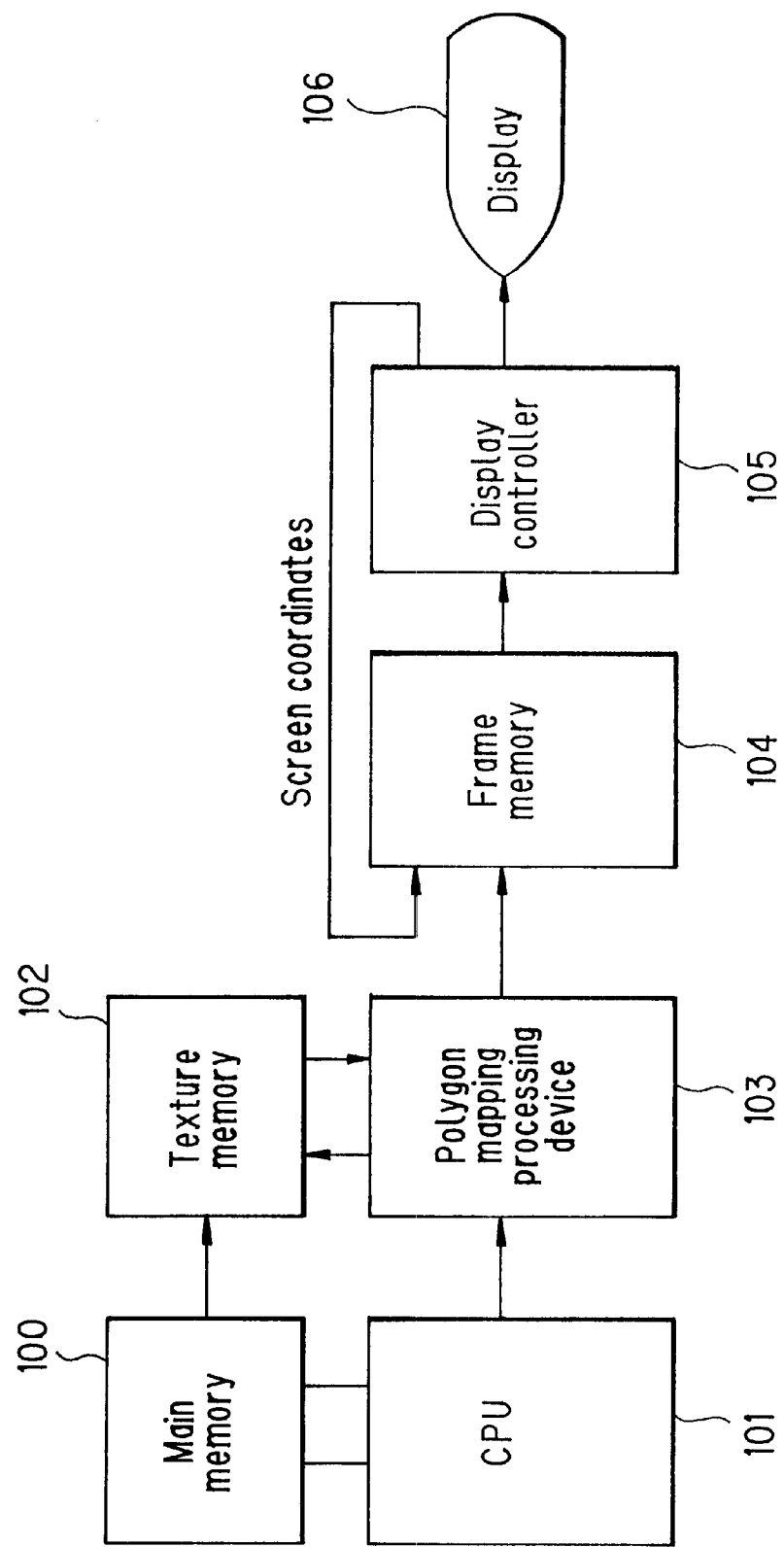
FIG. 1 is a block diagram showing the first conventional example of the image processing apparatus.

The main memory 57, the CPU 60, the coordinates transformation device 61, the rendering device 62, the frame memory 63, and the display 64 perform the same functions as those of the apparatus of the first conventional example shown in FIG. 1, and the observation direction detector 51, the observation direction speed detector 52, the resolution converter 53, the texture selecting device 54, the texture transmission device 55, and the texture memory 56 constitute the characteristic part of this embodiment.

Respective parts will now be described in detail.

Figure 22:
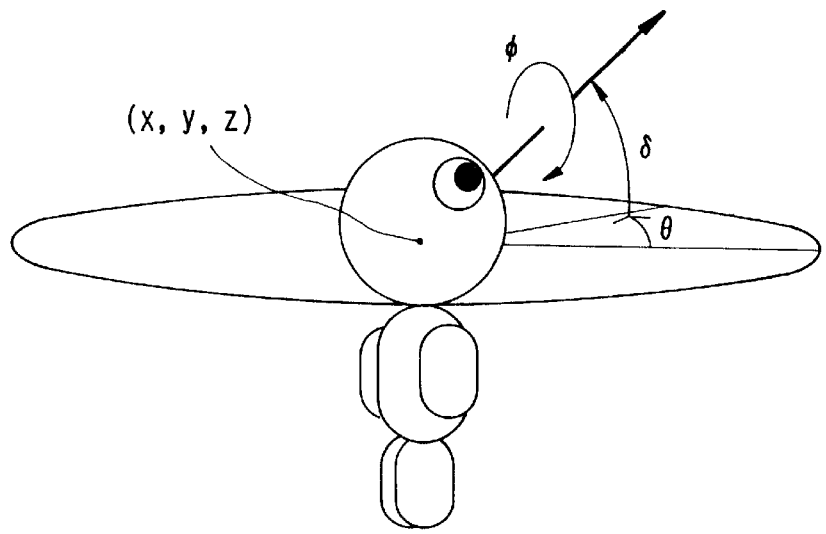
FIG. 22 is a graph showing the direction to be observed.

The observation direction detector 51 detects the observation direction of the observer. This direction can be detected by a three-dimensional magnetic sensor which detects the movement of the observer's head, but that method is not restricted herein. As the detection value, as shown in FIG. 22, there can be considered a case where it is represented by only the azimuth angle $\theta$ of the observation direction and the elevation angle $\delta$, a case where it is represented by the azimuth angle $\theta$ of the observation direction, the elevation angle $\delta$ and the rotation angle $\phi$, and a case where it is represented by the azimuth angle $\theta$ of the observation direction, the elevation angle $\delta$ and the rotation angle $\phi$, and the observation position (x, y, z).

The observation direction speed detector 52 detects the speed volume changing in the observation direction of the observer. As the speed volume, like the observation direction detector 51, there can be considered a case where it is represented by only the azimuth angle change volume d$\theta$ of the observation direction and the elevation angle change volume d$\delta$, a case where it is represented by the azimuth angle change volume d$\theta$ of the observation direction, the elevation angle change volume d$\delta$ and the rotation angle change volume d$\phi$, and a case where it is represented by the azimuth angle change volume d$\theta$ of the observation direction, the elevation angle change volume d$\delta$ and the rotation angle change volume d$\phi$, and the observation position change volume (dx, dy, dz).

The resolution converter 53 outputs an allowable resolution with respect to the speed detected by the observation direction speed detector 52. For example, there is a method in which a certain speed is set as a threshold, and when the speed is faster than the threshold, outputs a low resolution, and when the speed is slower than that, outputs a high resolution.

The outside texture memory 59 in the main memory 57 is a memory which can store all textures in the virtual space. It also stores textures having different resolution for each texture. For example, when four kinds of textures (A, B, C, D) are stored in the memory, textures (A1, B1, C1, D1) having a normal resolution, and textures (A2, B2, C2, D2) having a low resolution are stored, respectively.

The texture memory 56 is a memory for caching the texture. It can store several sheets of textures, and the textures in the memory is referred with the rendering device 62.

The texture selecting device 54 examines if there is a specified texture in the texture memory 56 or not, and if not, specifies a texture having the resolution indicated by the resolution converter to the texture transmission device 55. For example, when it is necessary to read in a texture A, if the resolution indicated by the resolution converter 53 is a low resolution e specifies a texture A2, and if it is a high resolution, specifies a texture A1 to be read in to the texture transmission device 55. If the specified texture has already been present in the texture memory 56, the texture selecting device 54 transmits the address where the texture is stored to the rendering device 62.

The texture transmission device 55 is a device to transmit the specified texture from the outside texture memory 59 to the texture memory 56.

The modeling data memory 58 in the main memory 57 is a memory for storing a model in the virtual space.

The CPU 60 inputs a model from the modeling data memory 58 and outputs the model to the coordinates transformation device 61. In addition, the CPU 60 transmits an identifier (ID) of the texture used in the model to the texture selecting device 54.

The coordinates transformation device 61 inputs a model from the modeling data memory 58, performs coordinates transformation, homogeneous coordinates transformation and screen coordinates transformation, and transmits the transformed model to the rendering device 62.

The rendering device 62 is a device for generating a screen image of the model transmitted from the coordinates transformation device 61, and at that time, uses a texture stored in the texture memory 56. Which texture is used is determined according to the texture address transmitted from the texture selecting device 54.

The frame memory 63 holds the screen image generated by the rendering device 62.

The display 64 displays the screen image held by the frame memory 63.

The principle which can realize the high-speed processing using this device will be described.

With regard to the man's discrimination ability, the image quality is not required to be as high as that required in the static state, when the observation direction of the observer is changing or when a model is relatively moving with respect to the observer, compared to a case where a static object is observed. By utilizing this characteristic, the processing time can be reduced.

Figure 23:
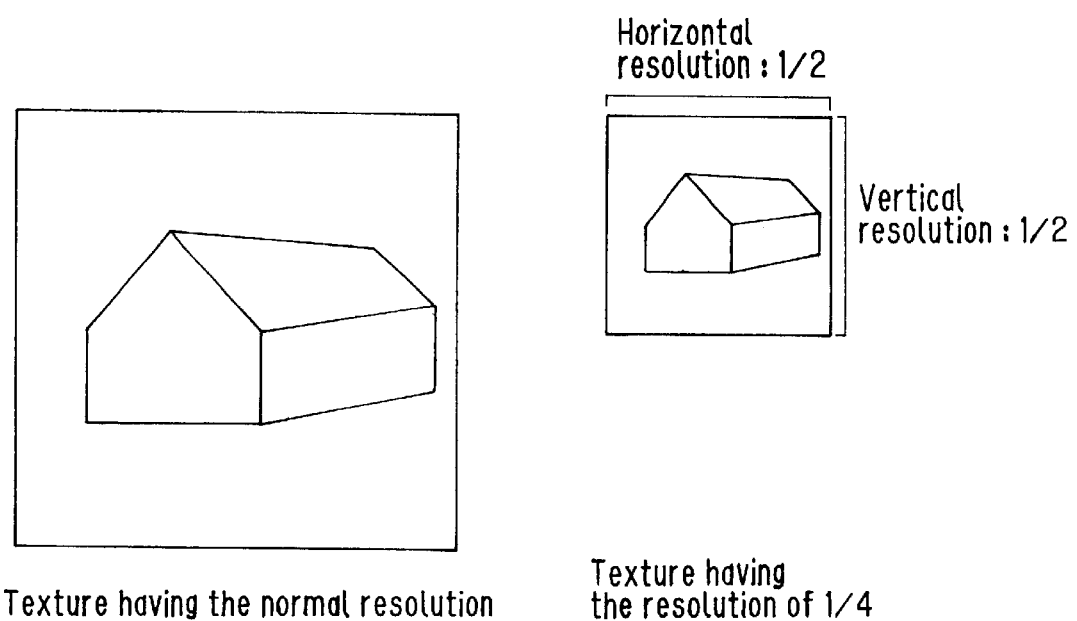
FIG. 23 is a graph showing examples of the normal resolution and low resolution.

Specifically, when a new texture is set in the texture memory 56, by detecting the changing speed in the observation direction of the observer and the relative speed of the observer and the model, and by selecting a texture having the resolution corresponding to the speed, the read-in time of the texture from the outside texture memory 59 can be shortened. For example, when it is necessary to set a certain texture in the texture memory 56, as shown in FIG. 23, by reading in a texture having the lower resolution than that of the normal texture (for example, the resolution of ¼) instead of the normal texture, the read-in time can be shortened.

An actual example in the case where the resolution of the texture is changed according to the changing speed in the observation direction of the observer will now be described using FIG. 24. In this embodiment, the explanation will be made for panning in the horizontal direction of the observer, but it will be the same for other movements of the observer.

As shown in FIG. 24, it is assumed that a virtual space is spreading out in the surrounding of the observer. For the convenience sake, the consideration is made, dividing the surrounding into deltaic regions around the observer. It is assumed that, among these regions, a model which exists in continuous regions in the observation direction of the observer (in FIG. 24, ABCDEFGH) is displayed on the screen. These regions are provisorily provided for the purpose of explanation, and the space is not actually recognized as being divided.

For reasons of explanation, the textures used in the model are used in two kinds (for example, textures of a desk and a chair), and the capacity of the texture memory is such that it can store the texture displayed on the screen. Furthermore, it is the same for the case where the texture memory has a larger capacity than that. Therefore, when a new texture is required, it must be read out from the outside texture memory 59 and stored in the texture memory 56.

When the observer spans slowly in the right direction, the area seen by the observer is to be drawn on the screen. When the region is drawn from ABCDEFGH (the upper drawing in FIG. 24) to BCDEFGHI (the lower drawing in FIG. 24), the texture volume which is re-read in to the texture memory 56 during one drawing is to be 2 sheets of textures (for example, textures of a desk and a chair).

When it is assumed that by increasing the spanning speed of the observer, the region to appear on the screen changes from ABCDEFGH to BCDEFGHI within the same time as described above, six sheets of textures (two sheets each for the regions I, J, K) must be read in to the texture memory 56 from the outside texture memory 59 during the drawing. If the textures cannot be read in at a speed which matches the spanning time and does not give an unnatural feeling, it becomes the cause of drawing delay, and the observer will have an unnatural feeling.

Therefore, by reading in textures having the lower resolution than the natural resolution, the drawing delay due to the read in of the texture is reduced. If textures having the resolution of ¼ of the natural resolution are to be read in, the time for reading in 6 textures will be 6×¼=1.5 sheets of textures. Or if textures having the resolution of ¹⁄₁₆ is to be read in, it will be 6×¹⁄₁₆=0.375 sheets of textures. Thus, the read-in time of the texture can be shortened.

The actual operation of the three-dimensional image processing apparatus of this embodiment based on this principle will now be described.

The CPU 60 executes modeling transformation, projection transformation and the like, using the parameter for defining the polygon from the modeling data memory 58, the application software and the operation data obtained according to the operator's operation, transforms the parameter of the corresponding polygon to form a polygon image, and outputs the parameter to the coordinates transformation device 61 in sequence. In addition, the CPU 60 calculates the texture ID and sends it out to the texture selecting device 54.

On the other hand, the observation direction detector 51 and the observation direction speed detector 52 detect the observation direction and the speed of the observer, and outputs the detection results to the resolution converter 53. The resolution converter 53 outputs the allowable resolution of the texture to the texture selecting device 54, based on the observation speed. This allowable resolution indicates the resolution of the texture which can naturally perform drawing following the speed of the observation direction.

Figure 25:
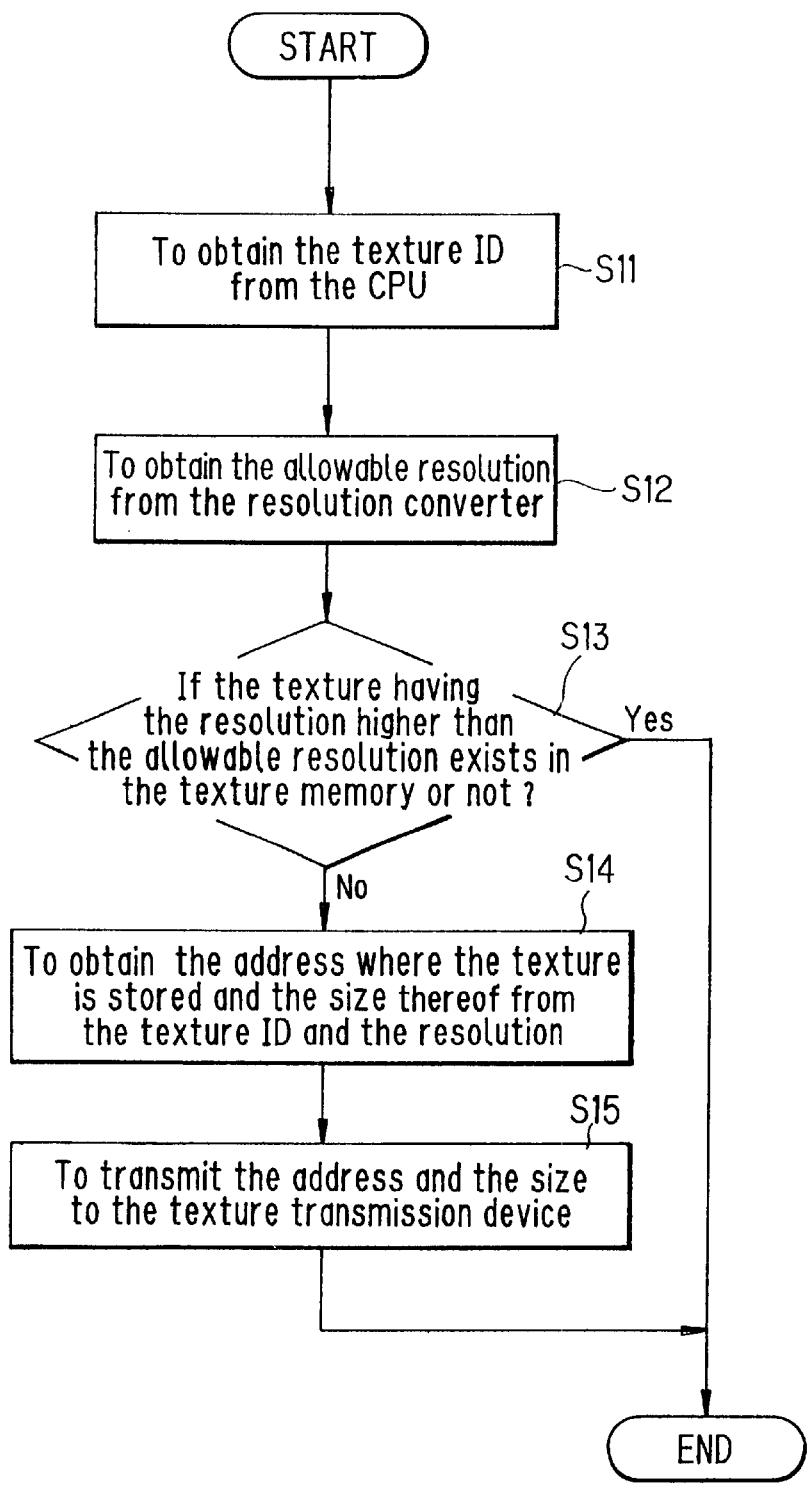
FIG. 25 is a flow chart showing the operation of the texture selecting device 54.

The texture selecting device 54 which receives this allowable resolution performs the following operation. FIG. 25 is a flow chart showing the operation of the texture selecting device 54.

First, the texture selecting device 54 obtains the texture ID from the CPU 60 (Step S11), and obtains the allowable resolution from the resolution converter 53 (Step S12). The texture selecting device 54 then checks if there is a texture having the resolution higher than the allowable resolution in the texture memory or not (Step S13). If there is such a texture therein, it is not necessary to read in a new texture from the outside texture memory 59, because there is already the texture in the texture memory 56. Therefore, the texture selecting device 54 does not perform its processing.

If there is no texture having the resolution higher than the allowable resolution therein, it is necessary to newly read in a texture indicated by the allowable resolution (a texture having the low resolution). Therefore, the texture selecting device 54 obtains the address where the texture is stored in the outside texture memory 59 and its size from the texture ID and the allowable resolution (Step S14). The texture selecting device 54 then transmits the address and the size to the texture transmission device 55 (Step S15).

The texture transmission device 55 read in this address and the size from the outside texture memory 59, and writes them in the texture memory 56. As described above, since the texture having the low resolution indicated by the allowable resolution is read in, the processing time can be shortened, and natural drawing becomes possible.

The rendering device 62 generates a screen image (color data value) from the model information from the coordinates transformation device 61 and the texture stored in the texture memory 56. This is written in the frame memory 62 and this data value is displayed on the display 64.

[Seventh Embodiment]

Figure 26:
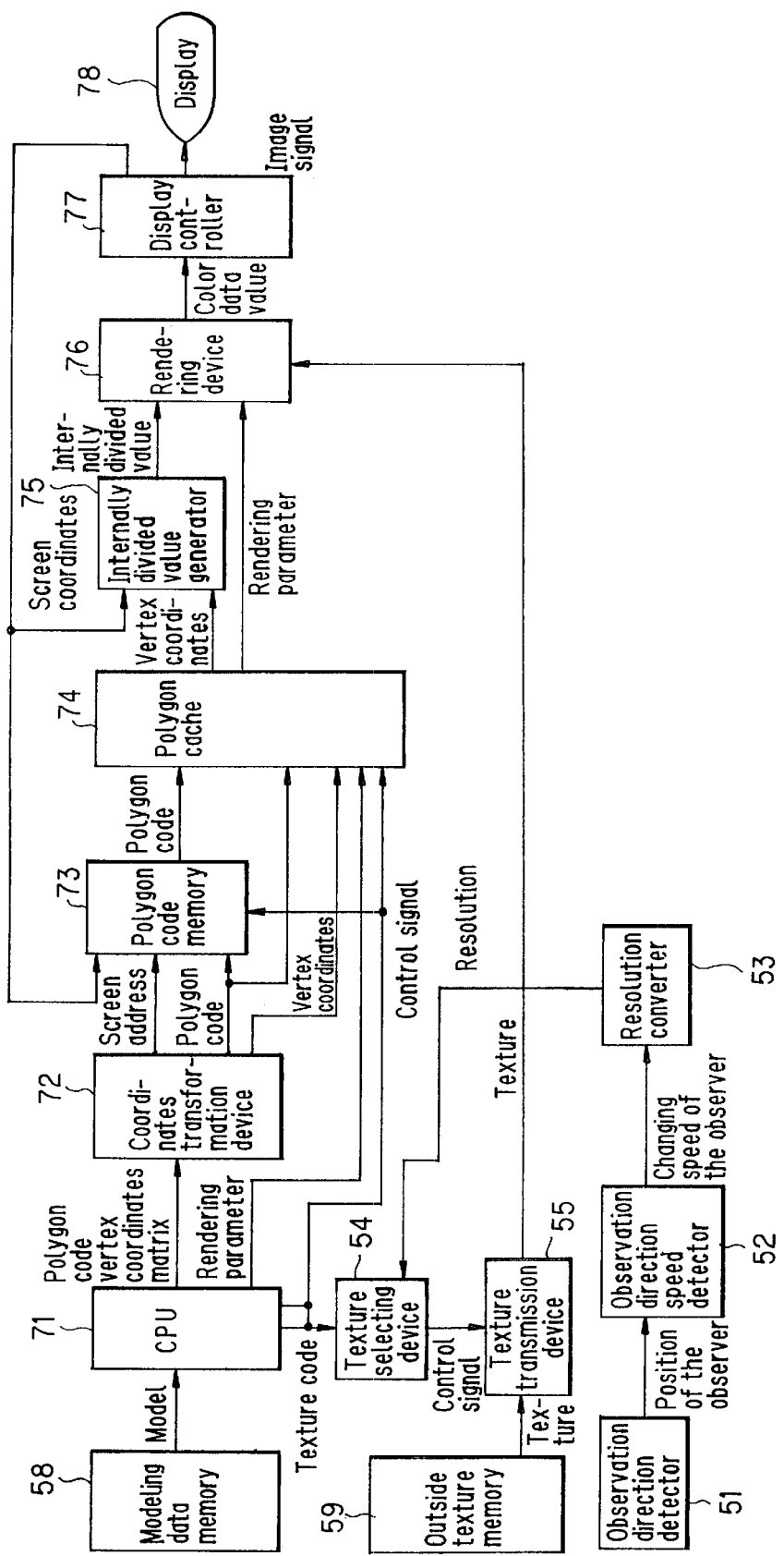
FIG. 26 is a block diagram showing the 7th embodiment of the three-dimensional image processing apparatus according to the present invention.

FIG. 26 is a block diagram showing the 7th embodiment of the three-dimensional image processing apparatus according to the present invention. This three-dimensional image processing apparatus has a construction that the texture processing section of the sixth embodiment is added to the third conventional example, and comprises an observation direction detector 51, an observation direction speed detector 52, a resolution converter 53, a texture selecting device 54, a texture transmission device 55, a modeling data memory 58, an outside texture memory 59, a CPU 71, a coordinates transformation device 72, a polygon code memory 73, a polygon cache 74, an internally divided value generator 75, a rendering device 76, a display controller 77, and a display 78. The operation and the function of each section are as described above, therefore detailed description will be omitted. Though the texture memory is not included, the similar function is included in the rendering device 76.

This apparatus has a polygon code memory 73, and by performing rendering in the rendering device 76 at the time of sending the image signal, the processing time for reading in the texture can be further shortened by executing the texture setting and a part of the rendering processing in parallel.

When rendering is performed for each polygon, after being subjected to the coordinates transformation, each polygon is subjected to the texture-mapping by the rendering processing. At this time, when a texture is not in the memory in the rendering device 76, the rendering processing will be delayed while the texture is set. In order to shorten this time, the following processing will be performed.

FIG. 27A is a graph representing the time for drawing four polygons A, B, C and D. It is assumed that polygon A requires a texture 1, and polygon B requires a texture 2. and both textures have not been set in the texture memory. In the sixth embodiment, since the texture setting and the rendering processing cannot be performed in parallel, the rendering of polygon A is performed after the read in of the texture 1, and the rendering of polygon B is performed after the read in of the texture 2, thus the rendering processing is delayed.

Accordingly, as described above, when a texture having the resolution of ¼ of the natural resolution is read in, the processing becomes as shown in FIG. 27B. Since the read-in time of the texture can be shortened, the delay of the rendering processing can be reduced.

On the other hand, in this embodiment, the texture setting and the rendering processing can be performed in parallel. That is to say, when there is a polygon code memory and rendering is performed at the time of sending the image signal, after being subjected to the coordinates transformation, each polygon can be stored in the polygon code memory as the screen image before the coloration, while the read-in of the texture is performed. After all polygons are stored in the polygon code memory and the textures are read in, the screen image is subjected to the coloration processing.

FIG. 28A is a graph representing the processing time when a texture having the natural resolution is read in, and FIG. 28B is a graph representing the processing time when a texture having the resolution of ¼ of the natural resolution is read in. Compared with FIGS. 27A and B which show the 6th embodiment, it is obvious that the delay of the rendering processing is alleviated. Naturally, comparing FIG. 28A and FIG. 28B, the delay of the rendering processing can be alleviated by the amount that the read-in time of the texture is shortened.

[8th Embodiment]

Figure 29:
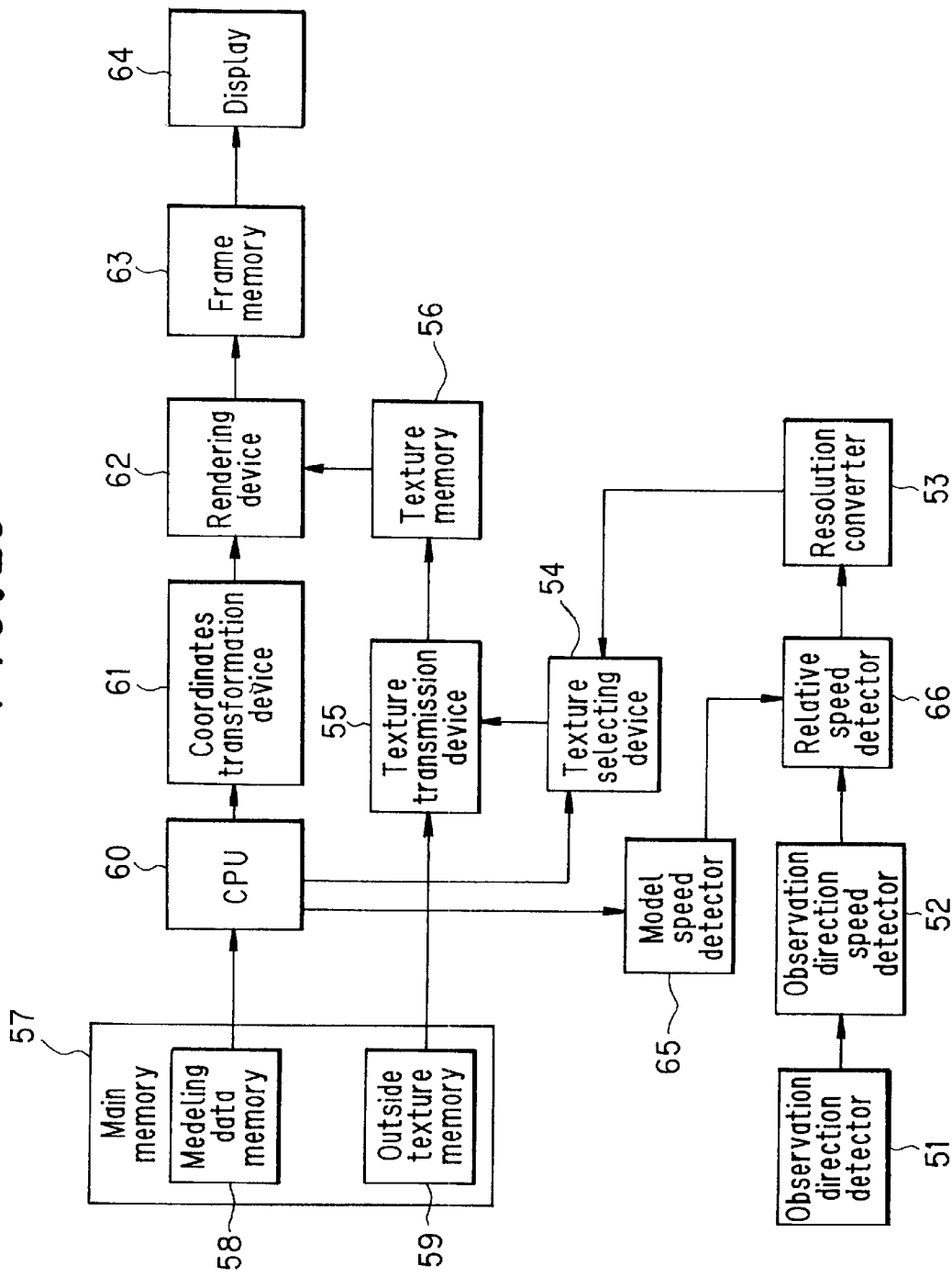
FIG. 29 is a block diagram showing the 8th embodiment of the three-dimensional image processing apparatus according to the present invention.

FIG. 29 is a block diagram showing the 8th embodiment of the three-dimensional image processing apparatus according to the present invention. This apparatus has means to switch over the resolution of the texture depending upon the observation direction of the observer and the relative speed of the observer and the object to be displayed.

Actually, it has a construction that a model speed detector 65 and a relative speed detector 66 are added to the construction of the 6th embodiment.

The model speed detector 65 detects the speed of the model from the CPU 54. The relative speed detector 66 detects the relative speed of the observer and the model, from the changing speed in the observation direction of the observer detected by the observation direction detector 51 and the observation direction speed detector 52 and the speed of the model. The resolution converter 53 outputs the allowable resolution with respect to the speed detected by the relative speed detector 66.

When the object to be displayed is moving, the discrimination with respect to the object changes depending upon the relative speed of the object with respect to the observer. Therefore, it is determined with the relative speed detector 66 that the texture having which resolution is read in, by detecting the observation direction of the observer and the relative speed of the object to be displayed. Hence, the processing time for reading in the texture can be shortened, without being recognized that the resolution of the texture is lower than the natural resolution by the observer.

As described above, even in the case where the resolution of the texture is changed according to the relative speed of the observer and the model, the time for reading in the texture can be similarly shortened.

The other operation is similar to that of the 6th embodiment, therefore the explanation thereof will be omitted.

[9th Embodiment]

Figure 30:
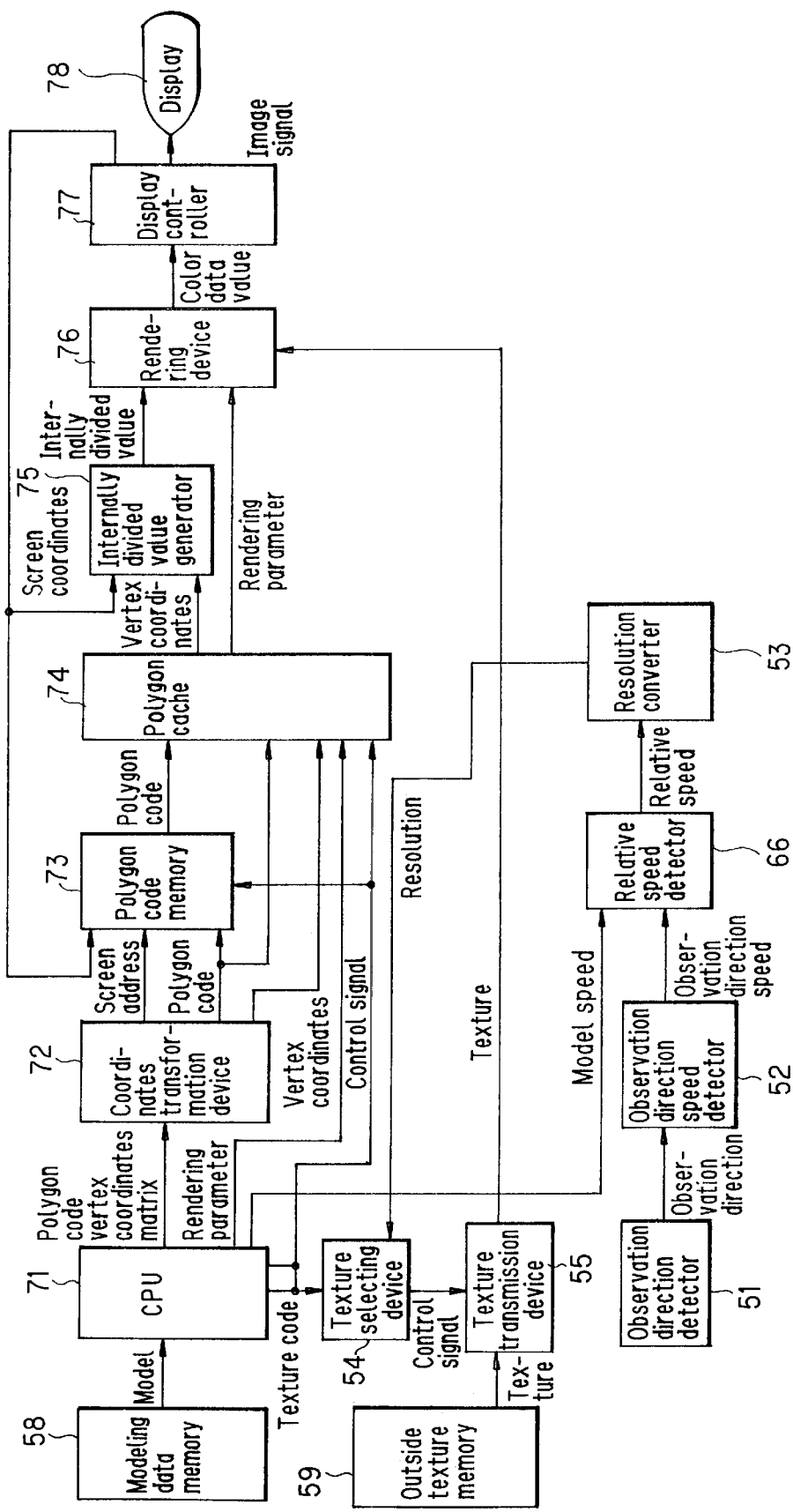
FIG. 30 is a block diagram showing the 9th embodiment of the three-dimensional image processing apparatus according to the present invention.

FIG. 30 is a block diagram showing the 9th embodiment of the three-dimensional image processing apparatus according to the present invention. This apparatus has a construction that a relative speed detector 66 is added to the construction of the 7th embodiment. Differing from the 8th embodiment, it is because the CPU 71 detects the speed of the model and transmits it to the relative speed detector 66 that a model speed detector is not present therein.

The operation of the texture processing section is similar to that of the 8th embodiment. This apparatus has a lighter processing than the apparatus of the 8th embodiment, and can obtain more natural image.

[10th Embodiment]

Figure 31:
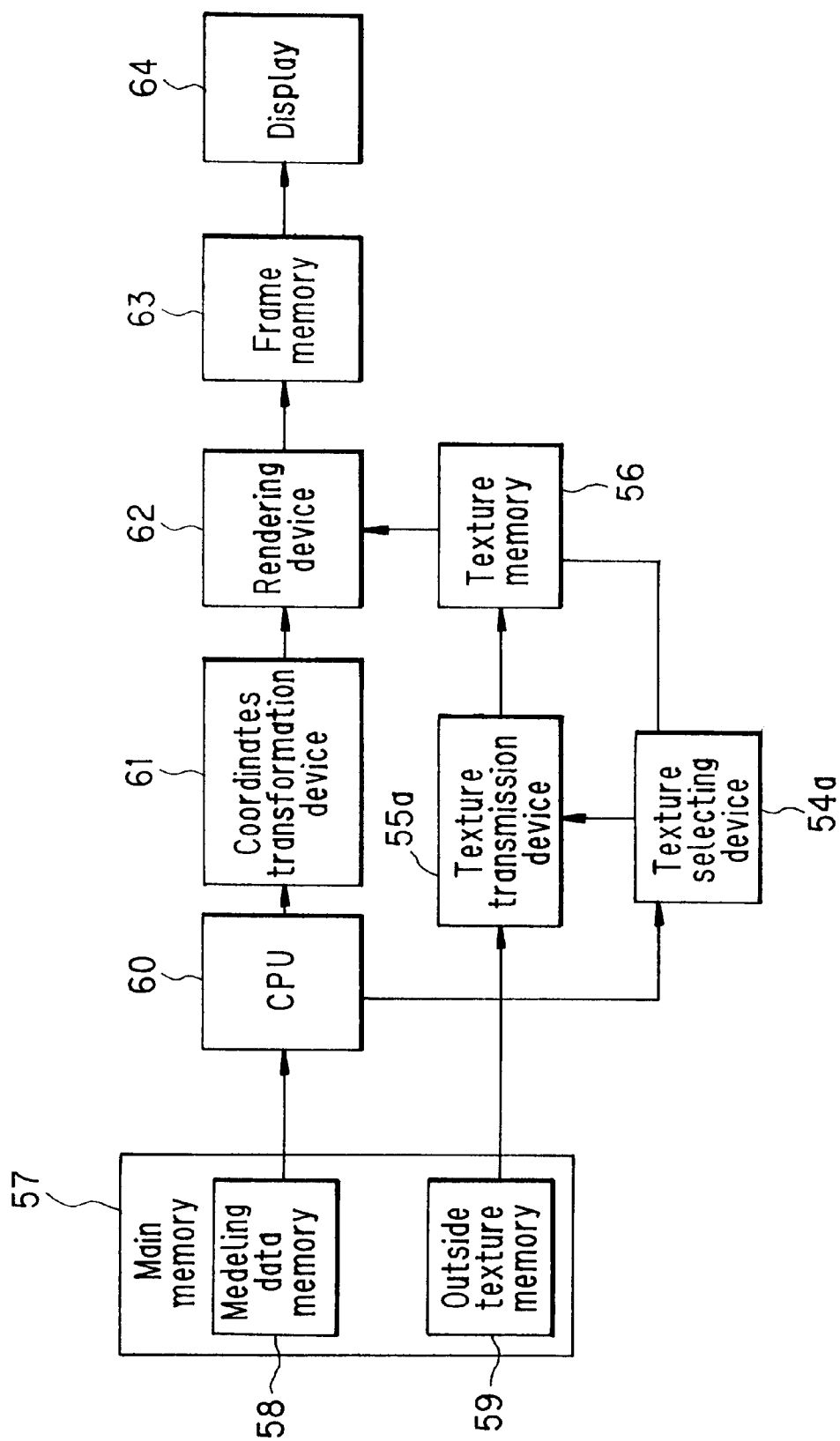
FIG. 31 is a block diagram showing the 10th embodiment of the three-dimensional image processing apparatus according to the present invention.

FIG. 31 is a block diagram showing the 10th embodiment of the three-dimensional image processing apparatus according to the present invention. This three-dimensional image processing apparatus has a construction comprising a texture selecting device 54a, a texture transmission device 55a and a texture memory 56 in addition to the image processing section (57, 60~64) of the 6th embodiment.

The texture selecting device 54 is a device for outputting a transmission command to read in the corresponding texture to the texture transmission device 55a, where there is no texture used in the model in the texture memory 56. When the identifier (ID) of the texture is input from the CPU 60, the texture selecting device 54 checks if there is the corresponding texture in the texture memory 56, and if not, it transmits a command to read in a low-resolution texture and a high-resolution texture of the texture to the texture transmission device 55a.

Figure 32:
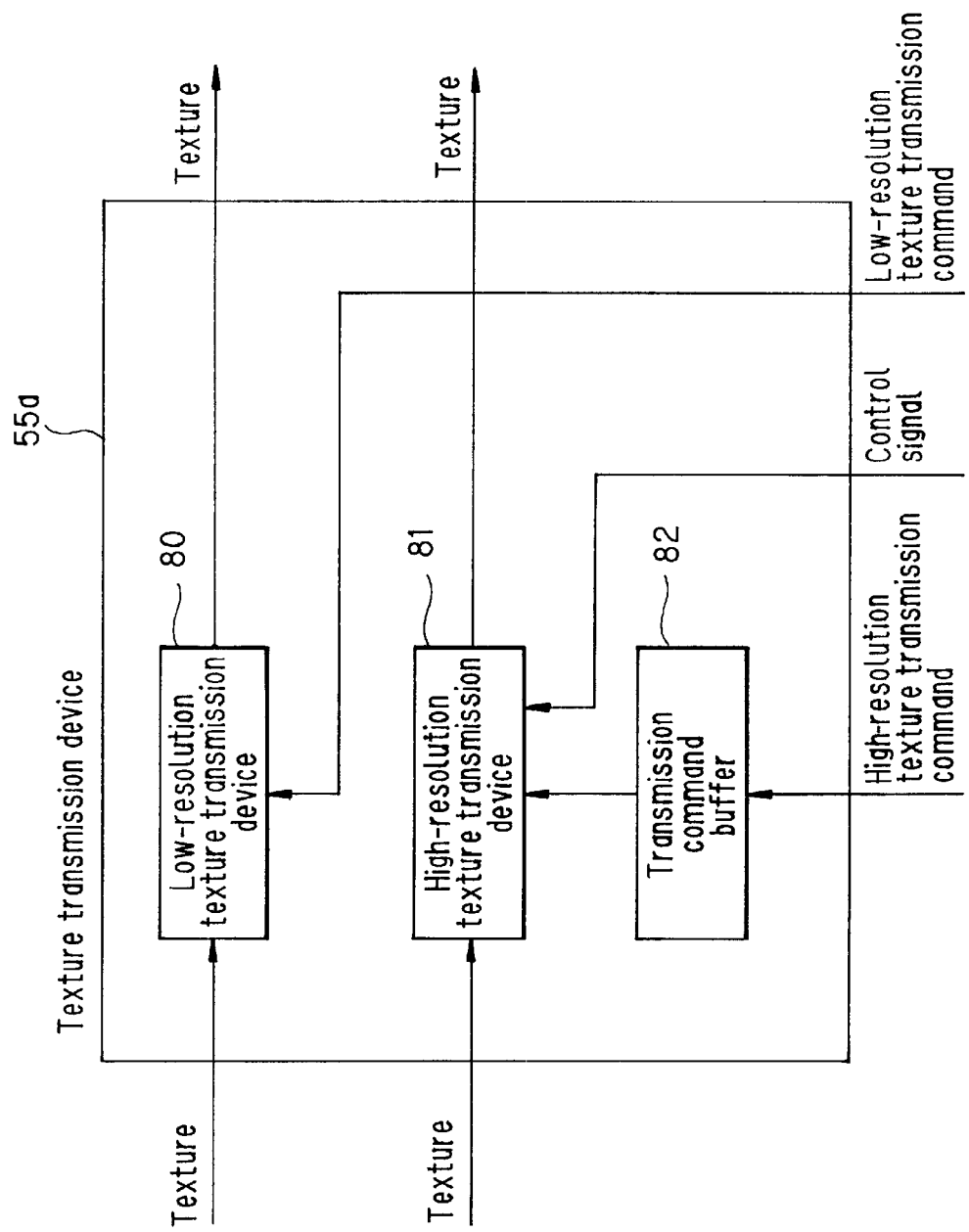
FIG. 32 is a schematic block diagram showing the texture transmission device.

The texture transmission device 55a is a device for receiving the command to transmit the texture from the texture selecting device 54a, and transmitting the corresponding texture from the outside texture memory 59 to the texture memory 56. FIG. 32 is a schematic block diagram showing the texture transmission device. The texture transmission device 55a comprises a low-resolution texture transmitter 80, a high-resolution texture transmitter 81, and a transmission command buffer 82.

The low-resolution texture transmitter 80 executes a transmission command of a low-resolution texture, among the texture transmission commands transmitted from the texture selecting device 54a. The high-resolution texture transmitter 81 executes a transmission command of a high-resolution texture, among the texture transmission commands transmitted from the texture selecting device 54*a*. The transmission command buffer 82 buffers the transmission command of the high-resolution texture, among the texture transmission commands transmitted from the texture selecting device 54*a*. The high-resolution texture transmitter 81 performs discontinuance and resumption of the transmission execution, according to the control signal from the texture selecting device 54*a*. This control signal is output when the transmission command of the low-resolution texture is transmitted, and when the read in of the low-resolution texture is completed.

In this embodiment, the feature that immediately after the model appeared on the screen, the detailed portion cannot be discriminated is utilized, and drawing is performed using a low-resolution texture until a texture having the normal resolution is read in, thereby the processing time for setting the texture is dispersed.

The description will be made with reference to FIG. 24 described above. In FIG. 24, the description will be made for panning in the horizontal direction of the observer, but it will be the same for other movements of the observer.

It is assumed that a virtual space is spreading out in the surrounding of the observer, as described above. For the convenience sake, the consideration is made, dividing this space into deltaic regions around the observer (ABCDEFGHIJK). It is assumed that, among these regions, ABCDEFGH which exist in continuous regions in the observation direction of the observer (upper drawing in FIG. 24) is displayed on the screen. For the purpose of explanation, it is assumed that two sheets of textures (having the high resolution) are used for the region I, and in other regions, there is no texture to be read in. It is also assumed that if this texture is read in to draw an ideal image (image having the high resolution), only one texture can be read in with the drawing interval (with the time for drawing one screen) according to the spanning speed of the observer.

Figure 33:
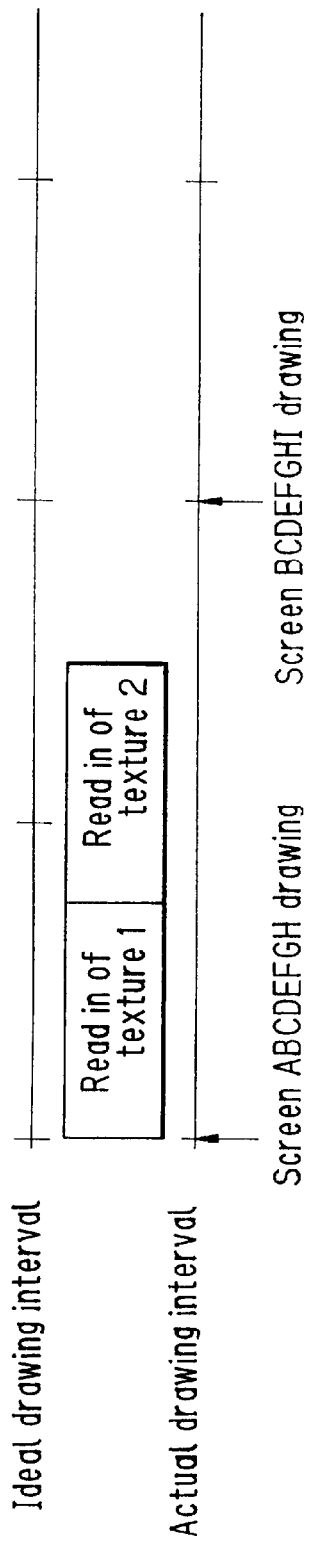

From the upper drawing of FIG. 24, if it is assumed that the observer spans slowly in the right direction, as shown in the lower drawing of FIG. 24, the region appearing on the screen changes in the order of BCDEFGHI. At that time, the texture volume to be re-read during one drawing will be two sheets of textures (textures in the region I), and as shown in FIG. 33, the actual drawing interval will require the time twice as much as that of the ideal drawing interval (the drawing interval which can follow the spanning speed of the observer). Therefore, the screen cannot follow the movement of the observer, resulting in an unnatural image.

Therefore, a low-resolution texture is first read in, and drawing is performed using the low-resolution texture until a texture having the normal resolution is read in.

Figure 34:
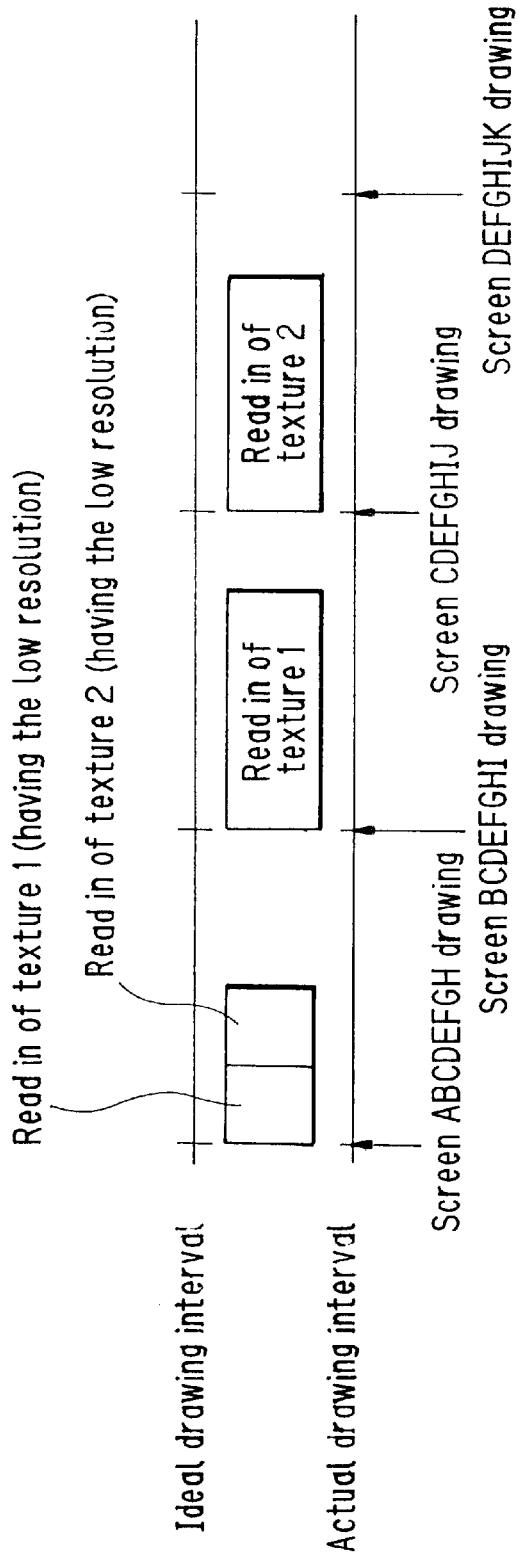
FIG. 34 is a graph showing the processing time when a texture is read in, in the 10th embodiment.

If it is assumed that the observer pans slowly in the right direction, when the regions appearing on the screen becomes BCDEFHGI, the two textures used for the region I are read in as textures having lower resolution than the normal texture. For example, if it is a texture having the resolution of ¼, the time required for the read in will be 2×¼=0.5 sheets, and drawing can be performed without being delayed. As shown in FIG. 34, the ideal drawing interval and the actual drawing interval can be coincided, thus a natural image can be formed.

If it is assumed that the observer continues spanning in the right direction, since there is no texture to be read in newly, until the region appearing on the screen becomes CDEFGHIJ, one of the original textures used in the region I can be read in. Moreover, while the observer continues spanning in the right direction, and the region appearing on the screen becomes DEFGHIJK, the other of the original textures used in the region I can be read in. The timing for switching over the texture may be in a stage when an individual texture is read in, or in a stage when both of them are read in.

The operation of this embodiment will now be described.

Since the operation of the CPU 60, the coordinate transformation device 61, the rendering device 62, the frame memory 63, and the display 64 are the same as that of the 6th embodiment, the description thereof will be omitted. The operation for reading in the texture of this three-dimensional image processing apparatus will now be described.

Figure 35:
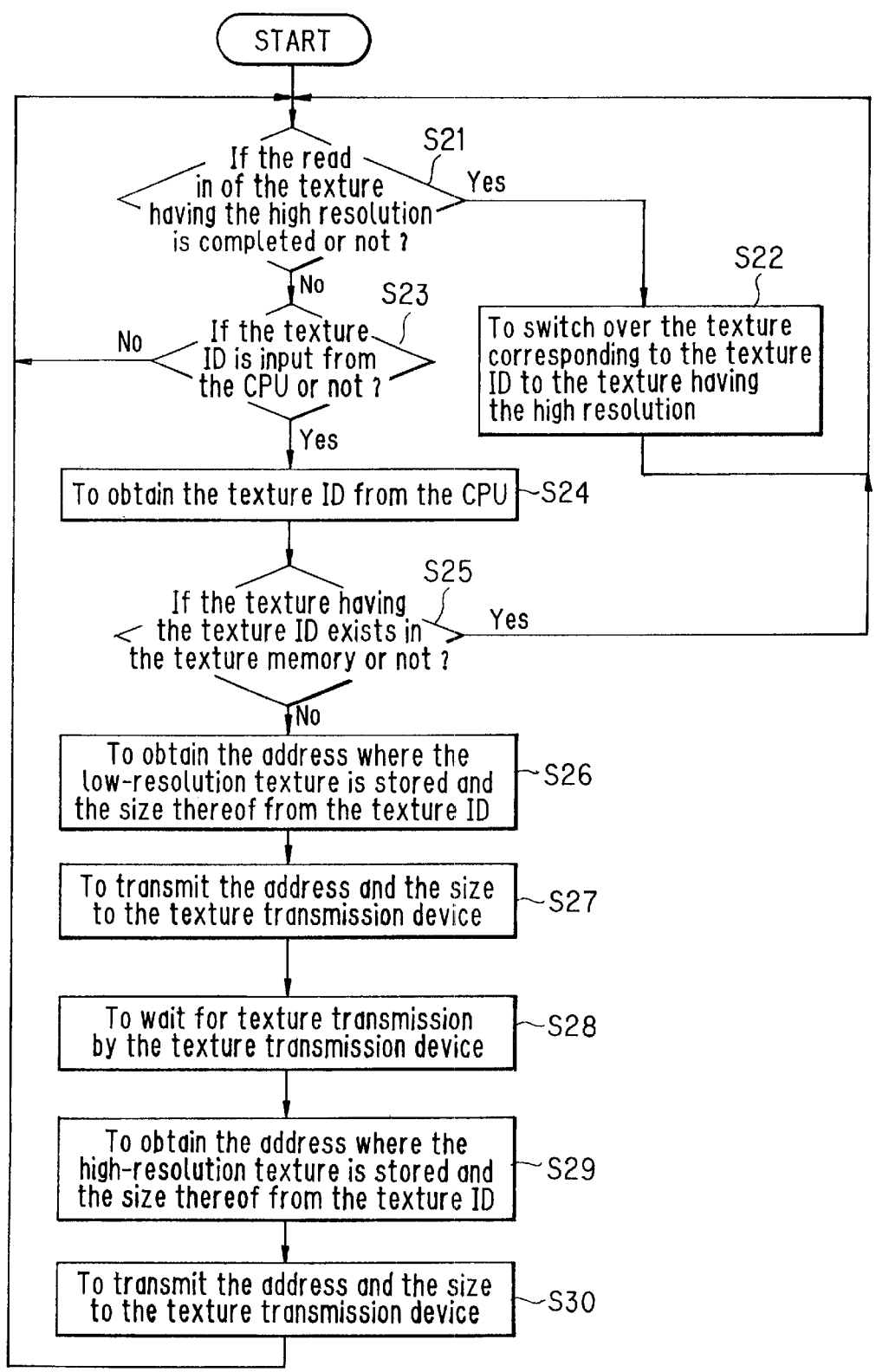
FIG. 35 is a flow chart showing the operation of the texture selecting device in the 10th embodiment.

FIG. 35 is a flow chart showing the operation of the texture selecting device 54*a*. The texture selecting device 54*a* checks if the texture memory 56 completes the read in of the high-resolution texture (Step S21). If the read in has been completed, the texture selecting device 54*a* switches over the texture corresponding to the texture ID to the high-resolution texture (Step S22), and returns to the beginning. If the high-resolution texture is not read in, the texture selecting device 54*a* checks if the texture ID is input from the CPU 60 (Step S23), and if not, returns to Step S21. If the texture ID has been input, the texture selecting device 54*a* obtains the texture ID from the CPU 60 (Step S24). The texture selecting device 54*a* checks if the texture corresponding to the texture ID is present in the texture memory 56 (Step S25), and if it is present, returns to Step S21.

If the texture is not present therein, the texture must be newly read in from the outside texture memory 59 to the texture memory 56. First, the address where the low-resolution texture is stored and the size are obtained from the texture ID (Step S26). The texture selecting device 54*a* then transmits the address and the size to the texture transmission device 55*a* (Step S27), then waits for the texture transmission by the texture transmission device 55*a* (Step S28). The low-resolution texture transmitter 80 in the texture transmission device 55*a* executes the transmission command of the low-resolution texture.

When the transmission of the low-resolution texture to the texture memory 56 is completed, the address where the high-resolution texture is stored and the size are obtained from the texture ID (Step S29). The texture selecting device 54*a* then transmits the address and the size to the texture transmission device 55*a* (Step S30). The transmission command of the high-resolution texture is buffered to the transmission command buffer 82 in the texture transmission device 55*a*. When it is not necessary to read in a new texture to the texture memory 56, the high-resolution texture transmitter 81 executes the transmission command stored in the transmission command buffer 82, then returns to the beginning (Step S21).

Before the region I moves to the center of the screen, the drawing is performed with the natural resolution, hence the observer will not perceive the change of the image quality. Thus, drawing can be performed without decreasing the drawing interval.

[11th Embodiment]

Figure 36:
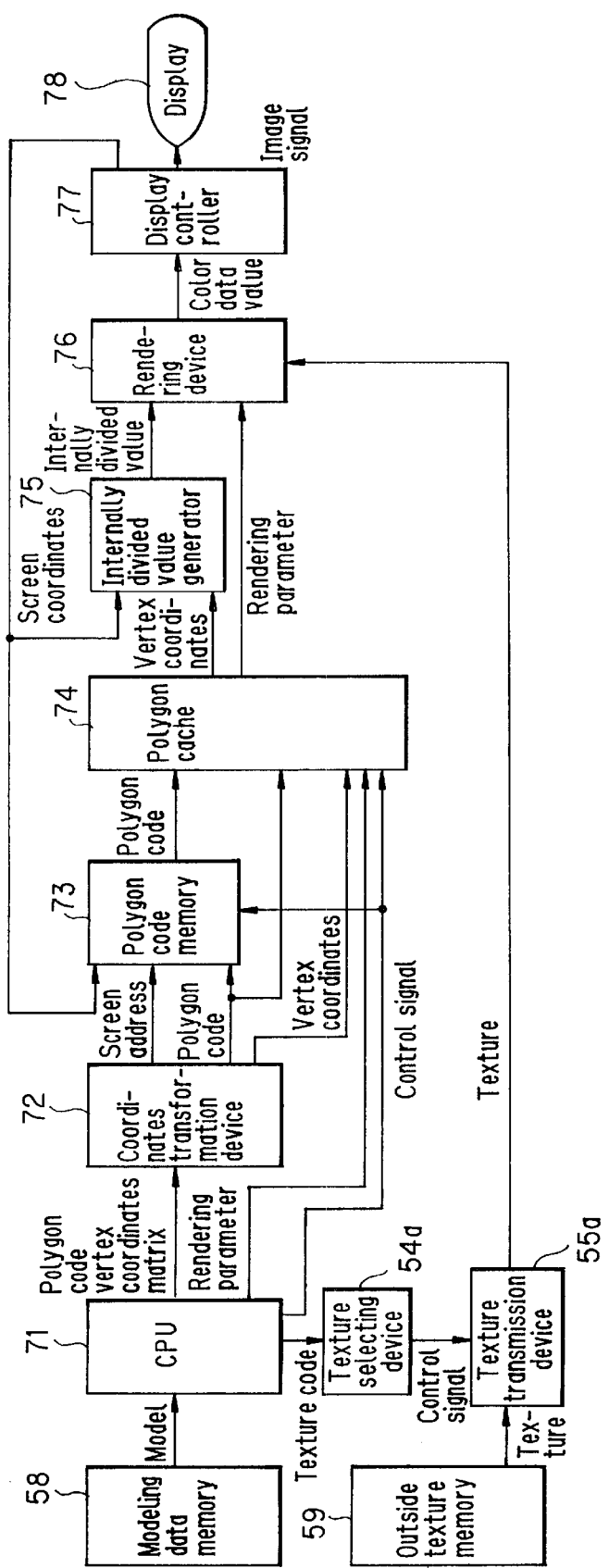
FIG. 36 is a block diagram showing the 11th embodiment of the three-dimensional image processing apparatus according to the present invention.

FIG. 36 is a block diagram showing the 11th embodiment of the three-dimensional image processing apparatus according to the present invention. This three-dimensional image processing apparatus has a construction that the texture selecting device 54*a* and the texture transmission device 55*a* are added to the image processing section (58, 59, 71–78) of the 7th embodiment.

This apparatus has a polygon code memory 73, and by performing rendering in the rendering device 76 at the time of sending the signal, and by executing the texture setting and a part of the rendering processing, it becomes possible to further reduce the processing time by means for reading in the texture.

[12th Embodiment]

Figure 37:
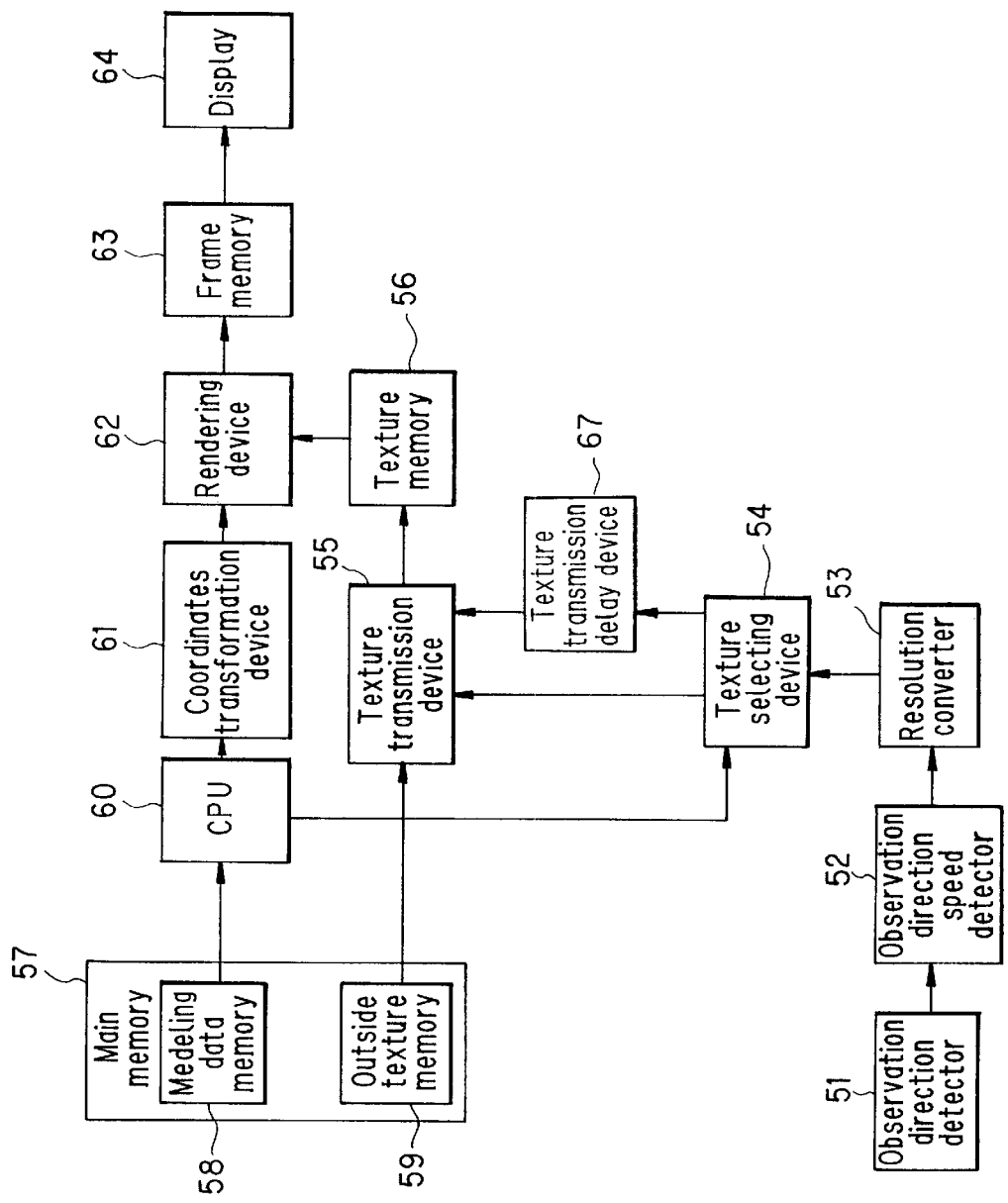
FIG. 37 is a block diagram showing the 12th embodiment of the three-dimensional image processing apparatus according to the present invention.

FIG. 37 is a block diagram showing the 12th embodiment of the three-dimensional image processing apparatus according to the present invention. This apparatus is provided with a texture transmission delay device 67 in addition to the construction of the 8th embodiment. The characteristic part of the present invention will now be described.

The texture selecting device 54 is a device which checks if the specified texture is present in the texture memory 56 or not, and if not, transmits the transmission command to transmit the texture having the resolution indicated by the resolution converter 53 to the texture transmission device 55. It has a list of texture IDs and the resolution thereof present in the texture memory therein.

The texture transmission delay device 67 is a device which selects one of the textures having the low resolution in the texture memory 56, using the list of the texture IDs and the resolution thereof in the texture selecting device 54, and transmits the transmission command of the corresponding texture having the high resolution to the texture transmission device 55.

The texture transmission device 55 is a device for transmitting a texture from the outside texture memory 59 to the texture memory 56, and inputs the transmission command from the texture selecting device 54 and the texture transmission delay device 55.

This apparatus detects the speed in the observation direction of the observer, switches over the resolution of the texture to the lower resolution according to this speed, and disperses the processing for returning the resolution of the texture to the original resolution when the changing speed becomes low.

The operation principle of the processing dispersion of this apparatus will now be described. First, it will be described for spanning in the horizontal direction of the observer, using FIG. 24, but it will be the same for other movement of the observer.

It is assumed that the observer is spanning a virtual space in the right direction at a certain speed. If it is assumed that the speed at that time is high, a low-resolution texture is being used for the model being displayed in the regions (from region A~region H) displayed on the screen, as described in the 8th embodiment.

In this state, it is assumed that the spanning speed of the observer is decreased, and the regions displayed on the screen becomes BCDEFGHI. At this time, in region I, since the texture to be used is not in the texture memory, it is necessary to read in the texture having the high resolution. Moreover, in regions B~H, since low-resolution textures are used, it is necessary to re-read in the high-resolution textures newly. Therefore, since it is necessary to re-read in many sheets of high-resolution textures, the next drawing will be delayed.

If it is necessary to read in the texture, the speed in the observation direction is detected by the observation direction speed detector 52, and 1) when the speed is slow, read in the high-resolution texture; or
2) when the speed is fast, read in the low-resolution texture.

When the texture is not read in, 3) selects one of the low-resolution textures set in the texture memory, and read in the high-resolution texture corresponding thereto.

This read in is performed, utilizing the frame where a texture is not required to be read in, or the interval until being displayed on the display after the rendering is completed.

Figure 38A:
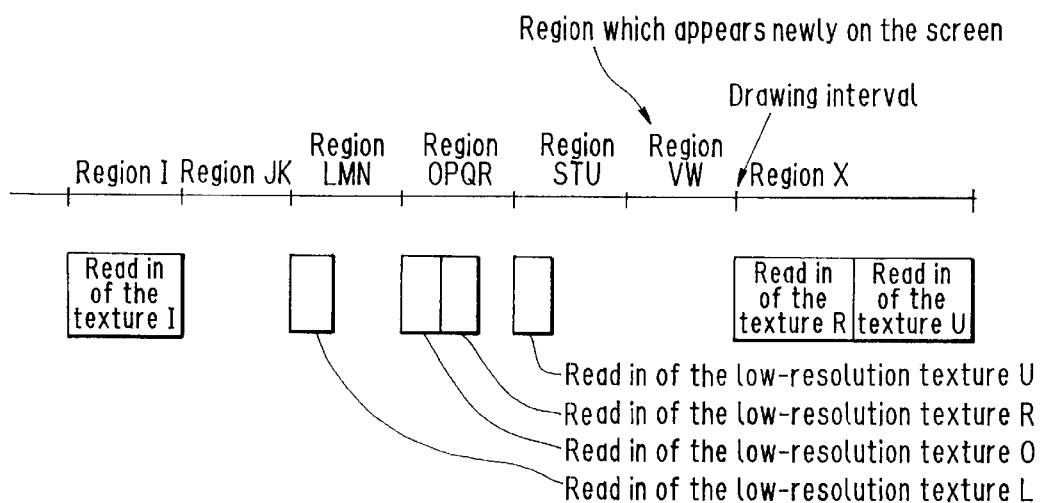
FIGS. 38A and B are graphs showing the examples of the texture setting.

The X-axis in FIGS. 38A and B is a time axis, and the mark added on the axis represents a timing for performing the drawing. The region name described on the X-axis represents a region which newly appears on the screen by the spanning of the observer. The region I in FIG. 38A indicates that regions ABCDEFGH are first displayed on the screen, and as the region I is appearing on the screen, the display regions change to BCDEFGHI.

The square under the X-axis schematically represents the kinds of the texture to be read in and the time required for reading in the texture.

The spanning speed is a speed at which one region newly appears on the screen (hereinafter, referred to as speed 1), and it is assumed that first from the state of speed 1, it is accelerated by speed 1, gets to speed 4, and then decelerated till it gets to speed 1. It is also assumed that one texture is used in the regions I, L, O, R and U, respectively, and that it is necessary to be read in from the texture memory every time each region appears on the screen. Moreover, the texture memory herein can store only the texture displayed on the screen. Here, for the purpose of explanation, it is assumed that when the spanning speed is speed 2 or higher, even if the resolution of the texture used for the model on the screen is changed, the observer cannot recognize it.

FIG. 38A is a graph showing the example of the texture setting when the 6th embodiment is used.

First, the spanning speed is speed 1, and region I appears on the screen. At this time, the texture I having the high resolution is read in. Then, it becomes speed 2, and the regions JK appear on the screen. Here, it is not necessary to read a texture newly. Next, it becomes speed 3, and regions LMN appear on the screen. At this time, the texture L having the low resolution is read in. Then it becomes speed 4, and regions OPQR appear on the screen. At this time, the textures O and R having the low resolution are read in. Then, it decelerates to speed 3, regions STU appear on the screen, and the texture U having the low resolution is read in. It further decelerates to speed 2 and then 1, and the region X appears on the screen.

On the screen, however, regions QRSTUVWX exist. It is necessary to change the texture used for the regions R and U to the one having the high resolution. Therefore, it is necessary to re-read in the textures R and U having the high resolution.

Figure 38B:
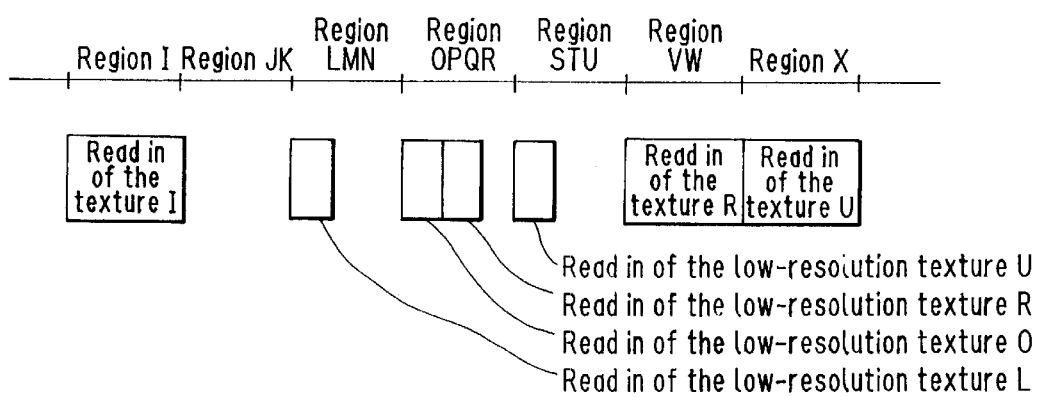

FIG. 38B is a graph showing the example of the texture setting when this embodiment is used.

First, the spanning speed is speed 1, and the region I appears on the screen. At this time, the method of 1) is applied, and the texture I having the high resolution is read in. Then it becomes speed 2, and regions JK appear on the screen. Here, the method of 2) is applied, but it is not necessary to read in the texture newly. Then, it becomes speed 3, and regions LMN appear on the screen. At this time, the method of 2) is applied, and the texture L having the low resolution is read in. Then it becomes speed 4, and regions OPQR appear on the screen. At this time, the method of 2) is applied, and the textures O and R having the low resolution are read in. Then, it decelerates to speed 3, regions STU appear on the screen, and the method of 2) is applied, and the texture U having the low resolution is first read in.

When it decelerates to speed 2, since there is no texture to be read in, the method 3) is applied. At this time, the regions displayed on the screen are PQRSTUVW, and texture R and texture U have the low resolution among the textures used in these regions. Among them, one of the high resolution (in the drawing, the texture R) is read in. When it becomes speed 1, since there is no texture to be read in, the high-resolution texture of the texture U which remains the low-resolution texture is read in, among the textures used on the screen. When the region X appears on the screen, it is necessary to display with the high-resolution textures from speed 1 onward, but the regions displayed at this time are QRSTUVWX, and both textures R and U used in these regions have the high resolution.

The actual operation of this embodiment will now be described.

The operation of the CPU 60, the observation direction detector 51 and the observation direction speed detector 52 are the same as that of the 6th embodiment, the description thereof will be omitted.

The operation for reading in the texture of this three-dimensional image processing apparatus will now be described.

Figure 39:
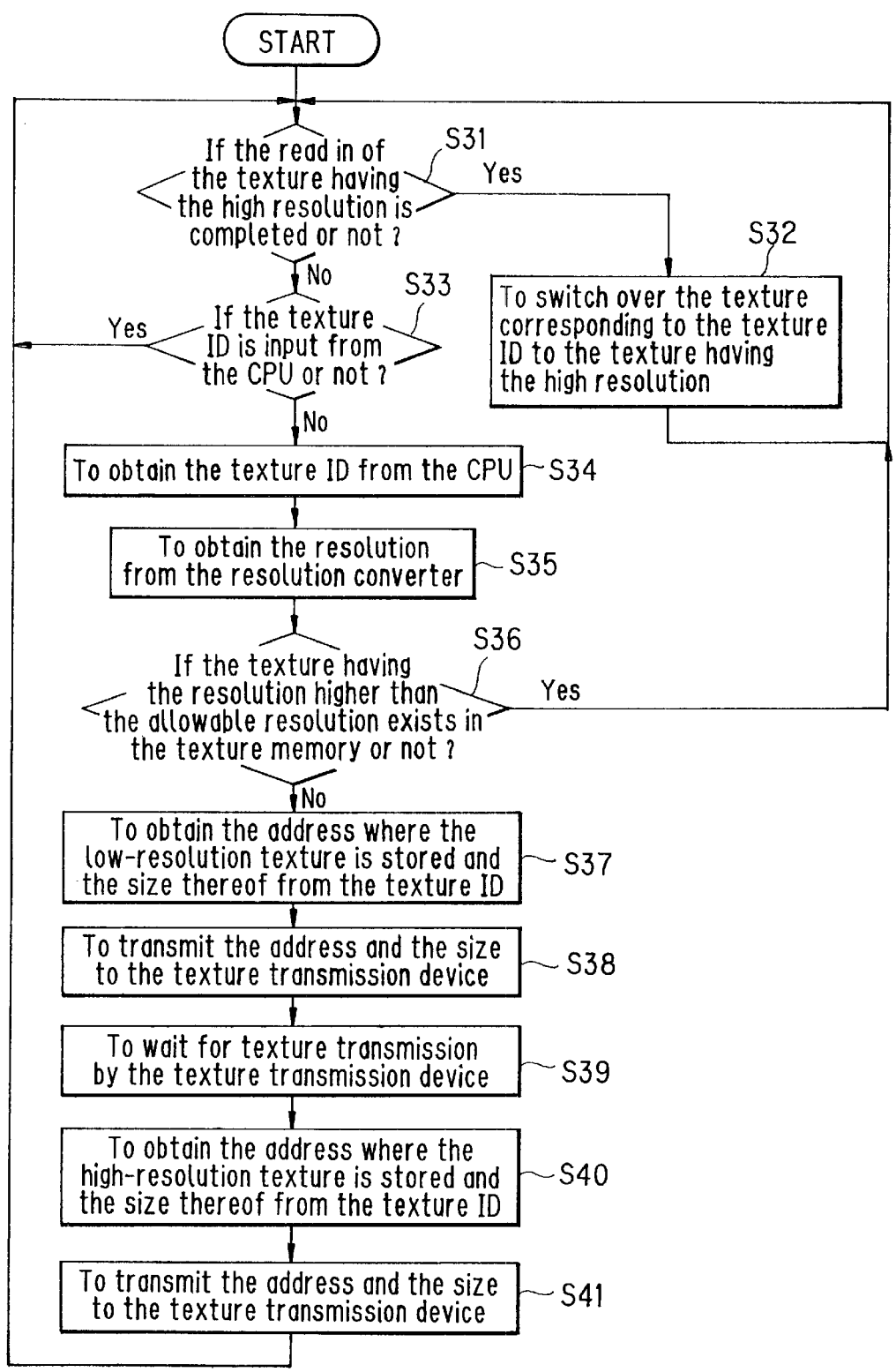
FIG. 39 is a flow chart showing the operation for reading in the texture in the 12th embodiment.

FIG. 39 is a flow chart showing the operation for reading in the texture in the 12th embodiment. The texture selecting device 54 checks if the texture memory 56 completes the read in of the texture having the high resolution or not (Step S31). If the read in has been completed, the texture selecting device 54 switches the texture corresponding to the texture ID to the high-resolution texture (Step S32), and returns to the beginning.

If the high-resolution texture is not read in, the texture selecting device 54 checks if the texture ID is input from the CPU 60 (Step S33), and if not, returns to Step S31. If the texture ID has been input, the texture selecting device 54 obtains the texture ID from the CPU 60 (Step 34). Then, the texture selecting device 54 obtains the allowable resolution of the texture based on the observation speed from the resolution converter 53 (Step S35).

The texture selecting device 54 checks if the texture corresponding to the texture ID is present in the texture memory 56 (Step S36), and if it is present, returns to Step S31.

If the texture is not present therein, the texture must be newly read in from the outside texture memory 59 to the texture memory 56. First, the address where the low-resolution texture is stored and the size are obtained from the texture ID (Step S37). The texture selecting device 54 then transmits the address and the size to the texture transmission device 55 and the texture transmission delay device 67 (Step S38). The texture transmission delay device 67 waits for the texture transmission by the texture transmission device 55 (Step S39).

When the transmission of the low-resolution texture to the texture memory 56 is completed, the texture transmission delay device 67 selects one of the textures having the low resolution in the texture memory 56, using the list of the texture IDs and the resolution thereof in the texture selecting device 545 and transmit s the transmission command of the corresponding texture having the high resolution to the texture transmission device 55. That is to say, the texture transmission delay device 67 obtains the address where the high-resolution texture is stored and the size there from the texture ID (Step S40). The texture selecting device 54 then transmits the address and the size to the texture transmission device 55, when the texture memory 56 does not need to read in a new texture, then returns to the beginning (Step S31).

Therefore, when it is necessary to read in the texture, the speed in the observation direction of the observer is detected, and the processing for returning the resolution of the texture to the original resolution is dispersed when the speed becomes slow, according the changing speed, thereby the delay of the rendering due to the processing for reading in the texture can be alleviated.

[13th Embodiment]

Figure 40:
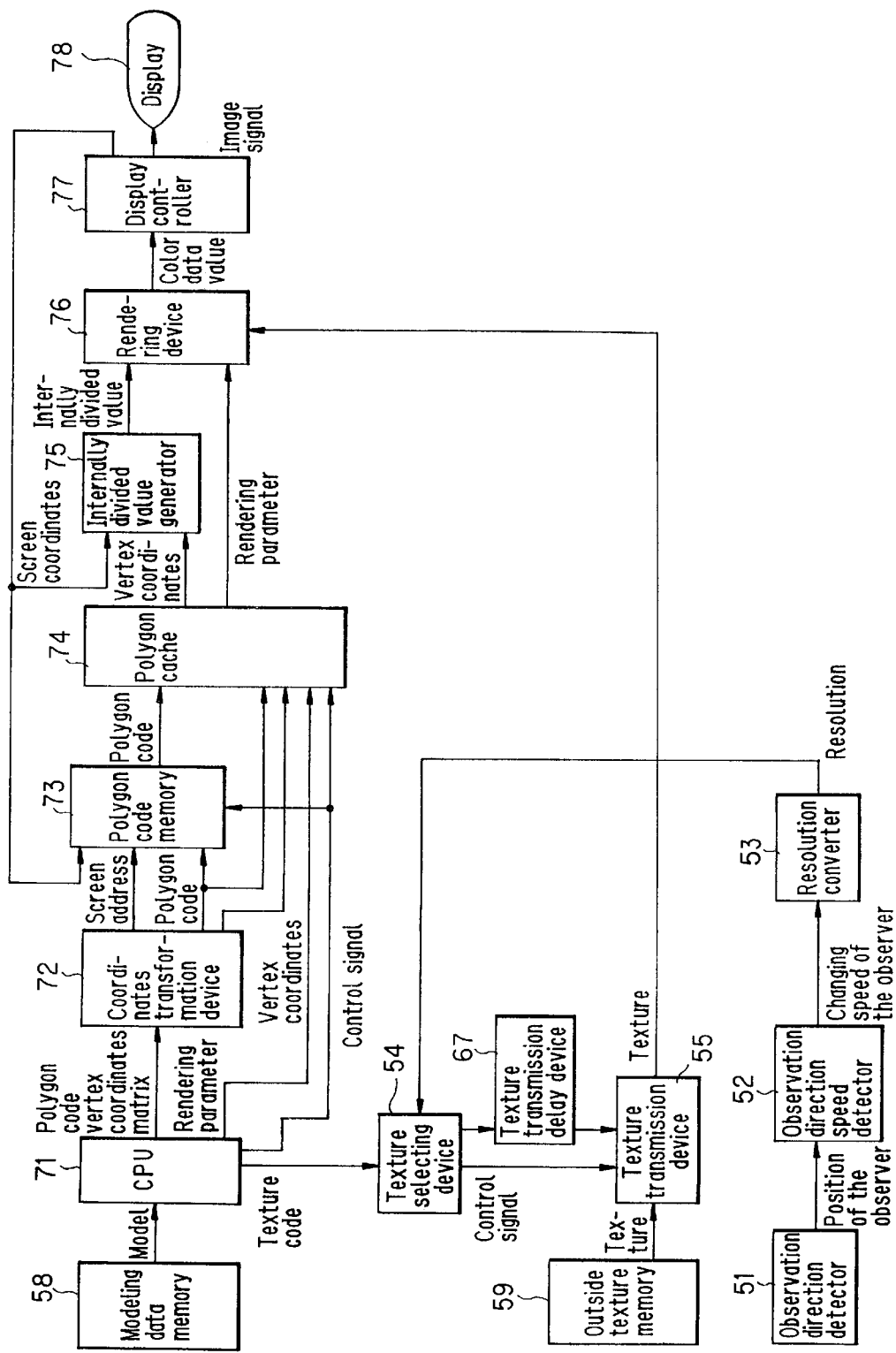
FIG. 40 is a block diagram showing the 13th embodiment of the three-dimensional image processing apparatus according to the present invention.

FIG. 40 is a block diagram showing the 13th embodiment of the three-dimensional image processing apparatus according to the present invention. This apparatus has a construction that the texture transmission delay device 67 is added to the 7th embodiment. The operation for reading in the texture is basically the same as that of the 12th embodiment, therefore the description thereof will be omitted.

[14th Embodiment]

Figure 41:
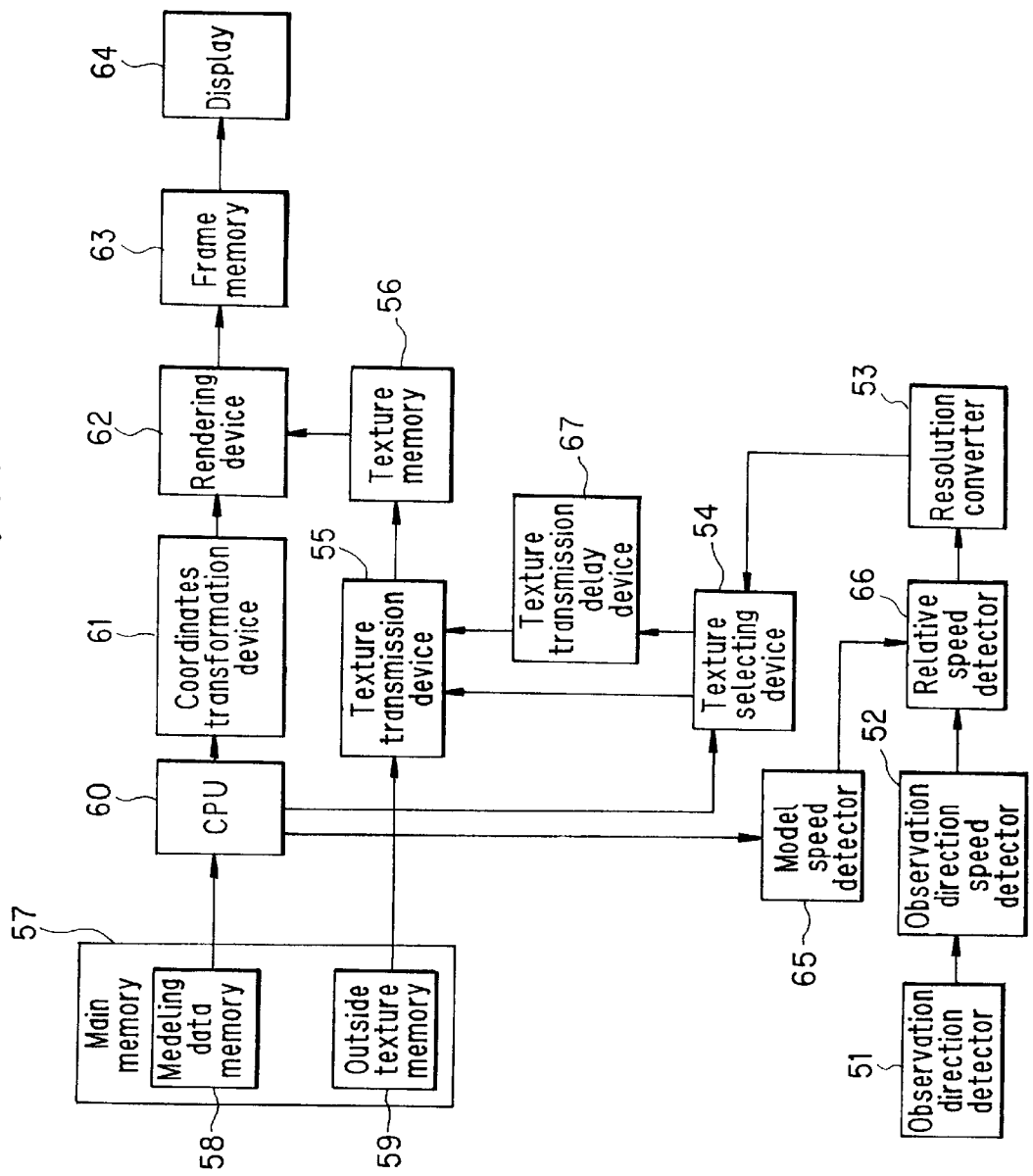
FIG. 41 is a block diagram showing the 14th embodiment of the three-dimensional image processing apparatus according to the present invention.

FIG. 41 is a block diagram showing the 14th embodiment of the three-dimensional image processing apparatus according to the present invention. This apparatus detects the relative speed of the observation direction of the observer and the object to be displayed, switches over the resolution of the texture to the lower resolution according to the relative speed, and tries to disperse the processing for returning the resolution of the texture to the original resolution when the changing speed becomes low. This apparatus has a construction that the texture transmission delay device 67 is added to the 8th embodiment.

The operation of this apparatus is basically the same as that of the 12th embodiment. The different point is that the relative speed of the observer and the model is detected by the relative speed detector 66, to determine the allowable resolution with the resolution converter 53, based on the relative speed. Description for other operation will be omitted.

As described above, if it is necessary to read in the texture, the relative speed of the observer and the model is detected, and according to the relative speed, the processing for returning the resolution of the texture to the original resolution when the speed becomes low is dispersed, thereby the delay of the rendering processing due to the processing for reading in the texture can be alleviated.

[15th Embodiment]

Figure 42:
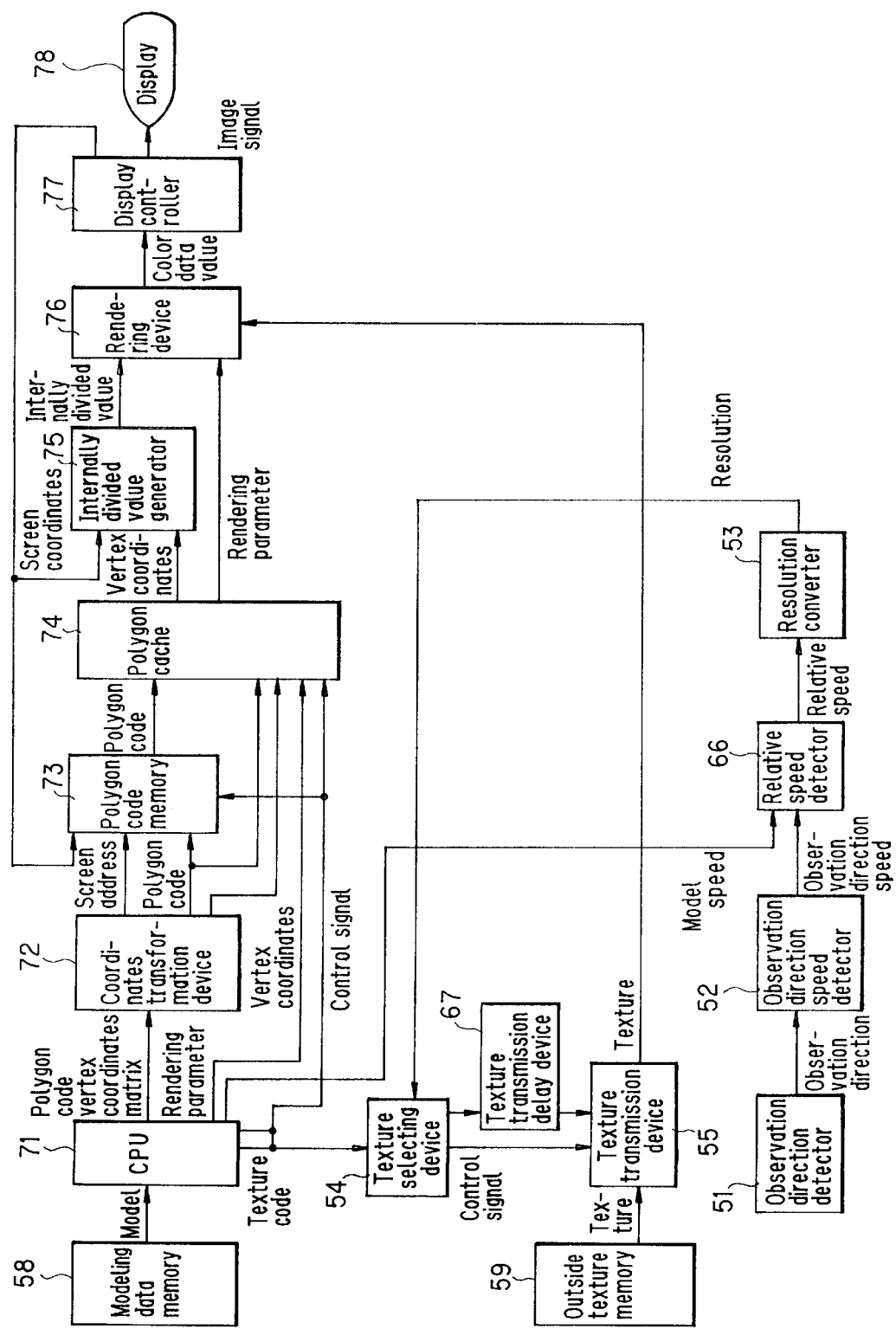
FIG. 42 is a block diagram showing the 15th embodiment of the three-dimensional image processing apparatus according to the present invention.

FIG. 42 is a block diagram showing the 15th embodiment of the three-dimensional image processing apparatus according to the present invention. This apparatus has a construction that the texture transmission delay device 67 is added to the 9th embodiment. The operation for reading in the texture is basically the same as that of the 14th embodiment, therefore the description thereof will be omitted.

According to the invention of the gist 1, since the pixel-selecting means for selecting the pixel of the image roughly in the moving direction of the observer based on the movement information is provided, the number of pixel to be image-processed is decreased, the processing time can be reduced, and the image which can follow the movement of the observer can be formed. Since the man's dynamic eyesight drops when the observer moves, even if the pixel of the image is selected roughly in the moving direction of the observer, the deterioration of the image quality cannot be perceived.

According to the invention of the gist 2, the pixel-selecting means compresses the image in the moving direction of the observer at a certain ratio, and extracts and restores the compressed image in units of pixels. That is to say, since the data of the compressed image is captured and restored in units of pixels, the pixel of the image can be selected roughly in the moving direction of the observer.

According to the invention of the gist 3, since the image is compressed in the moving direction of the observer, the image can be compressed α times as much as the area of the drawing region in the third conventional example, hence the number of pixel to be image-processed is decreased, the processing time can be reduced, and the image which can follow the movement of the observer can be formed.

According to the invention of the gist 4, since the compression is performed by coinciding the moving direction of the head position to the X-axis or the Y-axis in the screen coordinate system, that is, the compression is performed in the X-axis direction or the Y-axis direction, the drawing region after the compression does not protrude from the drawing region before the compression, at least in the compressed axial direction. Therefore, there is no need to increase the range to be image-processed at least in the compression direction, hence, there is such a merit that the memory capacity for storing the image data can be reduced.

According to the invention of the gist 5, since the range of drawing after the compression corresponds to at least two sides opposite to each other in the range of drawing before the compression, the range of drawing after the compression does not protrude from the range of drawing before the compression in the direction of two sides, therefore, there is no need to increase the range to be image-processed at least in the direction of two sides, hence, there is such a merit that the memory capacity for storing the image data can be reduced.

According to the invention of the gist 6, since the image compressed with the matrix transformation expression is stored in the memory means in units of pixels, and the pixel in the coordinates in which the coordinates of the pixel to be read out is multiplied by the matrix transformation expression from the left is read out, an image whose pixel is selected roughly in the moving direction of the observer can be generated, using the same matrix transformation expression for both compression means and restoration means.

According to the invention of the gist 7, since the image compressed with the matrix transformation expression is stored in the memory means in units of pixels, and the pixel in the coordinates in which the coordinates of the pixel to be read out is multiplied by the inverse matrix of the matrix transformation expression from the left is read out, an image whose pixel is selected roughly in the moving direction of the observer can be generated.

According to the invention of the gist 8, since the image in which the sides in the range of drawing after the compression is parallelized to the respective sides in the range of drawing before the compression is stored in the memory means in units of pixels, the restoration means needs not restore it with the matrix transformation expression, but have only to multiply it by the expansion rate for the restoration, thereby the restoration processing can be simplified.

According to the invention of the gist 9, since the ratio decreases with the increase of the moving speed of the observer, the number of pixels to be processed decreases with the increase of the moving speed, thus the processing time can be reduced. Therefore, an image which can follow the moving speed can be generated. Since the dynamic eyesight drops as the moving speed of the observer increases, even if the pixel of the image is selected roughly in the moving direction of the observer with the increase of the moving speed, the deterioration of the image quality cannot be perceived.

According to the invention of the gist 10 and 15, by detecting the moving speed of the observer and changing the resolution of the texture according to the speed, the read-in time of the texture can be shortened, thereby drawing which can follow the moving speed of the observer can be attained.

According to the invention of the gist 11 and 16, by detecting the moving speed of the observer and the relative speed of the object to be displayed, and changing the resolution of the texture according to the relative speed, the read-in time of the texture can be shortened, thereby drawing which can follow the moving speed of the observer can be attained.

According to the invention of the gist 12 and 17, when a new texture is read in, a texture having the low resolution is first read in, and then a texture having the high resolution is read in, thereby the processing for reading in the texture can be dispersed. Therefore, even when a new texture is read in sequentially, the read-in time of the texture can be shortened, thereby drawing can be performed without reducing the drawing interval.

According to the invention of the gist 13 and 18, a texture having the low resolution is selected as the moving speed increases, and a texture having the high resolution is selected as the moving speed decreases, thereby the read-in time of the texture can be shortened. Moreover, when the moving speed decreases, the processing for reading in a texture having the normal resolution can be dispersed, thereby the decrease of the drawing interval can be suppressed.

According to the invention of the gist 14 and 19, a texture having the low resolution is selected as the relative speed increases, and a texture having the high resolution is selected as the relative speed decreases, thereby the read-in time of the texture can be shortened. Moreover, when the relative speed decreases, the processing for reading in a texture having the normal resolution can be dispersed, thereby the decrease of the drawing interval can be suppressed.

What is claimed is:

1. A three-dimensional image generating apparatus for generating a stereoscopic two-dimensional image from a three-dimensional information, comprising:
    movement-detecting means for detecting the movement information including the direction and the speed of the movement of the observer; pixel-selecting means for selecting the pixel of the image roughly in the moving direction of the observer based on the movement information; and image-generating means for generating an image from a value obtained by said pixel-selecting means.

2. A three-dimensional image generating apparatus according to claim 1, wherein said pixel-selecting means comprises compression means for compressing the image at a certain ratio in the moving direction of the observer, and restoration means for extracting and restoring said compressed image in units of pixels.

3. A three-dimensional image generating apparatus according to claim 2, wherein said compression means multiplies the coordinates of the pixel by a matrix transformation expression, which compresses the image in the moving direction of the observer.

4. A three-dimensional image generating apparatus according to claim 2. wherein said compression means rotates and coincides the moving direction of the observer to the X-axis or Y-axis in the screen coordinate system, and multiplies the coordinates of the pixel by a matrix transformation expression, which compresses the image in the direction of the coincided axis.

5. A three-dimensional image generating apparatus according to claim 2, wherein said compression means rotates and coincides the moving direction of the observer to the X-axis or Y-axis in the screen coordinate system, and multiplies the coordinates of the pixel by a matrix transformation expression, which compresses the image in the direction of the coincided axis, and parallelizes at least two sides opposite to each other in the range of drawing before the compression to the corresponding two sides in the range of drawing after the compression.

6. A three-dimensional image processing apparatus according to claim 5, wherein said image generating means has memory means for storing the image information for each pixel, and generates the image by reading out the image information from said image memory means;

said compression means stores the image compressed with said matrix transformation expression in said memory means for each pixel; and said restoration means reads out and restores the pixel in the coordinates in which the coordinates of the pixel to be read out is multiplied by said matrix transformation expression from the left.

7. A three-dimensional image processing apparatus according to claim 5, wherein said image generating means has memory means for storing the image information for each pixel, and generates the image by reading out the image information from said image memory means;

said compression means stores the image compressed with said matrix transformation expression in said memory means for each pixel; and said restoration means reads out and restores the pixel in the coordinates in which the coordinates of the pixel to be read out is multiplied by the inverse matrix of said matrix transformation expression from the left.

8. A three-dimensional image processing apparatus according to claim 2, wherein said image generating means has memory means for storing the image information for each pixel, and generates the image by reading out the image information from said image memory means;

said compression means rotates and coincides the moving direction of the observer to the X-axis or Y-axis in the screen coordinate system, then multiplies the coordinates of the pixel by a matrix transformation expression, which compresses the image in the direction of the coincided axis and parallelizes the sides in the range of drawing after the compression to respective sides in the range of drawing before the compression, and stores the image compressed with said matrix transformation expression in said memory means for each pixel, and said restoration means expands and restores the image read out from said memory means.

9. A three-dimensional image generating apparatus according to claim 2, wherein said ratio decreases with the increase of the moving speed of the observer.

10. A three-dimensional image processing apparatus for attaching a texture to a two-dimensional image from the three-dimensional information to perform the image generation processing, which comprises:

main memory means for storing all the textures; texture memory means for storing textures necessary for the display read from said main memory means; movement-detecting means for detecting the moving speed of the observer; texture selecting means for selecting the texture having the resolution corresponding to said speed to allow the texture to be read in to said texture memory means; and image generating means for reading the texture from said texture memory means to generate an image.

11. A three-dimensional image processing apparatus for attaching a texture to a two-dimensional image from the three-dimensional information to perform the image generation processing, which comprises:

main memory means for storing all the textures; texture memory means for storing textures necessary for the display read from said main memory means; movement-detecting means for detecting the moving speed of the observer; object speed-detecting means for detecting the speed of the displayed object; a relative speed-detecting means for detecting the relative speed of the displayed object with respect to the observer, from the moving speed of the observer and the speed of the displayed object; texture selecting means for selecting the texture having the resolution corresponding to said relative speed to allow the texture to be read in to said texture memory means; and image generating means for reading the texture from said texture memory means to generate an image.

12. A three-dimensional image processing apparatus for attaching a texture to a two-dimensional image from the three-dimensional information to perform the image generation processing, which comprises:

main memory means for storing all the textures; texture memory means for storing textures necessary for the display read from said main memory means; low resolution texture-selecting means for selecting a texture having the low resolution to allow the texture to be read in, when a new texture is read in from said main memory means to said texture memory means; high resolution texture-selecting means which allows a texture having the high resolution corresponding to the low resolution to be read in from said main memory means to said texture memory means, after the texture having the low resolution is read in; and image generating means for reading the texture from said texture memory means to generate an image.

13. A three-dimensional image processing apparatus for attaching a texture to a two-dimensional image from the three-dimensional information to perform the image generation processing, which comprises:

main memory means for storing all the textures; texture memory means for storing textures necessary for the display read from said main memory means; movement-detecting means for detecting the moving speed of the observer; texture selecting means which selects a texture having the low resolution as said moving speed increases, and selects a texture having the high resolution as said moving speed decreases, to allow the texture to be read in to said texture memory means; and image generating means for reading the texture from said texture memory means to generate an image.

14. A three-dimensional image processing apparatus for attaching a texture to a two-dimensional image from the three-dimensional information to perform the image generation processing, which comprises:

main memory means for storing all the textures; texture memory means for storing textures necessary for the display read from said main memory means; movement-detecting means for detecting the moving speed of the observer; object speed-detecting means for detecting the speed of the displayed object; relative speed-detecting means for detecting the relative speed of the displayed object with respect to the observer, from the moving speed of the observer and the speed of the displayed object; texture selecting means which selects a texture having the low resolution as said relative speed increases, and selects a texture having the high resolution as the relative speed decreases, to allow the texture to be read in to said texture memory means; and image generating means for reading the texture from said texture memory means to generate an image.

15. A three-dimensional image processing method for attaching a texture to a two-dimensional image from the three-dimensional information to perform the image generation processing, comprising the steps of:

detecting the moving speed of the observer, selecting the texture having the resolution corresponding to said speed, reading in said texture selected from the main memory means which stores all the textures to said texture memory means, and reading out the texture from said texture memory means to perform the image generation.

16. A three-dimensional image processing method for attaching a texture to a two-dimensional image from the three-dimensional information to perform the image generation processing, comprising the steps of:

detecting the moving speed of the observer, detecting the speed of the displayed object, detecting the relative speed of the displayed object with respect to the observer from the moving speed of the observer and the speed of the displayed object, selecting the texture having the resolution corresponding to said relative speed to allow the texture selected from the main memory means which stores all the textures to be read in to said texture memory means, and reading out the texture from said texture memory means to perform the image generation.

17. A three-dimensional image processing method for attaching a texture to a two-dimensional image from the three-dimensional information to perform the image generation processing, comprising the steps of:

when a new texture is read in from said main memory means which stores all the textures to said texture memory means, selecting a texture having the low resolution to be read in, then after reading in the texture having the low resolution, allowing the texture having the high resolution corresponding to the low resolution to be read in to said texture memory means from said main memory means, and reading out the texture from said texture memory means to perform the image generation.

18. A three-dimensional image processing method for attaching a texture to a two-dimensional image from the three-dimensional information to perform the image generation processing, comprising the steps of:

detecting the moving speed of the observer, and selecting a texture having the low resolution as said moving speed increases, and selecting a texture having the high resolution as said moving speed decreases, to allow the selected texture to be read in to said texture memory means from the main memory means which stores all the textures, and reading out the texture from said texture memory means to perform the image generation.

19. A three-dimensional image processing method for attaching a texture to a two-dimensional image from the three-dimensional information to perform the image generation processing, comprising the steps of:

detecting the moving speed of the observer, detecting the speed of the displayed object, detecting the relative speed of the displayed object with respect to the observer from the moving speed of the observer and the speed of the displayed object, selecting a texture having the low resolution as said relative speed increases, and selecting a texture having the high resolution as said relative speed decreases, to allow the selected texture to be read in to said texture memory means from the main memory means which stores all the textures, and reading out the texture from said texture memory means to perform the image generation.

* * * * *